United States Patent
Matsumoto

(10) Patent No.: US 11,636,774 B2
(45) Date of Patent: Apr. 25, 2023

(54) PROBLEM COLLECTION/EVALUATION METHOD, PROPOSED SOLUTION COLLECTION/EVALUATION METHOD, SERVER FOR PROBLEM COLLECTION/EVALUATION, SERVER FOR PROPOSED SOLUTION COLLECTION/EVALUATION, AND SERVER FOR COLLECTION/EVALUATION OF PROBLEM AND PROPOSED SOLUTION THERETO

(71) Applicant: VISITS TECHNOLOGIES INC., Tokyo (JP)

(72) Inventor: Masaru Matsumoto, Tokyo (JP)

(73) Assignee: Visits Technologies Inc., Tokyo (JP)

( * ) Notice: Subject to any disclaimer, the term of this patent is extended or adjusted under 35 U.S.C. 154(b) by 0 days.

(21) Appl. No.: 17/419,927

(22) PCT Filed: Jan. 21, 2020

(86) PCT No.: PCT/JP2020/002008
§ 371 (c)(1),
(2) Date: Jun. 30, 2021

(87) PCT Pub. No.: WO2020/153383
PCT Pub. Date: Jul. 30, 2020

(65) Prior Publication Data
US 2022/0114902 A1    Apr. 14, 2022

(30) Foreign Application Priority Data
Jan. 21, 2019    (JP) .............................. JP2019-008088

(51) Int. Cl.
*G09B 7/02*    (2006.01)
(52) U.S. Cl.
CPC .................................... *G09B 7/02* (2013.01)

(58) Field of Classification Search
CPC ............... G09B 5/00; G09B 7/00; G09B 7/02
See application file for complete search history.

(56) References Cited

U.S. PATENT DOCUMENTS

| 8,755,737 B1 | 6/2014 | Galen |
| 10,943,500 B2 | 3/2021 | Matsumoto |

(Continued)

FOREIGN PATENT DOCUMENTS

| JP | 2000-122995 | 4/2000 |
| JP | 2002-062795 | 2/2002 |

(Continued)

OTHER PUBLICATIONS

IPRP and Written Opinion for International Application No. PCT/JP2020/002008 dated Jul. 29, 2021; English Translation.

(Continued)

*Primary Examiner* — Robert J Utama
(74) *Attorney, Agent, or Firm* — Martin & Ferraro, LLP

(57) ABSTRACT

A method for collecting and evaluating problems and a method for collecting and evaluating proposed solution that can be efficiently performed online are provided. In the first test, various problems are collected from a plurality of examinees via a network, and the examinees are allowed to evaluate each other, and the problem data and problem evaluation data obtained are stored in the server using identifiers. The server can extract a problem evaluation aggregated data and transmit it to a test administrator terminal via the network. In the second test, various proposed solutions are collected from a plurality of examinees via the network, and the examinees are allowed to evaluate each other, and the proposed solution data and proposed solution evaluation data obtained are stored in the server using identifiers. The server can extract a proposed solution (Continued)

evaluation aggregated data and transmit it to the test administrator terminal via the network.

19 Claims, 33 Drawing Sheets

(56) References Cited

U.S. PATENT DOCUMENTS

| | | |
|---|---|---|
| 2004/0018479 A1 | 1/2004 | Pritchard |
| 2008/0206731 A1 | 8/2008 | Bastianova-Klett |
| 2008/0227075 A1* | 9/2008 | Poor ................. G06V 10/40 434/307 R |
| 2010/0075291 A1* | 3/2010 | DeYoung ................. G09B 7/00 434/350 |
| 2010/0075292 A1* | 3/2010 | DeYoung ................. G09B 7/06 434/350 |
| 2011/0097692 A1 | 4/2011 | Homan |
| 2011/0151423 A1* | 6/2011 | Venable ................. G09B 7/00 434/350 |
| 2012/0058459 A1 | 3/2012 | Obeid |
| 2012/0288844 A1 | 11/2012 | Anand |
| 2015/0006261 A1 | 1/2015 | Gutman et al. |
| 2015/0358681 A1 | 12/2015 | Gaston |

FOREIGN PATENT DOCUMENTS

| | | |
|---|---|---|
| JP | 2002-092266 | 3/2002 |
| JP | 2004-334761 | 11/2004 |
| JP | 2007-257330 | 10/2007 |
| JP | 2009-509200 | 3/2009 |
| JP | 2014-500532 | 1/2014 |
| JP | 2015-184970 | 10/2015 |
| WO | WO 2011/060480 | 5/2011 |
| WO | WO 2017/145765 | 8/2017 |

OTHER PUBLICATIONS

International Search Report with English translation for PCT/JP2020/002008, dated Mar. 31, 2020.

International Search Report for PCT/JP2017/004603, dated May 9, 2017.

European Search Report for EP Application No. 17756206.3 (PCT/JP2017/004603), dated Aug. 3, 2018.

* cited by examiner

First test: problem evaluation session

<Event name>

Instruction (text)

Impact

Frequency

Next

1) Time limit (set by the test administrator)
* In the case of unlimited setting, it is possible to answer at any time during the test opening period 2) Instruction input (created by the test administrator)

3) The problem proposed by another examinee is automatically displayed

4) Evaluation axis is set by the test administrator.
A plurality of axes may be set for analysis.
The evaluation axis may be selected from the options prepared in advance by the test administrator or may be freely set by the test administrator.

FIG. 9

Second test: proposed solution evaluation session

<Event name>

Instruction (text)

Effect

Feasibility

Next

1) Time limit (set by the test administrator)
* In the case of unlimited setting, it is possible to answer at any time during the test opening period 2) Instruction input (created by the test administrator)

3) The proposed solution proposed by another examinee is automatically displayed 4) Evaluation axis is set by the test administrator.
A plurality of axes may be set for analysis.
The evaluation axis may be selected from the options prepared in advance by the test administrator or may be freely set by the test administrator.

Test administrator (second test information)

| First test administration | Second test administration |

Examinee    Affiliation      Progress      Score (Name)    (Department)    problem collection session ended    (Points)    Edit (Name)    (Department)    problem collection session ended    (Points)    Edit (Name)    (Department)    problem collection session ended    (Points)    Edit

| Bulk addition of examinees | Individual addition of examinees |
| Bulk CSV upload | Individual CSV upload |
| Second test settings | Second test settings edit |
| Start proposed solution collection session | Force terminate proposed solution collection session |
| Start proposed solution evaluation session | Start score calculation |
| Result output CSV | Result output PDF |
| View results | |

| # | PROBLEM | SCORE 1 | SCORE 2 |
|---|---|---|---|
| 1 | How do we reach the early adopters when launching to the market? If we cannot acquire appropriate first customers, post-launch user feedback and product development improvements in response may not proceed properly. | 72.4 | 68.2 |
| 2 | ***** | 68.1 | 70.8 |
| 3 | ***** | 67.9 | 60.7 |
| 4 | ... | ... | ... |

| # | PROPOSED SOLUTION | SCORE 1 | SCORE 2 |
|---|---|---|---|
| 1 | Customer data that is collected but not particularly used is stored in the company (currently, it is not used to meet the storage cost. Is it possible to make effective use of external data rather than customer data alone? On the premise of ensuring anonymity, we can make effective use of idle assets by connecting behavior log data, location information data, and the like based on our customer data. We can build our own CDP (Customer Data Platform) and use it as the basis for our platform strategy. | 72.4 | 68.2 |
| 2 | ***** | 68.1 | 70.8 |
| 3 | ***** | 67.9 | 60.7 |
| 4 | ... | ... | ... |

FIG. 23C

ISSUE LIST

| CONTENT OF ISSUE | SCORE EVALUATION AXIS 1 | EVALUATION AXIS 2 | |
|---|---|---|---|
| **** | ** | ** | Propose a solution |
| **** | ** | ** | Propose a solution |
| **** | ** | ** | Propose a solution |
| **** | ** | ** | |

USAGE RESULT OF PROPOSED SOLUTION

| CONTENT OF PROBLEM | SCORE EVALUATION AXIS 1 | EVALUATION AXIS 2 |
|---|---|---|
| **** | ** | ** |

| CONTENT OF PROPOSED SOLUTION | SCORE EVALUATION AXIS 1 | EVALUATION AXIS 2 |
|---|---|---|
| **** | ** | ** |

USAGE RESULT

[                    ]

[SUBMIT]

FIG. 26

| FIELD | TYPE | CONTENT |
|---|---|---|
| Individual ID | int | primary key |
| Examinee ID | int | |
| Organization ID | int | organization ID to which examinee belongs to |
| in-organization ID | int | employee number etc. |
| Name | text | |
| Kana characters of name | text | |
| Mail address | text | |
| Department 1 | text | large category |
| Department 2 | text | middle category |
| Department 3 | text | small category |
| Date of birth | date | |
| Zip code number | int | * in cases of individual application |
| Address | text | * in cases of individual application |
| Account opening date and time | date | |
| Login password | crypt | |
| Status | text | in progress of the first test problem collection session etc. |

FIG. 36

| FIELD | TYPE | CONTENT |
|---|---|---|
| First test ID | int | primary key. Unique ID assigned to each test. |
| First test collection start date and time | date / time | start date and time of problem collection session of the first test |
| First test collection end date and time | date / time | end date and time of problem collection session of the first test |
| First test problem input conditions | text | text instructing problem input conditions to examinees |
| First test problem answer time limit | int | time limit for answering problems in the first test |
| Number of answer characters | int | limit to number of characters that examinees can answer |
| Number of possible answers | int | limit to number of problems that examinees can answer |
| File attachment availability | int | whether or not a file can be attached when examinees submit an answer |
| First test evaluation start date and time | date / time | start date and time of evaluation collection session of the first test |
| First test evaluation end date and time | date / time | end date and time of evaluation collection session of the first test |
| First test input conditions for problem evaluation | text | text instructing input conditions when examinees evaluate a problem |
| Disclose results to examinees or not | int | whether or not disclose the results to examinees |
| Number of evaluators for one problem | int | number of evaluators for one problem |
| First test evaluation answer time limit | int | time limit for answering evaluations in the first test |
| First test problem evaluation axis 1 | int | content of the first problem evaluation axis in the first test |
| First test problem evaluation axis 2 | int | content of the second problem evaluation axis in the first test |
| ⋮ | | ⋮ |
| First test problem evaluation axis n | int | content of the nth problem evaluation axis in the first test |

FIG. 37

| FIELD | TYPE | CONTENT |
|---|---|---|
| Problem ID | int | parimary key |
| Examinee ID | int | ID of the examinee who has taken the first test |
| First test ID | int | unique ID of the first test |
| Problem | text | problem included in the problem data transmitted by the examinee (free description) |
| Initial score for evaluation axis 1 | int | initial evaluation of the problem for evaluation axis 1 |
| First corrected score for evaluation axis 1 | int | evaluation of the problem for evaluation axis 1 after correction of one time |
| Second corrected score for evaluation axis 1 | int | evaluation of the problem for evaluation axis 1 after correction of two times |
| Initial score for evaluation axis 2 | int | initial evaluation of the problem for evaluation axis 2 |
| ... | ... | ... |
| Initial score for evaluation axis n | int | initial evaluation of the problem for evaluation axis n |
| ... | ... | ... |

FIG. 38

| FIELD | TYPE | CONTENT |
|---|---|---|
| Problem evaluation ID | int | parimary key |
| Problem ID | int | ID of the problem to be evaluated |
| Examinee ID | int | ID of the evaluator (the examinee) |
| First test ID | int | unique ID of the first test |
| Answer identification ID | int | ID for identifying the number of answer |
| Evaluation value for evaluation axis 1 | int | evaluation for the first problem evaluation axis (e.g. 5 grades) |
| Evaluation value for evaluation axis 2 | int | evaluation for the second problem evaluation axis (e.g. 5 grades) |
| ... | ... | ... |
| Evaluation value for evaluation axis n | int | evaluation for the nth problem evaluation axis (e.g. 5 grades) |
| ... | ... | ... |

FIG. 39

| FIELD | TYPE | CONTENT |
|---|---|---|
| Examinee ID | int | ID of the examinee to be evaluated |
| First test ID | int | unique ID of the first test |
| Initial score for evaluation axis 1 | int | initial evaluation of the examinee for evaluation axis 1 |
| First corrected score for evaluation axis 1 | int | evaluation of the examinee after correction of one time |
| Second corrected score for evaluation axis 1 | int | evaluation of the examinee after correction of two times |
| Initial score for evaluation axis 2 | int | initial evaluation of the examinee for evaluation axis 2 |
| ... | ... | ... |
| Initial score for evaluation axis n | int | initial evaluation of the examinee for evaluation axis n |
| ... | ... | ... |

FIG. 40

| FIELD | TYPE | CONTENT |
|---|---|---|
| Examinee ID of an evaluator | int | primary key |
| Problem ID to be evaluated | int | |
| Required number of evaluations | int | |
| Number of completed evaluations | int | |

FIG. 41

| FIELD | TYPE | CONTENT |
|---|---|---|
| Individual ID | int | primary key |
| Examinee ID | int | |
| Organization ID | int | organization ID of the organization belonged to |
| In-organization ID | int | employee number etc. |
| Name | text | |
| Kana character of name | text | |
| Mail address | text | |
| Department 1 | text | large category |
| Department 2 | text | middle category |
| Department 3 | text | small category |
| Date of birth | date | |
| Zip code number | int | * in cases of individual application |
| Address | text | * in cases of individual application |
| Account opening date and time | date | |
| Login passsword | crypt | |
| Status | text | in progress of the second test etc. |

FIG. 42

| FIELD | TYPE | CONTENT |
|---|---|---|
| Second test ID | int | primary key. Unique ID assigned to each test. |
| Second test collection start date and time | date / time | start date and time of proposed solution collection session of the second test |
| Second test collection end date and time | date / time | end date and time of proposed solution collection session of the second test |
| Problem for the second test | text | display of the problem to which proposed solution should be considered by examinees in the extraction procedure |
| Second test proposed solution input conditions | text | text instructing proposed solution input conditions to examinees |
| Second test proposed solution answer time limit | int | time limit for answering proposed solutions in the second test |
| Number of answer characters | int | limit to number of characters that examinees can answer |
| Number of possible answers | int | limit to number of problems that examinees can answer |
| File attachment availability | int | whether or not a file can be attached when examinees submit an answer |
| Second test evaluation start date and time | date / time | start date and time of the second test |
| Second test evaluation end date and time | date / time | end date and time of the second test |
| Second test input conditions for proposed solution evaluation | text | text instructing input conditions when examinees evaluate a proposed solution |
| Disclose results to examinees or not | int | whether or not disclose the results to examinees |
| Number of evaluators for one proposed solution | int | time limit for answering evaluations in the second test |
| Second test evaluation answer time limit | int | number of evaluators for one proposed solution |
| Second test proposed solution evaluation axis 1 | int | content of the first proposed solution evaluation axis in the second test |
| Second test proposed solution evaluation axis 2 | int | content of the second proposed solution evaluation axis in the second test |
| : | : | : |
| Second test proposed solution evaluation axis n | int | content of the nth proposed solution evaluation axis in the second test |

FIG. 43

| FIELD | TYPE | CONTENT |
|---|---|---|
| Proposed solution ID | int | primary key |
| Examinee ID | int | ID of the examinee who has taken the second test |
| Second test ID | int | unique ID of the second test |
| Proposed solution | text | proposed solution included in the proposed solution data transmitted by the examinee (free description) |
| Score | int | score of the answer |
| Initial score for evaluation axis 1 | int | initial evaluation of the proposed solution for evaluation axis 1 |
| First corrected score for evaluation axis 1 | int | evaluation of the proposed solution for evaluation axis 1 after correction of one time |
| Second corrected score for evaluation axis 1 | int | evaluation of the proposed solution for evaluation axis 1 after correction of two times |
| Initial score for evaluation axis 2 | int | initial evaluation of the proposed solution for evaluation axis 2 |
| ... | ... | ... |
| Initial score for evaluation axis n | int | initial evaluation of the proposed solution for evaluation axis n |
| ... | ... | ... |
| Result of actually using proposed solution | int | describe the result of actually using the proposed solution (free description) |
| User ID | int | ID of the user who transmitted the usage result of the proposed solution |

FIG. 44

| FIELD | TYPE | CONTENT |
|---|---|---|
| Proposed solution evaluation ID | int | primary key |
| Proposed solution ID | int | ID of the solution to be evaluated |
| Examinee ID | int | ID of the evaluator (the examinee) |
| Second test ID | int | unique ID of the second test |
| Evaluation value for evaluation axis 1 | int | evaluation for the first proposed solution evaluation axis (e.g. 5 grades) |
| Evaluation value for evaluation axis 2 | int | evaluation for the second proposed solution evaluation axis (e.g. 5 grades) |
| ... | ... | ... |
| Evaluation value for evaluation axis n | int | evaluation for the nth proposed solution evaluation axis (e.g. 5 grades) |
| ... | ... | ... |

FIG. 45

| FIELD | TYPE | CONTENT |
|---|---|---|
| Examinee ID | int | ID of the examinee to be evaluated |
| Second test ID | int | unique ID of the second test |
| Initial score for evaluation axis 1 | int | initial evaluation of the examinee for evaluation axis 1 |
| First corrected score for evaluation axis 1 | int | evaluation of the examinee after correction of one time |
| Second corrected score for evaluation axis 1 | int | evaluation of the examinee after correction of two times |
| Initial score for evaluation axis 2 | int | initial evaluation of the examinee for evaluation axis 2 |
| ... | ... | ... |
| Initial score for evaluation axis n | int | initial evaluation of the examinee for evaluation axis n |
| ... | ... | ... |

FIG. 46

| FIELD | TYPE | CONTENT |
|---|---|---|
| Examinee ID of an evaluator | int | primary key |
| Proposed solution ID to be evaluated | int | |
| Required number of evaluations | int | |
| Number of completed evaluations | int | |

FIG. 47

| FIELD | TYPE | CONTENT |
|---|---|---|
| Organization ID | int | parimary key |
| Organization name | text | |
| Kana character of organization | text | |
| Zip code number | int | |
| Address | text | |
| Person in charge | text | |
| Kana character of person in charge | text | |
| Department in charge | text | |
| Phone number of person in charge | int | |
| Mail address of person in charge | text | |
| Account opening date and time | date | |
| Login passsword | crypt | |
| Status | text | closed account etc. |

FIG. 48

| FIELD | TYPE | CONTENT |
|---|---|---|
| Server administrator ID | int | primary key |
| Password | crypt | |
| Account creation date and time | date | |
| Authority level | int | |
| Remarks column | text | |

FIG. 49

| FIELD | TYPE | CONTENT |
|---|---|---|
| User ID | int | primary key. Unique ID assigned to each user. |
| User name | text | name of the user |
| User login ID | text | ID that the user inputs when login to the usage page |
| User login pass | text | password that the user inputs when login to the browsing page |
| Usage authority | int | identifier indicating the range of authority to use information |

FIG. 50

PROBLEM COLLECTION/EVALUATION METHOD, PROPOSED SOLUTION COLLECTION/EVALUATION METHOD, SERVER FOR PROBLEM COLLECTION/EVALUATION, SERVER FOR PROPOSED SOLUTION COLLECTION/EVALUATION, AND SERVER FOR COLLECTION/EVALUATION OF PROBLEM AND PROPOSED SOLUTION THERETO

The present application is a US national phase application of International Application No. PCT/JP2020/002008, filed on Jan. 21, 2020, which claims priority to Japan Patent Application No. 2019-008088, filed Jan. 21, 2019; all of which is incorporated by reference herein in its entirety.

FIELD OF THE INVENTION

The present invention relates to a method for collecting and evaluating problems online, and a method for collecting and evaluating proposed solutions online. Further, the present invention relates to a server for collecting and evaluating problems online, and a server for collecting and evaluating proposed solutions online, and a server for collecting and evaluating problems and proposed solutions thereto online.

BACKGROUND OF THE INVENTION

In recent years, the popularization of internet access has caused various types of tests, including those for qualifications and job screening, to be held online. Such online tests usually involve examinees receiving the exam questions at their own devices from a server and sending answers that they have input to the server.

For example, Japanese Patent Application Publication No. 2002-62795 discloses a test system for providing examinees with questions in a designated question format, collecting answers to the questions and providing results of scoring or analyzing. It is disclosed that the system comprises a step of providing the examinees with a program for questioning including the questions and a transfer file for returning answers to the questions, a step of receiving the transfer file returned from the examinees, a step of scoring and analyzing the answers included in the transfer file, and a step of sending to the examinees the results of the scoring and analyzing of the answers.

However, up till now, in most tests including online tests for measuring human's knowledges and abilities, model answers have been prepared regardless of whether the test itself involves multiple-choice or descriptive answers and traditionally, procedures of comparing the answers of the examinees with the model answers have been used in order to evaluate the examinees. However, it is difficult for such a traditional scoring procedure to evaluate examinees for questions without model answers.

Accordingly, Japanese Patent Application Publication No. 2014-500532 proposes a system wherein examinees evaluate each other's answers for questions without a model answer. It is disclosed that a system comprises a storage device resident in a computer and a processor provided in communication with the storage device, the processor configured to request a candidate author to create a question based on a subject; to receive the question from the candidate; to request an evaluation of the question and the subject from at least one assessor; to receive a question score from each assessor, wherein the question score is an objective index of the evaluation of the question and the subject; to receive a grade for each assessor; and to calculate a grade for the candidate based on the question score from each assessor and the grade for each assessor.

In addition, in WO 2017/145765, there is disclosed an online test method that enables simple and objective measurement of each examinee's idea creativity by determining the assessment skills of each examinee and reflecting the result in each examinee's evaluation. Specifically, there is disclosed an online test method in which an online test is conducted in which a large number of examinees were asked to select a situation setting related to 5W1H from the options and to describe their ideas as much as possible within the time limit, and by weighting the answers from the examinees according to a predetermined standard and calculating the total score, the innovation ability is evaluated such as the ability to create many highly rated ideas, the ability to create a wide range of highly rated ideas, or the ability to create rare and highly rated ideas.

CITATION LIST

Patent Literature

[Patent Literature 1] Japanese Patent Application Publication No. 2002-62795
[Patent Literature 2] Japanese Patent Application Publication No. 2014-500532
[Patent Literature 3] WO 2017/145765

SUMMARY OF THE INVENTION

Among the world, there are various problems in various fields such as politics, economy, society, industry, science, and environment. Also, within a company, there are various problems in various departments such as human resources, labor, education, accounting, legal affairs, corporate planning, technological development, security, information management, marketing, and sales. There are many such problems, including those that are already known, those that are potentially predicted to exist, and those that are not yet recognized. In modern society, although various solutions to existing problems have been proposed from the past to the present, and a wide variety of information on problems and solutions can be obtained due to the spread of the Internet, the amount of information available is growing, becoming more complex and sophisticated every day, and such information also includes inaccurate, incorrect, and even fraudulent information. Therefore, there is even a risk of causing confusion in society.

In other words, in the modern information society, it is not easy to select and obtain highly reliable and accurate information from a huge amount of information. Therefore, even though an optimum solution already exists in the world for a certain problem, it may not be possible to easily reach such an optimum solution. In addition, even though it is a problem that someone in the world has already recognized or potentially recognized, it is possible that society as a whole cannot share the existence of the problem. Finding the optimal solution to such problems is even more difficult because there are not any solutions, or few solutions even if there are.

A similar situation can exist even in a small organization such as a company. In other words, if information is not sufficiently shared within a company, an inefficient situation may occur in which problems that should have been solved in the past must be tackled from the beginning. It is also possible that a company may not be able to share the existence of a problem that some of its employees have already recognized or potentially recognized. If the problems are not sufficiently shared within the company, there will be no opportunity to consider solutions to the problems. There are also problems that should be prevented before they become visible, it is extremely important in corporate activities to quickly grasp the problems and the solutions thereto.

The above-mentioned online test methods, particularly the online test method described in Patent Literature 3, are excellent as methods for evaluating an individual's idea creativity. However, there is a lack of consideration from the perspective of improving the availability of information by collecting and evaluating a wide variety of problems and collecting a wide variety of proposed solutions efficiently online, and stocking the collected and evaluated problems and proposed solutions together with the evaluation of value. If the information is stocked along with the evaluation of value, it will be easier to access more reliable information.

Therefore, it is an object of the present invention to provide a method for collecting and evaluating problems that can be efficiently performed online. Further, it is another object of the present invention to provide a method for collecting and evaluating proposed solutions that can be efficiently performed online. Further, it is yet another object of the present invention to provide a server for efficiently performing collection and evaluation of problems online. Further, it is yet another object of the present invention to provide a server for efficiently performing collection and evaluation of proposed solutions online. Further, it is yet another object of the present invention to provide a server for efficiently performing collection and evaluation of problems and proposed solutions thereto online.

The present inventor has conducted diligent studies to solve the above problems, and as a result, it has been noted that those who are aware of a problem or can propose a potential problem are not necessarily the same as those who are aware of a solution or can propose a solution to a given problem. For example, an employee may have discovered a problem in the workplace but cannot find a valid solution to it. In addition, some employees may not be aware of such problem in the workplace, but may be able to propose effective solutions if the problem is raised to them. In other words, it is easier to collect a wide variety of problems and a wide variety of proposed solutions thereto if the collection and evaluation of problems are carried out separately from the collection and evaluation of proposed solutions.

The present invention has been completed based on the above findings, and is exemplified as below.

[1]

A method for collecting and evaluating problems, comprising:
- a step in which a server receives an instruction to start a first test from a test administrator terminal via a network;
- a step in which the server extracts a first format data for problem input including at least one descriptive problem input section from a first format data storage part in response to the instruction to start the first test, and transmit the first format data to each of a plurality of examinee terminals in the first test via the network;
- a step in which the server receives a problem data including a problem in the descriptive problem input section input by each examinee in the first test from each of the examinee terminals in the first test;
- a step in which the server assigns an identifier to each of the received problem data including the problem, and stores the problem data in a problem data storage part in association with an identifier of each examinee in the first test who has transmitted the problem data;
- a step in which the server acquires random numbers generated by a random number generator, and uses the random numbers to determine each examinee who should evaluate the problem in each problem data stored in the problem data storage part from among the examinees in the first test;
- a step in which the server extracts the problem data including the problem to be evaluated by each examinee from the problem data storage part according to a result of the step of determining the examinee to evaluate the problem, and extracts a third format data for problem evaluation input including a selective problem evaluation input section based on at least one evaluation axis from a third format data storage part, and transmit the problem data and the third format data to a corresponding examinee terminal in the first test via the network;
- a step in which the server receives a problem evaluation data including an evaluation by the examinee in the first test of the problem in the problem data from each of the examinee terminals in the first test;
- a step in which the server assigns an identifier to each of the received problem evaluation data, and stores the problem evaluation data in a problem evaluation data storage part in association with the identifier of the examinee in the first test as an evaluator who has transmitted the problem evaluation data and the identifier of the evaluated problem data;
- a step in which the server calculates a score for each problem for each evaluation axis by aggregating the evaluation of the problem in each problem data based on each problem evaluation data stored in the problem evaluation data storage part and the identifier of the problem data, and store the score in the problem data storage part in association with the identifier of the examinee in the first test who has transmitted the problem data including the problem; and
- a step in which the server extracts a problem evaluation aggregated data including each problem and the score for each problem for each evaluation axis stored in the problem data storage part, and transmits the problem evaluation aggregated data to the test administrator terminal via the network.

[2]

The method for collecting and evaluating problems according to [1], wherein the first format data for problem input is transmitted along with a problem input condition stored in a first test information storage part.

[3]

The method for collecting and evaluating problems according to [1] or [2], wherein the at least one evaluation axis comprises at least one of occurrence frequency, potential, importance and urgency.

[4]

The method for collecting and evaluating problems according to any one of [1] to [3], wherein the at least one evaluation axis comprises two or more evaluation axes.

[5]

The method for collecting and evaluating problems according to [4], wherein the at least one evaluation axis comprises two or more evaluation axes selected from a group consisting of occurrence frequency, potential, importance, and urgency.

[6]

The method for collecting and evaluating problems according to any one of [1] to [5], comprising a step in which the server creates a statistical graph by plotting a combination of scores based on two or more evaluation axes assigned to each problem in a coordinate system of two or more dimensions based on each problem and the scores for each problem for each evaluation axis stored in the problem data storage part, and transmit data of the statistical graph to the test administrator terminal via the network.

[7]

A method for collecting and evaluating proposed solutions, comprising:
 a step in which a server receives at least one problem to be solved selected from a plurality of problems in a problem data stored in a problem data storage part from a test administrator terminal via a network;
 a step in which the server receives an instruction to start a second test from the test administrator terminal via the network;
 a step in which the server extracts the problem data including the at least one problem to be solved from the problem data storage part and extracts a second format data for inputting a proposed solution to the at least one problem to be solved including at least one descriptive proposed solution input section from a second format data storage part in response to the instruction to start the second test, and transmit the problem data and the second format data to each of a plurality of examinee terminals in the second test via the network;
 a step in which the server receives a proposed solution data including a proposed solution to the at least one problem to be solved by the examinee in the second test from each of the examinee terminals in the second test;
 a step in which the server assigns an identifier to each of the received proposed solution data including the proposed solution, and stores the proposed solution data in a proposed solution data storage part in association with an identifier of the examinee in the second test who has transmitted the proposed solution data;
 a step in which the server acquires random numbers generated by a random number generator, and uses the random numbers to determine each examinee who should evaluate the proposed solution in each proposed solution data stored in the proposed solution data storage part from among the examinees in the second test;
 a step in which the server extracts the proposed solution data including the proposed solution to be evaluated by each examinee from the proposed solution data storage part according to a result of the step of determining the examinees to evaluate the proposed solution, and extracts a fourth format data for proposed solution evaluation input including a selective proposed solution evaluation input section based on at least one evaluation axis from a fourth format data storage part, and transmit the proposed solution data and the fourth format data to a corresponding examinee terminal in the second test via the network;
 a step in which the server receives a proposed solution evaluation data including an evaluation by the examinee in the second test of the proposed solution in the proposed solution data from each of the examinee terminals in the second test;
 a step in which the server assigns an identifier to each of the received proposed solution evaluation data, and stores the proposed solution evaluation data in a proposed solution evaluation data storage part in association with the identifier of the examinee in the second test as an evaluator who has transmitted the proposed solution evaluation data and the identifier of the evaluated proposed solution data;
 a step in which the server calculates a score for each proposed solution for each evaluation axis by aggregating the evaluation of the proposed solution in each proposed solution data based on each proposed solution evaluation data and the identifier of the proposed solution data stored in the proposed solution evaluation data storage part, and stores the score in the proposed solution data storage part in association with the identifier of the examinee in the second test who has transmitted the proposed solution data including the proposed solution; and
 a step in which the server extracts a proposed solution evaluation aggregated data including each proposed solution and the score for each proposed solution for each evaluation axis stored in the proposed solution data storage part, and transmits the proposed solution evaluation aggregated data to the test administrator terminal via the network.

[8]

The method for collecting and evaluating proposed solutions according to [7], wherein the second format data for proposed solution input is transmitted along with a proposed solution input condition stored in a second test information storage part.

[9]

The method for collecting and evaluating proposed solutions according to [7] or [8], wherein the at least one evaluation axis comprises at least one of effect, feasibility, and novelty.

[10]

The method for collecting and evaluating proposed solutions according to any one of [7] to [9], wherein the at least one evaluation axis comprises two or more evaluation axes.

[11]

The method for collecting and evaluating proposed solutions according to [10], wherein the at least one evaluation axis comprises two or more evaluation axes selected from a group consisting of effect, feasibility, and novelty.

[12]

The method for collecting and evaluating proposed solutions according to any one of [7] to [11], comprising a step in which the server creates a statistical graph by plotting a combination of scores based on two or more evaluation axes assigned to each proposed solution in a coordinate system of two or more dimensions based on each proposed solution and the scores for each proposed solution for each evaluation axis stored in the proposed solution data storage part, and transmit data of the statistical graph to the test administrator terminal via the network.

[13]

The method for collecting and evaluating proposed solutions according to any one of [7] to [12], wherein the problem data storage part stores the problem data collected by carrying out the method for collecting and evaluating problems according to any one of [1] to [6].

[14]

The method for collecting and evaluating problems according to any one of [1] to [6], further comprising:
- a step in which the server calculates an acquired score for each evaluation axis for each identifier of the examinee in the first test who has transmitted the problem data at least partially based on the score for the problem for each evaluation axis stored in the problem data storage part in association with the identifier of the problem data and the identifier of the examinee in the first test who has transmitted the problem data, and stores the acquired score in a first test examinee evaluation data storage part in association with the identifier of the examinee in the first test who has transmitted the problem data; and
- a step in which the server ranks each examinee in the first test based on the identifier of the examinee in the first test and the acquired score associated with the identifier of the examinee, and re-aggregates and scores the evaluation of the problem for each evaluation axis for each identifier of the problem data to obtain a corrected score on condition that a higher weight is given to the evaluation as the evaluation is associated with the identifier of a higher-ranked examinee, and stores the obtained corrected score for each evaluation axis in the problem data storage part in association with the identifier of the problem data.

[15]

The method for collecting and evaluating problems according to [14], comprising repeating at least once:
- a step in which the server calculates a corrected acquired score for each examinee for each evaluation axis in the first test based on the corrected score given to each problem for each evaluation axis and the identifier of the examinee in the first test stored in the problem data storage part, and stores the corrected acquired score in the first test examinee evaluation data storage part in association with the identifier of the examinee in the first test; and
- a step in which the server ranks each examinee in the first test based on the identifier of the examinee in the first test and the corrected acquired score associated with the identifier of the examinee, and re-aggregates and scores the evaluation of the problem for each evaluation axis for each identifier of the problem data to obtain a corrected score on condition that a higher weight is given to the evaluation as the evaluation is associated with the identifier of a higher-ranked examinee, and stores the obtained corrected score for each evaluation axis in the problem data storage part in association with the identifier of the problem data.

[16]

The method for collecting and evaluating problems according to [14] or [15], wherein the acquired score for each identifier of the examinee in the first test is a maximum score of the evaluation for each problem associated with the identifier of the examinee for each evaluation axis.

[17]

The method for collecting and evaluating problems according to [14] or [15], wherein the acquired score for each identifier of the examinee in the first test is a total score of the evaluation for each problem associated with the identifier of the examinee for each evaluation axis.

[18]

The method for collecting and evaluating proposed solutions according to any one of [7] to [13], further comprising:
- a step in which the server calculates an acquired score for each evaluation axis for each identifier of the examinee in the second test who has transmitted the proposed solution data at least partially based on the score for the proposed solution for each evaluation axis stored in the proposed solution data storage part in association with the identifier of the proposed solution data and the identifier of the examinee in the second test who has transmitted the proposed solution data, and stores the acquired score in a second test examinee evaluation data storage part in association with the identifier of the examinee in the second test who has transmitted the proposed solution data; and
- a step in which the server ranks each examinee in the second test based on the identifier of the examinee in the second test and the acquired score associated with the identifier of the examinee, and re-aggregates and scores the evaluation of the proposed solution for each evaluation axis for each identifier of the proposed solution data to obtain a corrected score on condition that a higher weight is given to the evaluation as the evaluation is associated with the identifier of a higher-ranked examinee, and stores the obtained corrected score for each evaluation axis in the proposed solution data storage part in association with the identifier of the proposed solution data.

[19]

The method for collecting and evaluating proposed solutions according to [18], comprising repeating at least once:
- a step in which the server calculates a corrected acquired score for each examinee for each evaluation axis in the second test based on the corrected score given to each proposed solution for each evaluation axis and the identifier of the examinee in the second test stored in the proposed solution data storage part, and stores the corrected acquired score in the second test examinee evaluation data storage part in association with the identifier of the examinee in the second test; and
- a step in which the server ranks each examinee in the second test based on the identifier of the examinee in the second test and the corrected acquired score associated with the identifier of the examinee, and re-aggregates and scores the evaluation of the proposed solution for each evaluation axis for each identifier of the proposed solution data to obtain a corrected score on condition that a higher weight is given to the evaluation as the evaluation is associated with the identifier of a higher-ranked examinee, and stores the obtained corrected score for each evaluation axis in the proposed solution data storage part in association with the identifier of the proposed solution data.

[20]

The method for collecting and evaluating proposed solutions according to [18] or [19], wherein the acquired score for each identifier of the examinee in the second test is a maximum score of the evaluation for each proposed solution associated with the identifier of the examinee for each evaluation axis.

[21]

The method for collecting and evaluating proposed solutions according to [18] or [19], wherein the acquired score for each identifier of the examinee in the second test is a total score of the evaluation for each proposed solution associated with the identifier of the examinee for each evaluation axis.

[22]

The method for collecting and evaluating proposed solutions according to any one of [7] to [13], [18] to [21], further comprising:

a step in which the server receives a search request for a problem and a proposed solution thereto from a terminal with usage authority via the network, wherein the problem data collected by carrying out the method for collecting and evaluating problems according to any one of [1] to [6] and [14] to [17] is stored in the problem data storage part in the server, and the problem evaluation data collected by carrying out the method for collecting and evaluating problems according to any one of [1] to [6] and [14] to [17] is stored in the problem evaluation data storage part in the server; and a step in which the server searches at least one of the problem data storage part, the problem evaluation data storage part, the proposed solution data storage part and the proposed solution evaluation data storage part, and transmits a search result including the problem and the proposed solution thereto matching the search request to the terminal with usage authority via the network.

[23]

The method for collecting and evaluating proposed solutions according to [22], wherein the search result includes one or both of the score for the problem for each evaluation axis and the score for the proposed solution for each evaluation axis.

[24]

A server for collecting and evaluating problems, comprising a transceiver, a control unit, a storage unit, and a random number generator, the storage unit comprising:

a first test examinee account data storage part for storing an account information of each examinee in a first test in association with an identifier of the examinee;

a first format data storage part for storing a first format data for problem input including at least one descriptive problem input section;

a third format data storage part for storing a third format data for problem evaluation input including a selective problem evaluation input section based on at least one evaluation axis;

a problem data storage part for storing a problem data including a problem in the descriptive problem input section input by each examinee in the first test received by the transceiver, and an identifier of the problem data, in association with the identifier of the examinee in the first test who has transmitted the problem data; and a problem evaluation data storage part for storing a problem evaluation data including an evaluation by the examinee of each problem received by the transceiver, and an identifier of the problem evaluation data, in association with the identifier of the examinee in the first test as an evaluator who has transmitted the problem evaluation data and the identifier of the evaluated problem data;

the control unit comprising a data registration part, a problem input format extraction part, an evaluator determination part, a problem extraction part, a problem evaluation part, and a problem evaluation extraction part, wherein:

the data registration part is configured to assign an identifier to each of the problem data received at the transceiver and store the problem data in the problem data storage part in association with the identifier of the examinee in the first test who has transmitted the problem data, and is configured to assign an identifier to each of the problem evaluation data received at the transceiver and store the problem evaluation data in the problem evaluation data storage part in association with the identifier of the examinee in the first test as an evaluator who has transmitted the problem evaluation data and the identifier of the evaluated problem data;

the problem input format extraction part is configured to extract the first format data for problem input from the first format data storage part and transmit the first format data to each of a plurality of examinee terminals in the first test from the transceiver via a network when the transceiver receives an instruction from a test administrator terminal;

the evaluator determination part is configured to acquire random numbers generated by the random number generator, and uses the random numbers to determine each examinee who should evaluate the problem in each problem data stored in the problem data storage part by associating the identifier of the examinee in the first test as an evaluator with each identifier of the problem data when the transceiver receives an instruction from the test administrator terminal;

the problem extraction part is configured to extract the problem data including the problem to be evaluated by each examinee based on the identifier of the problem data and the identifier of the examinee in the first test as an evaluator associated with the identifier of the problem data according to the determination of the examinee for evaluation by the evaluator determination part, and is configured to extract the third format data for problem evaluation input from the third format data storage part, and transmit the problem data and the third format data to a corresponding examinee terminal in the first test from the transceiver via the network;

the problem evaluation part is configured to calculate a score for each problem for each evaluation axis by aggregating the evaluation of the problem in each problem data based on each problem evaluation data stored in the problem evaluation data storage part and the identifier of the problem data, and store the obtained score in the problem data storage part in association with the identifier of the problem data; and the problem evaluation extraction part is configured to extract a problem evaluation aggregated data including each problem and the score for each problem for each evaluation axis stored in the problem data storage part, and transmit the problem evaluation aggregated data to the test administrator terminal via the network.

[25]

A server for collecting and evaluating proposed solutions, comprising a transceiver, a control unit, a storage unit, and a random number generator, the storage unit comprising:

a second examinee account data storage part for storing an account information of each examinee in a second test in association with an identifier of the examinee;

a second format data storage part for storing a second format data for proposed solution input including at least one descriptive proposed solution input section;

a fourth format data storage part for storing a fourth format data for proposed solution evaluation input including a selective proposed solution evaluation input section based on at least one evaluation axis;

a problem data storage part for storing a problem data including a plurality of problems;

a proposed solution data storage part for storing a proposed solution data including a proposed solution in the descriptive proposed solution input section input by each examinee in the second test received by the transceiver, and an identifier of the proposed solution data, in association with the identifier of the examinee in the second test who has transmitted the proposed solution data; and a proposed solution evaluation data storage part for storing a proposed solution evaluation data including an evaluation by the examinee of each proposed solution received by the transceiver, and an identifier of the proposed solution evaluation data, in association with the identifier of the examinee in the second test as an evaluator who has transmitted the proposed solution evaluation data and the identifier of the evaluated proposed solution data;

the control unit comprising a data registration part, a proposed solution input format extraction part, an evaluator determination part, a proposed solution extraction part, a proposed solution evaluation part, and a proposed solution evaluation extraction part, wherein:

the data registration part is configured to assign an identifier to each of the proposed solution data received at the transceiver and store the proposed solution data in the proposed solution data storage part in association with the identifier of the examinee in the second test who has transmitted the proposed solution data, and is configured to assign an identifier to each of the proposed solution evaluation data received at the transceiver and store the proposed solution evaluation data in the proposed solution evaluation data storage part in association with the identifier of the examinee in the second test as an evaluator who has transmitted the proposed solution evaluation data and the identifier of the evaluated proposed solution data;

the proposed solution input format extraction part is configured to extract the problem data including at least one problem to be solved selected from a plurality of problems in the problem data from the problem data storage part, and extract the second format data for proposed solution input from the second format data storage part, and transmit them to each of a plurality of examinee terminals in the second test from the transceiver via the network when the transceiver receives an instruction from a test administrator terminal;

the evaluator determination part is configured to acquire random numbers generated by the random number generator, and uses the random numbers to determine each examinee who should evaluate the proposed solution in each proposed solution data stored in the proposed solution data storage part by associating the identifier of the examinee in the second test as an evaluator with each identifier of the proposed solution data when the transceiver receives an instruction from the test administrator terminal;

the proposed solution extraction part is configured to extract the proposed solution data including the proposed solution to be evaluated by each examinee based on the identifier of the proposed solution data and the identifier of the examinee in the second test as an evaluator associated with the identifier of the proposed solution data according to the determination of the examinee for evaluation by the evaluator determination part, and is configured to extract the fourth format data for proposed solution evaluation input from the fourth format data storage part, and transmit the proposed solution data and the fourth format data to a corresponding examinee terminal in the second test from the transceiver via the network;

the proposed solution evaluation part is configured to calculate a score for each evaluation axis for each proposed solution by aggregating the evaluation of the proposed solution in each proposed solution data based on each proposed solution evaluation data stored in the proposed solution evaluation data storage part and the identifier of the proposed solution data, and store the obtained score in the proposed solution data storage part in association with the identifier of the proposed solution data; and the proposed solution evaluation extraction part is configured to extract a proposed solution evaluation aggregated data including each proposed solution and the score for each proposed solution for each evaluation axis stored in the proposed solution data storage part, and transmit the proposed solution evaluation aggregated data to the test administrator terminal via the network.

[26]

A server for collecting and evaluating problems and proposed solutions thereto, comprising a transceiver, a control unit, a storage unit, and a random number generator, the storage unit comprising:

a first test examinee account data storage part for storing an account information of each examinee in a first test in association with an identifier of the examinee;

a second examinee account data storage part for storing an account information of each examinee in a second test in association with an identifier of the examinee;

a first format data storage part for storing a first format data for problem input including at least one descriptive problem input section;

a second format data storage part for storing a second format data for proposed solution input including at least one descriptive proposed solution input section;

a third format data storage part for storing a third format data for problem evaluation input including a selective problem evaluation input section based on at least one evaluation axis;

a fourth format data storage part for storing a fourth format data for proposed solution evaluation input including a selective proposed solution evaluation input section based on at least one evaluation axis;

a problem data storage part for storing a problem data including a problem in the descriptive problem input section input by each examinee in the first test received by the transceiver, and an identifier of the problem data, in association with the identifier of the examinee in the first test who has transmitted the problem data;

a proposed solution data storage part for storing a proposed solution data including a proposed solution in the descriptive proposed solution input section input by each examinee in the second test received by the transceiver, and an identifier of the proposed solution data, in association with the identifier of the examinee in the second test who has transmitted the proposed solution data;

a problem evaluation data storage part for storing a problem evaluation data including an evaluation by the examinee of each problem received by the transceiver, and an identifier of the problem evaluation data, in association with the identifier of the examinee in the first test as an evaluator who has transmitted the problem evaluation data and the identifier of the evaluated problem data; and a proposed solution evaluation data storage part for storing a proposed solution evaluation data including an evaluation by the examinee of each proposed solution received by the transceiver, and an identifier of the proposed solution evaluation data, in association with the identifier of the examinee in the second test as an evaluator who has transmitted the proposed solution evaluation data and the identifier of the evaluated proposed solution data;

the control unit comprising a data registration part, a problem input format extraction part, a proposed solution input format extraction part, an evaluator determination part, a problem extraction part, a proposed solution extraction part, a problem evaluation part, a proposed solution evaluation part, a problem evaluation extraction part, and a proposed solution evaluation extraction part, wherein:

the data registration part is configured to assign an identifier to each of the problem data received at the transceiver and store the problem data in the problem data storage part in association with the identifier of the examinee in the first test who has transmitted the problem data, and is configured to assign an identifier to each of the problem evaluation data received at the transceiver and store the problem evaluation data in the problem evaluation data storage part in association with the identifier of the examinee in the first test as an evaluator who has transmitted the problem evaluation data and the identifier of the evaluated problem data;

the data registration part is further configured to assign an identifier to each of the proposed solution data received at the transceiver and store the proposed solution data in the proposed solution data storage part in association with the identifier of the examinee in the second test who has transmitted the proposed solution data, and is configured to assign an identifier to each of the proposed solution evaluation data received at the transceiver and store the proposed solution evaluation data in the proposed solution evaluation data storage part in association with the identifier of the examinee in the second test as an evaluator who has transmitted the proposed solution evaluation data and the identifier of the evaluated proposed solution data;

the problem input format extraction part is configured to extract the first format data for problem input from the first format data storage part and transmit the first format data to each of a plurality of examinee terminals in the first test from the transceiver via a network when the transceiver receives an instruction from a test administrator terminal;

the proposed solution input format extraction part is configured to extract the problem data including at least one problem to be solved from the problem data storage part, and extract the second format data for proposed solution input from the second format data storage part, and transmit the problem data and the second format data to each of a plurality of examinee terminals in the second test from the transceiver via the network when the transceiver receives an instruction from a test administrator terminal;

the evaluator determination part is configured to acquire random numbers generated by the random number generator, and uses the random numbers to determine each examinee who should evaluate the problem in each problem data stored in the problem data storage part by associating the identifier of the examinee in the first test as an evaluator with each identifier of the problem data when the transceiver receives an instruction from the test administrator terminal;

further, the evaluator determination part is configured to acquire random numbers generated by the random number generator, and uses the random numbers to determine each examinee who should evaluate the proposed solution in each proposed solution data stored in the proposed solution data storage part by associating the identifier of the examinee in the second test as an evaluator with each identifier of the proposed solution data when the transceiver receives an instruction from the test administrator terminal;

the problem extraction part is configured to extract the problem data including the problem to be evaluated by each examinee based on the identifier of the problem data and the identifier of the examinee in the first test as an evaluator associated with the identifier of the problem data according to the determination of the examinees for evaluation by the evaluator determination part, and is configured to extract the third format data for problem evaluation input from the third format data storage part, and transmit the problem data and the third format data to a corresponding examinee terminal in the first test from the transceiver via the network;

the proposed solution extraction part is configured to extract the proposed solution data including the proposed solution to be evaluated by each examinee based on the identifier of the proposed solution data and the identifier of the examinee in the second test as an evaluator associated with the identifier of the proposed solution data according to the determination of the examinees for evaluation by the evaluator determination part, and is configured to extract the fourth format data for proposed solution evaluation input from the fourth format data storage part, and transmit the proposed solution data and the fourth format data to a corresponding examinee terminal in the second test from the transceiver via the network;

the problem evaluation part is configured to calculate a score for each problem for each evaluation axis by aggregating the evaluation of the problem in each problem data based on each problem evaluation data stored in the problem evaluation data storage part and the identifier of the problem data, and store the obtained score in the problem data storage part in association with the identifier of the problem data;

the proposed solution evaluation part is configured to calculate a score for each evaluation axis for each proposed solution by aggregating the evaluation of the proposed solution in each proposed solution data based on each proposed solution evaluation data stored in the proposed solution evaluation data storage part and the identifier of the proposed solution data, and store the obtained score in the proposed solution data storage part in association with the identifier of the proposed solution data;

the problem evaluation extraction part is configured to extract a problem evaluation aggregated data including each problem and the score for each problem for each evaluation axis stored in the problem data storage part, and transmit the problem evaluation aggregated data to the test administrator terminal via the network; and the proposed solution evaluation extraction part is configured to extract a proposed solution evaluation aggregated data including each proposed solution and the score for each evaluation axis for each proposed solution stored in the proposed solution data storage part, and transmit the proposed solution evaluation aggregated data to the test administrator terminal via the network.

[27]

The server for collecting and evaluating problems according to [24], wherein:

the storage unit further comprises a first test examinee evaluation data storage part for storing an acquired score for the examinee in the first test in association with the identifier of the examinee;

the control unit further comprises a first test examinee evaluation part which is configured to calculate the acquired score for each evaluation axis for each identifier of the examinee in the first test who has transmitted the problem data at least partially based on the score for the problem for each evaluation axis stored in the problem data storage part in association with the identifier of the problem data and the identifier of the examinee in the first test who has transmitted the problem data, and is configured to store the acquired score in the first test examinee evaluation data storage part in association with the identifier of the examinee in the first test who has transmitted the problem data; and the problem evaluation part is further configured to rank each examinee in the first test based on the identifier of the examinee in the first test and the acquired score associated with the identifier of the examinee, and re-aggregate and score the evaluation of the problem for each evaluation axis for each identifier of the problem data to obtain a corrected score on condition that a higher weight is given to the evaluation as the evaluation is associated with the identifier of a higher-ranked examinee, and is configured to store the obtained corrected score for each evaluation axis in the problem data storage part in association with the identifier of the problem data.

[28]

The server for collecting and evaluating problems according to [24], or the server for collecting and evaluating problems and proposed solutions thereto according to [26], wherein the problem evaluation extraction part is configured to create a keyword map in which at least one of a size and a color of a keyword is changed based on at least the number of appearances of the keyword included in each problem stored in the problem data storage part, and transmit the keyword map to the test administrator terminal in a displayable form via the network.

[29]

The server for collecting and evaluating problems according to [24], or the server for collecting and evaluating problems and proposed solutions thereto according to [26], wherein the problem evaluation extraction part is configured to extract the problem evaluation aggregated data for the problem including a keyword from each problem stored in the problem data storage part, and transmit the problem evaluation aggregated data to the test administrator terminal in a displayable form via the network when the keyword on a keyword map is selected,

[30]

The server for collecting and evaluating proposed solutions according to [25], or the server for collecting and evaluating problems and proposed solutions thereto according to [26], wherein the proposed solution evaluation extraction part is configured to create a keyword map in which at least one of a size and a color of a keyword is changed based on at least the number of appearances of the keyword included in each proposed solution stored in the proposed solution data storage part, and transmit the keyword map to the test administrator terminal in a displayable form via the network.

[31]

The server for collecting and evaluating proposed solutions according to [25], or the server for collecting and evaluating problems and proposed solutions thereto according to [26], wherein the proposed solution evaluation extraction part is configured to extract the proposed solution evaluation aggregated data for the proposed solution including a keyword from each proposed solution stored in the proposed solution data storage part, and transmit the proposed solution evaluation aggregated data to the test administrator terminal in a displayable form via the network when the keyword on a keyword map is selected.

[32]

The server for collecting and evaluating problems and proposed solutions thereto according to [26], wherein:

the storage unit further comprises a first test examinee evaluation data storage part for storing an acquired score for the examinee in the first test in association with the identifier of the examinee;

the control unit further comprises a first test examinee evaluation part which is configured to calculate the acquired score for each evaluation axis for each identifier of the examinee in the first test who has transmitted the problem data at least partially based on the score for the problem for each evaluation axis stored in the problem data storage part in association with the identifier of the problem data and the identifier of the examinee in the first test who has transmitted the problem data, and is configured to store the acquired score in the first test examinee evaluation data storage part in association with the identifier of the examinee in the first test who has transmitted the problem data; and the problem evaluation part is further configured to rank each examinee in the first test based on the identifier of the examinee in the first test and the acquired score associated with the identifier of the examinee, and re-aggregate and score the evaluation of the problem for each evaluation axis for each identifier of the problem data to obtain a corrected score on condition that a higher weight is given to the evaluation as the evaluation is associated with the identifier of a higher-ranked examinee, and is configured to store the obtained corrected score for each evaluation axis in the problem data storage part in association with the identifier of the problem data.

[33]

The server for collecting and evaluating problems according to [24], or the server for collecting and evaluating problems and proposed solutions thereto according to [26], wherein the acquired score for each identifier of the examinee in the first test is a maximum score of the evaluation for each problem associated with the identifier of the examinee for each evaluation axis.

[34]

The server for collecting and evaluating problems according to [24], or the server for collecting and evaluating problems and proposed solutions thereto according to [26], wherein the acquired score for each identifier of the examinee in the first test is a total score of the evaluation for each problem associated with the identifier of the examinee for each evaluation axis.

[35]

The server for collecting and evaluating proposed solutions according to [25], wherein:

the storage unit further comprises a second test examinee evaluation data storage part for storing an acquired score for each examinee in the second test in association with the identifier of the examinee;

the control unit further comprises a second test examinee evaluation part which is configured to calculate the acquired score for each evaluation axis for each identifier of the examinee in the second test who has transmitted the proposed solution data at least partially based on the score for the proposed solution for each evaluation axis stored in the proposed solution data storage part in association with the identifier of the proposed solution data and the identifier of the examinee in the second test who has transmitted the proposed solution data, and is configured to store the acquired score in the second test examinee evaluation data storage part in association with the identifier of the examinee in the second test who has transmitted the proposed solution data; and the proposed solution evaluation part is further configured to rank each examinee in the second test based on the identifier of the examinee in the second test and the acquired score associated with the identifier of the examinee, and re-aggregate and score the evaluation of the proposed solution for each evaluation axis for each identifier of the proposed solution data to obtain a corrected score on condition that a higher weight is given to the evaluation as the evaluation is associated with the identifier of a higher-ranked examinee, and is configured to store the obtained corrected score in the proposed solution data storage part in association with the identifier of the proposed solution data.

[36]

The server for collecting and evaluating problems and proposed solutions thereto according to [26], wherein:

the storage unit further comprises a second test examinee evaluation data storage part for storing an acquired score for each examinee in the second test in association with the identifier of the examinee;

the control unit further comprises a second test examinee evaluation part which is configured to calculate the acquired score for each evaluation axis for each identifier of the examinee in the second test who has transmitted the proposed solution data at least partially based on the score for the proposed solution for each evaluation axis stored in the proposed solution data storage part in association with the identifier of the proposed solution data and the identifier of the examinee in the second test who has transmitted the proposed solution data, and is configured to store the acquired score in the second test examinee evaluation data storage part in association with the identifier of the examinee in the second test who has transmitted the proposed solution data; and the proposed solution evaluation part is further configured to rank each examinee in the second test based on the identifier of the examinee in the second test and the acquired score associated with the identifier of the examinee, and re-aggregate and score the evaluation of the proposed solution for each evaluation axis for each identifier of the proposed solution data to obtain a corrected score on condition that a higher weight is given to the evaluation as the evaluation is associated with the identifier of a higher-ranked examinee, and is configured to store the obtained corrected score in the proposed solution data storage part in association with the identifier of the proposed solution data.

[37]

The server for collecting and evaluating proposed solutions according to [25], or the server for collecting and evaluating problems and proposed solutions thereto according to [26], wherein the acquired score for each identifier of the examinee in the second test is a maximum score of the evaluation for each proposed solution associated with the identifier of the examinee for each evaluation axis.

[38]

The server for collecting and evaluating proposed solutions according to [25], or the server for collecting and evaluating problems and proposed solutions thereto according to [26], wherein the acquired score for each identifier of the examinee in the second test is a total score of the evaluation for each proposed solution associated with the identifier of the examinee for each evaluation axis.

[39]

The server for collecting and evaluating problems and proposed solutions thereto according to any one of [26], [28] to [34], [36] to [38], wherein the control unit further comprises a search part configured to search the storage unit when a search request for a problem and a proposed solution thereto is received from a terminal with usage authority via the network, and transmit a search result including the problem and the proposed solution thereto matching the search request from the transceiver to the terminal with usage authority via the network.

[40]

The server for collecting and evaluating problems and proposed solutions thereto according to [39], wherein the search result includes one or both of the score for the problem for each evaluation axis and the score for the proposed solution for each evaluation axis.

[41]

A program for causing a computer to carry out the method for collecting and evaluating problems according to any one of [1] to [6], [14] to [17].

[42]

A computer-readable storage medium storing the program according to [41].

[43]

A program for causing a computer to carry out the method for collecting and evaluating proposed solutions according to any one of [7] to [13], [18] to [23].

[44]

A computer-readable storage medium storing the program according to [43].

According to one embodiment of the present invention, it is possible to efficiently perform collection and evaluation of problems online. Further, according to another embodiment of the present invention, it is possible to efficiently perform collection and evaluation of proposed solutions online. In this way, by separately carrying out the collection and evaluation of problems and the collection and evaluation of proposed solutions for a plurality of examinees online, it is possible to easily construct a database containing a wide variety of problem data and a wide variety of proposed solution data.

In addition, by allowing the examinees to evaluate each other's problems and proposed solutions, the collected problems, proposed solutions, or both of these data can be stored in the server in a state where an objective evaluation is given. In other words, it is possible to construct a database that includes data on problems, proposed solutions, or both of these data along with evaluation of value. Further, by storing these data in the server in a searchable manner using identifiers, it is possible to significantly improve the availability of the data.

Therefore, according to one embodiment of the present invention, it is possible to easily search for a problem or a proposed solution to the problem by utilizing the data stored in the server, and the search result is accompanied by evaluation of value, and as a result, it is possible to provide useful information when obtaining information on a problem or a proposed solution to a problem and considering its application. At this time, if the evaluation of value is performed based on a plurality of evaluation axes, it becomes possible to recognize the characteristics of the problem and the proposed solution to the problem from various aspects including the advantages and disadvantages.

For example, a database containing various problems and proposed solutions as well as evaluation of value for them obtained by the present invention can be used as a shared library in a company, and also can be used as a database for management consulting and technical consulting.

BRIEF DESCRIPTION OF THE DRAWINGS

FIG. 9 is an example of a screen of a problem evaluation session on the examinee page displayed on the examinee terminal.

FIG. 10 is an example of a screen of a proposed solution evaluation session on the examinee page displayed on the examinee terminal.

FIG. 11 is an example of a first test administration screen of the test administrator page displayed on the test administrator terminal.

FIG. 12 is an example of a screen of test condition settings for a problem collection session on the test administrator page displayed on the test administrator terminal.

FIG. 13 is an example of a screen of test condition settings for a problem evaluation session on the test administrator page displayed on the test administrator terminal.

FIG. 14 is an example of a second test administration screen of the test administrator page displayed on the test administrator terminal.

FIG. 15 is an example of a screen of test condition settings for a proposed solution collection session on the test administrator page displayed on the test administrator terminal.

FIG. 16 is an example of a screen of test condition settings for a proposed solution evaluation session on the test administrator page displayed on the test administrator terminal.

FIG. 17 is an example of a screen of account information input of the test administrator on the server administrator page displayed on the server administrator terminal.

FIG. 18 shows an example of the problem evaluation aggregated data displayed on the test administrator terminal.

FIG. 23C shows an example of the proposed solution evaluation aggregated data displayed on the test administrator terminal using a keyword map.

FIG. 25 shows an example of a problem list displayed on the test administrator terminal.

FIG. 26 shows an example of a screen displayed on the user terminal including at least one descriptive proposed solution usage result input section for inputting a result when a specific proposed solution is used.

FIG. 36 shows an example of a table in which the account information of one examinee included in an examinee account file is stored.

FIG. 37 shows an example of a table in which the information about test conditions in a first test information file is stored.

FIG. 38 shows an example of a table included in a first test problem data file.

FIG. 39 shows an example of a table included in a first test problem evaluation data file.

FIG. 40 shows an example of a table included in a first test examinee evaluation data file.

FIG. 41 shows an example of a table in which the progress status included in a first test problem evaluation progress management file is stored.

FIG. 42 shows an example of a table in which the account information of one examinee included in a second test examinee account file is stored.

FIG. 43 shows an example of a table in which the information about test conditions in a second test information file is stored.

FIG. 44 shows an example of a table included in a second test proposed solution data file.

FIG. 45 shows an example of a table included in a second test proposed solution evaluation data file.

FIG. 46 shows an example of a table included in a second test examinee evaluation data file.

FIG. 47 shows an example of a table in which the progress status included in a second test proposed solution evaluation progress management file is stored.

FIG. 48 shows an example of a table in which the test administrator information in a test administrator account file is stored.

FIG. 49 shows an example of a table in which the administrator information in a test administrator account file is stored.

FIG. 50 shows an example of a table in which the user account information in a library user account file is stored.

DETAILED DESCRIPTION OF THE INVENTION

Hereinafter, embodiments of the method for collecting and evaluating problems and the method for collecting and evaluating proposed solutions according to the present invention will be described in detail with reference to the drawings, but the present invention is not limited to these embodiments.

<1. System Configuration>

Figure 1:
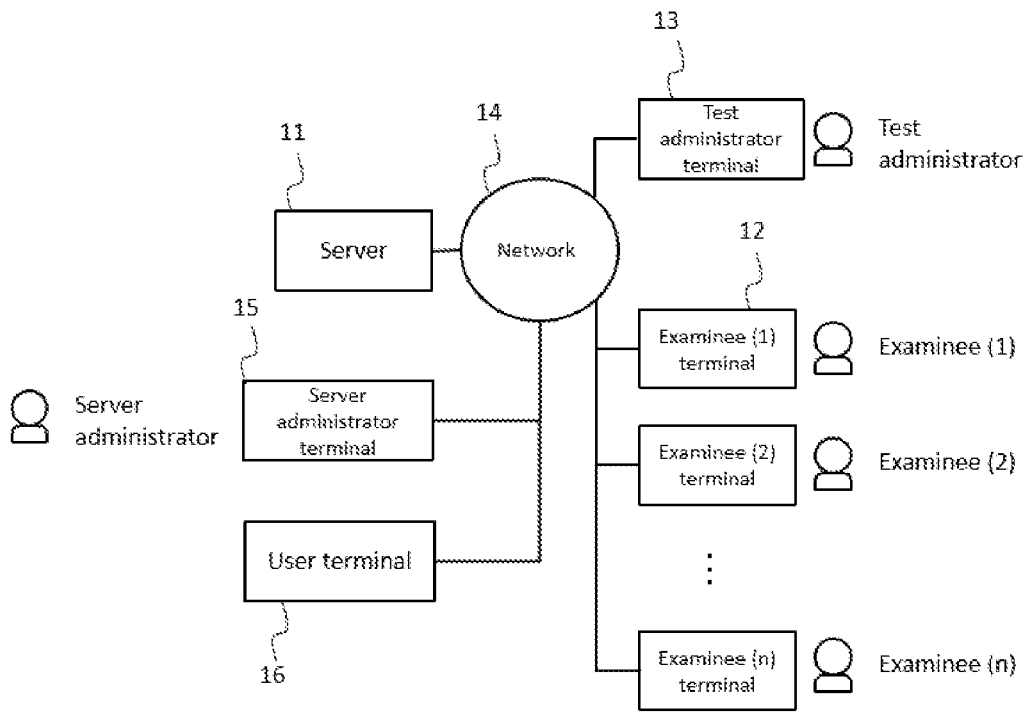
FIG. 1 shows an example of the overall configuration of an online test system according to the present invention.

FIG. 1 shows the overall configuration of an online test system for performing the method for collecting and evaluating problems according to the present embodiment. This system comprises a server 11, a plurality of examinee terminals 12 from No. 1 to No. n, a test administrator terminal 13, and a server administrator terminal 15. The examinee terminal 12, the test administrator terminal 13, and the server administrator terminal 15 are connected to the server 11 so as to be able to communicate with each other through a computer network 14 such as the Internet, a dedicated line, or a public network. The server administrator terminal 15 is not necessarily a terminal independent from the server 11, and the server 11 can also take charge of the function of the server administrator terminal 15. The system may also comprise a user terminal 16 connected to the server 11 with intercommunication through the computer network 14.

[Network]

The computer network 14 is not limited, but may be a wired network such as a LAN (Local Area Network) or a WAN (Wide Area Network), and may be a wireless network such as WLAN (Wireless Local Area Network) using MIMO (Multiple-Input Multiple-Output). Alternatively, it may be via the Internet (Internet) using a communication protocol such as TCP/IP (Transmission Control Protocol/Internet Protocol), or via a base station (not shown) that plays a role as a so-called wireless LAN access point, or the like.

A server refers to a server computer, and can be configured by one computer or the cooperation of a plurality of computers. The examinee terminal 12 and the test administrator terminal 13 can be realized by a personal computer equipped with a browser, but the present invention is not limited to this, and they may be configured by devices/equipment allowing communication through the computer network such as a portable device such as a smartphone, a tablet, a cellphone, a mobile, a PDA (personal digital assistant), and furthermore, a digital TV.

Figure 2:
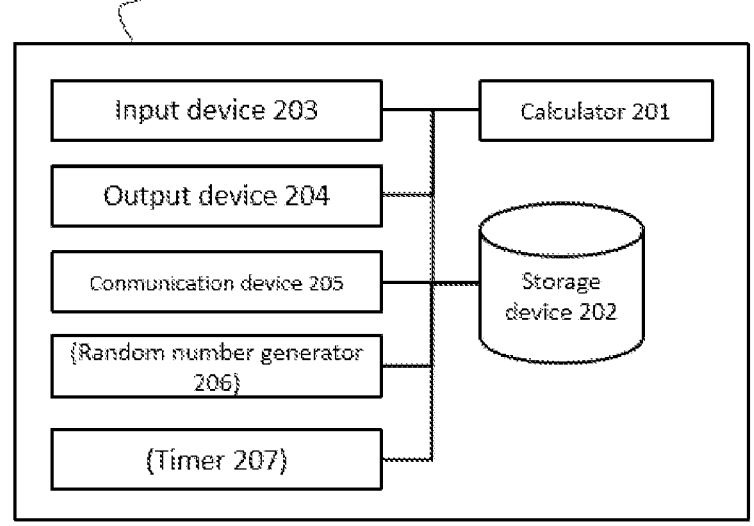
FIG. 2 shows an example of a basic hardware configurations of a server, an examinee terminal, a test administrator terminal, a server administrator terminal, and a user terminal.

The basic hardware configurations of the server 11, the examinee terminal 12, the test administrator terminal 13, and the server administrator terminal 15 are common, and as shown in FIG. 2, they may be realized by a computer 200 having a calculator 201, a storage device 202, an output device 203, an input device 204, and a communication device 205. Further, a random number generator 206 and a timer 207 may be provided as needed.

The calculator 201 refers to a device, a circuit and the like that controls the entire computer and performs processing operations according to a program based on commands, instructions and data input by the input device 204 as well as data stored in the storage device 202, and the like. As the calculator 201, CPUs (Central Processing Units), MPUs (Micro Processing Units) and the like may be adopted.

The storage device 202 refers to a device, a circuit and the like storing various forms of data, the operating system (OS), the network application (for example, a web server software for the server 11, browsers for the examinee terminal 12, the test administrator terminal 13 and the server administrator terminal 15 and programs for performing various calculation. For example, known storage devices such as a primary storage device mainly employing a semiconductor memory, a secondary (auxiliary) storage device mainly employing a hard disk and a semiconductor disk, an offline storage device mainly employing a removable media drive like CD-ROM, and a tape library may be used. More specifically, in addition to magnetic memory storage devices such as hard-disk drives, Floppy™ disks drives, zip drives and tape storages, storage devices/circuits employing semiconductor memory such as registers, cache memory, ROM, RAM, flash memory (such as USB storage devices), semiconductor disks (such as RAM disks and virtual disk drives), optical storage media such as CDs and DVDs, optical storage devices employing magneto-optical disks like MO, other storage devices such as paper tapes and punch cards, storage devices employing phase change memory technique called PRAM (Phase change RAM), holographic memory, storage devices employing 3-dimensional optical memory, storage devices employing molecular memory which stores information through accumulating electrical charge at the molecular level, etc. may all be used.

The output device 203 refers to an interface such as a device or circuit that enables output of data or commands. As the output device 203, a display such as LCD and OEL as well as a printer and a speaker, and the like can be employed.

The input device 204 refers to an interface to pass data or commands to the calculator 201. As the input device 204, a keyboard, a numeric keypad, a pointing device such as a mouse, a touch panel, a reader (OCR), an input screen and an audio input interface such as a microphone may be employed.

The communicating device 205 refers to a device and a circuit for transmitting and receiving data to/from the outside the computer. The communicating device 205 may be an interface such as a LAN port, a modem, wireless LAN and a router. The communicating device 205 can transmit/receive the processed results by the calculator 201 and the information stored in the storage device 202 through the computer network 14.

The random number generator 206 is a device which is able to provide random numbers.

The timer 207 is a device which is able to measure and inform time.

[Server]

Figure 4:
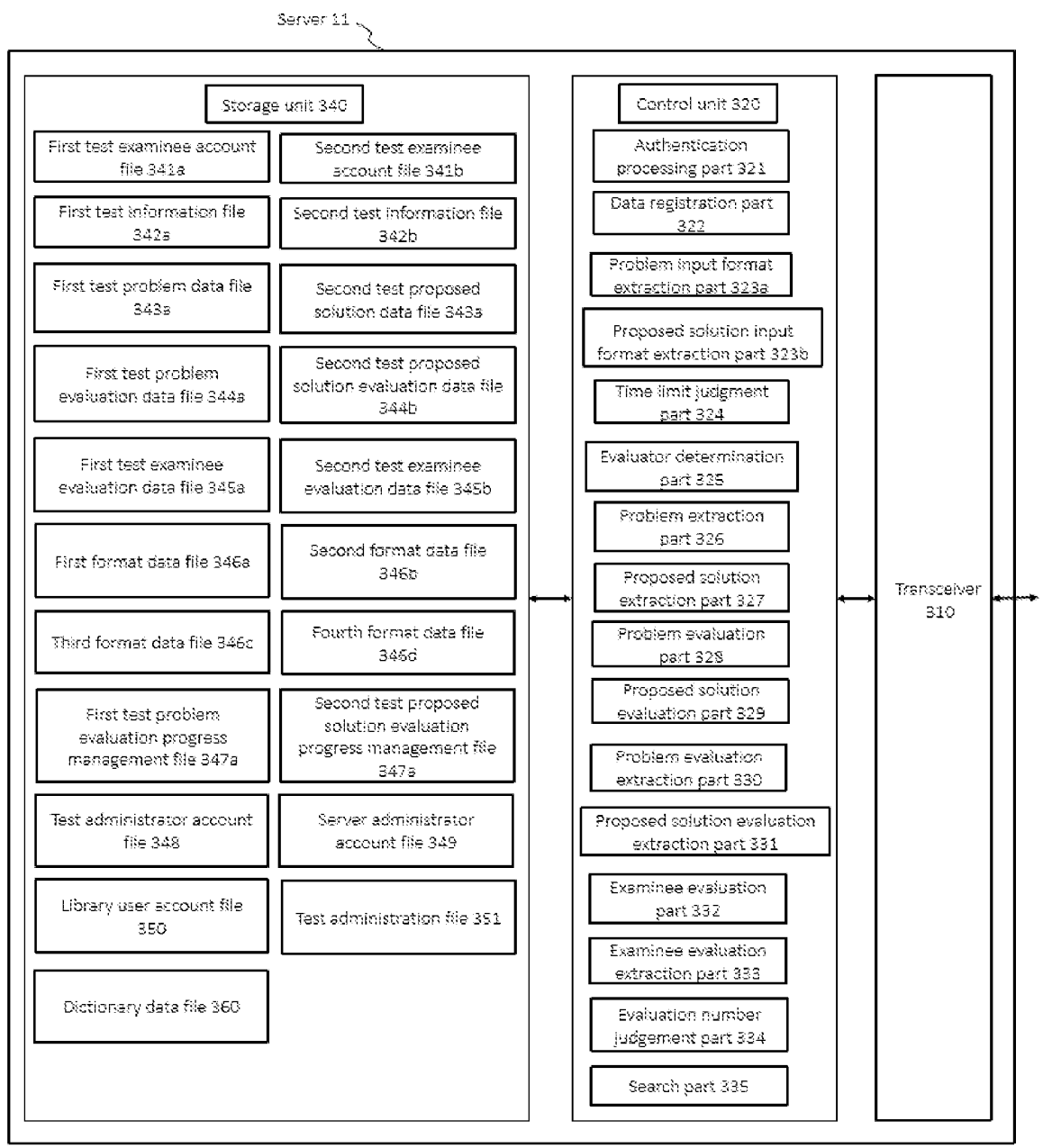
FIG. 4 shows an example of a functional block diagram of a server.

FIG. 4 shows an example of a functional block diagram of the server 11. The server 11 comprises a transceiver 310, a control unit 320 and a storage unit 340.

<Storage Unit>

The storage unit 340 of the server 11 may store a first test examinee account file 341a, a second test examinee account file 341b, a first test information file 342a, a first test problem data file 343a, a first test problem evaluation data file 344a, a first test examinee evaluation data file 345a, a second test information file 342b, a second test proposed solution data file 343b, a second test proposed solution evaluation data file 344b, a second test examinee evaluation data file 345b, a first test problem evaluation progress management file 347a, a second test proposed solution evaluation progress management file 347b, a test administrator account file 348, a server administrator account file 349, a library user account file 350, and a test administration file 351. These files may be prepared individually according to the type of data, or a plurality of types of files may be collectively stored in one file.

Further, the storage unit 340 of the server 11 may store a first format data file 346a for problem input including at least one descriptive problem input section, a second format data file 346b for proposed solution input including at least one descriptive proposed solution input section, a third format data file 346c for problem evaluation input including a selective problem evaluation input section based on at least one evaluation axis, and a fourth format data file 346d for proposed solution evaluation input including a selective proposed solution evaluation input section based on at least one evaluation axis. These files may be prepared individually according to the type of data, or a plurality of types of data may be collectively stored in one file.

(First Test Examinee Account File)

In the first test examinee account file 341a, the account information of each examinee who takes the first test can be stored in a searchable state. FIG. 36 shows an example of a table in which the account information of one examinee included in an examinee account file is stored. The table may store the Individual ID of the examinee, the examinee ID, the organization ID of the organization to which the examinee belongs, the ID within the organization such as employee number, the name, the kana reading of the name, the email address, the department name, the date of birth, the zip code number, the address, the account opening date and time, the login password, the status, and the like. The status includes information on the progress of the test, such as before taking the test, during the first test, and completing the first test.

(First Test Information File)

In the first test information file 342a, information regarding the test conditions of the first test can be stored in a searchable state. FIG. 37 shows an example of a table in which information about the test conditions in the first test information file is stored. Test conditions, such as the first test ID, the first test collection start date and time, the first test collection end date and time, the first test problem input condition(s), the first test problem answer time limit, the first test evaluation start date and time, the first test evaluation end date and time, the first test problem evaluation input conditions, the first test evaluation answer time limit, the first test problem evaluation axes 1 to n (n is an integer of 1 or more), and the like may be stored. In addition, the number of persons as evaluators for each problem may be stored. The larger the number is, the more the evaluations from many evaluators can be collected, and the higher the objectivity becomes. Therefore, the number of people is preferably a plurality, more preferably 5 or more, and even more preferably 10 or more. However, a realistic number of people (for example, in the range of 5 to 20) may be set in consideration of the test time and the number of examinees.

The problem input condition includes, but are not limited to, character restrictions, the acceptable number of proposed problems, language, character code, and whether or not a file can be attached.

(First Test Problem Data File)

In the first test problem data file 343a, the problem data transmitted by the first test examinee can be stored in a searchable state. An example of one table included in the first test problem data file is shown in FIG. 38. The table may store the problem ID, which is the identifier of the problem data, the examinee ID (examinee number), which is the identifier of the examinee who has transmitted the problem data, the first test ID, which is the unique identifier of the first test, the content of the problem, and the score, which is the valuation of the problem, and the like.

There are no particular restrictions on the content of the problem. For example, problems that an examinee who is an employee of a certain company recognizes in his/her own work, problems that an examinee who is an employee of a certain company expects the company to face in the future, and problems that ordinary residents feel inconvenient or uncomfortable in their lives can be mentioned. The examinees can freely describe the problems in a descriptive manner. This has the advantage that the problems that are actually recognized in business and daily life can be described using free vocabulary as the examinee recognizes, without being restricted by selective options. In addition, if the problem input condition(s) is/are specified, the examinee will answer the problem according to the condition(s).

The score may be displayed in points, but may be displayed in categories such as A rank, B rank, and so on. The score can be calculated for each evaluation axis by aggregating the evaluation of the problem in each problem data based on each problem evaluation data and the identifier of the problem data stored in the first test problem evaluation data file 344a. For example, the score can be displayed by the average score of the evaluation, the total score of the evaluation, the acquisition rate of high evaluation, and the like.

At least one evaluation axis is necessary. In order to evaluate the problem from various aspects, it is preferable there should be two or more, and more preferably three or more evaluation axes. From the aspect of deciding whether or not to consider a proposed solution to the problem later, it is preferable that the evaluation axis include, for example, one or two or more selected from the group consisting of the frequency of the problem (frequency of occurrence), the degree to which the existence of the problem is already recognized (potential), the magnitude of the impact when the problem occurs (importance), and the need for urgent response when the problem occurs (urgency).

As will be described later, since the score can be corrected one or more times, the score obtained each time when the correction is performed can be stored in the first test problem data file 343a as a "first corrected score" and a "second corrected score" or the like.

In order to standardize the score, which will be described later, a problem data including problems answered by two or more sample examinees can be stored in the first test problem data file in advance in association with the problem ID for the sample. From the viewpoint of enhancing the effect of standardization, the problem data by the sample examinees is preferably prepared by 5 persons or more, and more preferably by 8 persons or more. However, if the number of examinees is excessively large, the burden on the examinee who evaluates the problems answered by the sample examinees becomes heavy, so the number of sample examinees is generally 15 persons or less, and preferably 12 persons or less.

(First Test Problem Evaluation Data File)

In the first test problem evaluation data file 344a, the problem evaluation data including the evaluation by the evaluator (for example, the examinee) of each problem answered by the examinee in the first test can be stored in a searchable state. An example of a table included in the first test problem evaluation data file is shown in FIG. 39. The table may store the problem evaluation ID, which is the identifier of the problem evaluation data, the problem ID, which is the identifier of the problem data to be evaluated, the examinee ID of the evaluator, the first test ID, which is the unique identifier of the first test, and the evaluation value by the evaluator of the problem. The evaluation value may be in the form of a two-choice type such as 'o' (circle) or "X" (cross), "good" or "bad", or may be expressed by a score within a predetermined range. The evaluation value can be saved for each evaluation axis described above.

(First Test Examinee Evaluation Data File)

In the first test examinee evaluation data file 345a, the evaluation results for each examinee in the first test can be stored in a searchable state. FIG. 40 shows an example of one table included in the first test examinee evaluation data file. The table may store the examinee ID, which is the identifier of the examinee to be evaluated, the first test ID, which is the unique identifier of the first test, and the score indicating the evaluation of the examinee for each evaluation axis. As the evaluation axis, at least one evaluation axis of problem as described above can be adopted.

As will be described later, since the score can be corrected one or more times, the score obtained each time when the correction is performed can be stored in the first test examinee evaluation data file 345a as a "first corrected score" and a "second corrected score" or the like. In addition to the examinee ID, an individual ID, which is an identifier of the examinee, can be further stored. Both of the examinee ID and individual ID are types of examinee identifiers, but by storing the individual ID that identifies an individual in addition to the examinee ID that is the examinee number, it is possible to easily analyze the change of the examination result when the same person takes the test for a plurality of times, for example.

(Second Test Examinee Account File)

In the second test examinee account file 341b, the account information of each examinee who takes the second test can be stored in a searchable state. The examinees taking the second test may be the same as or different from the examinees of the first test. FIG. 42 shows an example of a table in which the account information of one examinee included in a second test examinee account file is stored. The table may store the Individual ID of the examinee, the examinee ID, the organization ID of the organization to which the examinee belongs, the ID within the organization such as employee number, the name, the kana reading of the name, the email address, the department name, the date of birth, the zip code number, the address, the account opening date and time, the login password, the status, and the like. The status includes information on the progress of the test, such as before taking the test, during taking the second test, and completing the second test. If the population of the first test examinee and the population of the second test examinee overlap, the first test examinee account file and the first test examinee account file may be integrated into one examinee account file.

(Second Test Information File)

In the first test information file 342b, information regarding the test conditions of the second test can be stored in a searchable state. FIG. 43 shows an example of a table in which information about the test conditions in the second test information file is stored. Test conditions, such as the second test ID, the second test collection start date and time, the second test collection end date and time, the problems for examinees to consider proposed solutions in the second test, the second test proposed solution answer time limit, the second test evaluation start date and time, the second test evaluation end date and time, the second test evaluation answer time limit, the second test proposed solution evaluation axes 1 to n (n is an integer of 1 or more), and the like may be stored. When the problem for which the examinees should consider the proposed solution in the second test is carried out without being completely linked to the first test (for example, when the wording is arranged referring to the top problems in the first test so that the second test examinees can easily understand it), the character string data of the specific problems can be saved, or the set of the problem ID and the character string of the specific problems may be saved in another table. When the second test is carried out linked with the first test (for example, when the top 10 problems in the first test are automatically adopted, or when the ones selected by the test administrator is used as it is without editing.). In the column of the problem for which the examinee should consider the proposed solution in the second test, the problem ID of the first test can be stored.

In addition, the number of persons as evaluators for each proposed solution may be stored. The larger the number is, the more the evaluations from many evaluators can be collected, resulting in a higher the objectivity. Therefore, the number of people is preferably a plurality, more preferably 5 or more, and even more preferably 10 or more. However, a realistic number of people (for example, in the range of 5 to 20) may be set in consideration of the test time and the number of examinees.

The proposed solution input condition includes, but are not limited to, policy on how to write a proposed solution to the presented problem, character restrictions, the acceptable number of proposed solutions, language, character code, and whether or not a file can be attached.

(Second Test Proposed Solution Data File)

In the second test proposed solution data file 343b, the proposed solution data transmitted by the second test examinee can be stored in a searchable state. An example of one table included in the second test proposed solution data file is shown in FIG. 44. The table may store the proposed solution ID, which is the identifier of the proposed solution data, the examinee ID (examinee number), which is the identifier of the examinee who has transmitted the proposed solution data, the second test ID, which is the unique identifier of the second test, the content of the proposed solution, and the score, which is the valuation of the proposed solution, results when actually trying the proposed solution, and the like.

The examinees can freely describe the proposed solutions in a descriptive manner. This has the advantage that the examinees can write proposed solutions using free vocabulary as they come up with without being restricted by selective options. In addition, if the proposed solution input condition(s) is/are specified, the examinee will answer the proposed solution according to the condition(s).

The score may be displayed in points, but may be displayed in categories such as A rank, B rank, and so on. The score can be calculated for each evaluation axis by aggregating the evaluation of the proposed solution in each proposed solution data based on each proposed solution evaluation data and the identifier of the proposed solution data stored in the second test proposed solution evaluation data file 344b. For example, the score can be displayed by the average score of the evaluation, the total score of the evaluation, the acquisition rate of high evaluation, and the like.

At least one evaluation axis is necessary. In order to evaluate the proposed solution from various aspects, it is preferable there should be two or more, and more preferably three or more evaluation axes. From the aspect of deciding whether or not to adopt the proposed solution later, it is preferable that the evaluation axis include, for example, one or two or more selected from the group consisting of effect, feasibility, and novelty.

As will be described later, since the score can be corrected one or more times, the score obtained each time when the correction is performed can be stored in the second test proposed solution data file 343b as a "first corrected score" and a "second corrected score" or the like.

In order to standardize the score, which will be described later, a proposed solution data including proposed solutions answered by two or more sample examinees can be stored in the second test proposed solution data file in advance in association with the proposed solution ID for the sample. From the viewpoint of enhancing the effect of standardization, the proposed solution data by the sample examinees is preferably by 5 persons or more, and more preferably by 8 persons or more. However, if the number of examinees is excessively large, the burden on the examinee who evaluates the proposed solutions answered by the sample examinees becomes heavy, so the number of sample examinees is generally 15 persons or less, and preferably 12 persons or less.

(Second Test Proposed Solution Evaluation Data File)

In the second test proposed solution evaluation data file 344b, the proposed solution evaluation data including the evaluation by the evaluator (for example, the examinee) of each proposed solution answered by the examinee in the second test, can be stored in a searchable state. An example of a table included in the second test proposed solution evaluation data file is shown in FIG. 45. The table may store the proposed solution evaluation ID, which is the identifier of the proposed solution evaluation data, the proposed solution ID, which is the identifier of the proposed solution data to be evaluated, the examinee ID of the evaluator, the second test ID, which is the unique identifier of the second test, and the evaluation value by the evaluator of the proposed solution. The evaluation value may be in the form of a two-choice type such as "○" (circle) and "X" (cross), "good" or "bad", or may be expressed by a score within a predetermined range. The evaluation value can be saved for each evaluation axis described above.

(Second Test Examinee Evaluation Data File)

In the second test examinee evaluation data file 345b, the evaluation results for each examinee in the second test can be stored in a searchable state. FIG. 46 shows an example of one table included in the second test examinee evaluation data file. The table may store the examinee ID, which is the identifier of the examinee whose proposed solution is to be evaluated, the second test ID, which is the unique identifier of the second test, and the score indicating the evaluation of the examinee for each evaluation axis. As the evaluation axis, at least one evaluation axis of problem as described above can be adopted.

As will be described later, since the score can be corrected one or more times, the score obtained each time when the correction is performed can be stored in the second test examinee evaluation data file 345b as a "first corrected score" and a "second corrected score" or the like. In addition to the examinee ID, an individual ID, which is an identifier of the examinee, can be further stored. Both of the examinee ID and individual ID are types of examinee identifiers, but by storing the individual ID that identifies an individual in addition to the examinee ID that is the examinee number, it is possible to easily analyze the change of the examination result when the same person takes the test for a plurality of times, for example.

(First Test Problem Evaluation Progress Management File)

In the first test problem evaluation progress management file 347a, the information on the progress of the problem evaluation session for conducting mutual evaluation by the examinees can be stored. FIG. 41 shows an example of a table in which the progress status included in the first test problem evaluation progress management file 347a is stored. The examinee ID of the evaluator, the problem ID to be evaluated by the examinee of the examinee ID, the required number of evaluations, the number of completed evaluations, and the like can be stored.

(Second Test Proposed Solution Evaluation Progress Management File)

In the second test proposed solution evaluation progress management file 347b, the information on the progress of the proposed solution evaluation session for conducting mutual evaluation by the examinees can be stored. FIG. 47 shows an example of a table in which the progress status included in the second test proposed solution evaluation progress management file 347b is stored. The examinee ID of the evaluator, the proposed solution ID to be evaluated by the examinee of the examinee ID, the required number of evaluations, the number of completed evaluations, and the like can be stored.

(Test Administrator Account File)

In the test administrator account file 348, the account information of the test administrator, for example, an organization such as a company to which the examinee belongs can be stored in a searchable state. FIG. 48 shows an example of a table in which the test administrator account information in the test administrator account file is stored. When the test administrator is an organization such as a company, the table can store the organization ID, the organization name, the Kana character of the organization name, the zip code number and address of the organization, the department name in charge, the kana reading, the phone number, and the email address of the person in charge, the account opening date and time, the login password, the status, and the like. The status may include information about the existence of the test administrator account, such as "closed account".

(Server Administrator Account File)

In the server administrator account file 349, the server administrator account information can be stored in a searchable state. FIG. 49 shows an example of a table in which the administrator account information in the server administrator account file is stored. The table can store the server administrator ID, the password, the account creation date and time, the authority level, and the like.

(Library User Account File)

In the library user account file 350, the account information of the library user can be stored in a searchable state. FIG. 50 shows an example of a table in which the user account information in the library user account file is stored. The table can store the User ID, the user name, the login ID, the password, the usage authority, and the like.

In the above tables in the data files, data types such as "int" (integers), "text" (character string type), "float" (floating decimal numbers), "crypt" (encrypted strings) and "date" (date and time type) are used for each filed. However, the data types are not limited to the illustrated form, but may be adjusted as necessary.

(First Format Data File)

Figure 7:
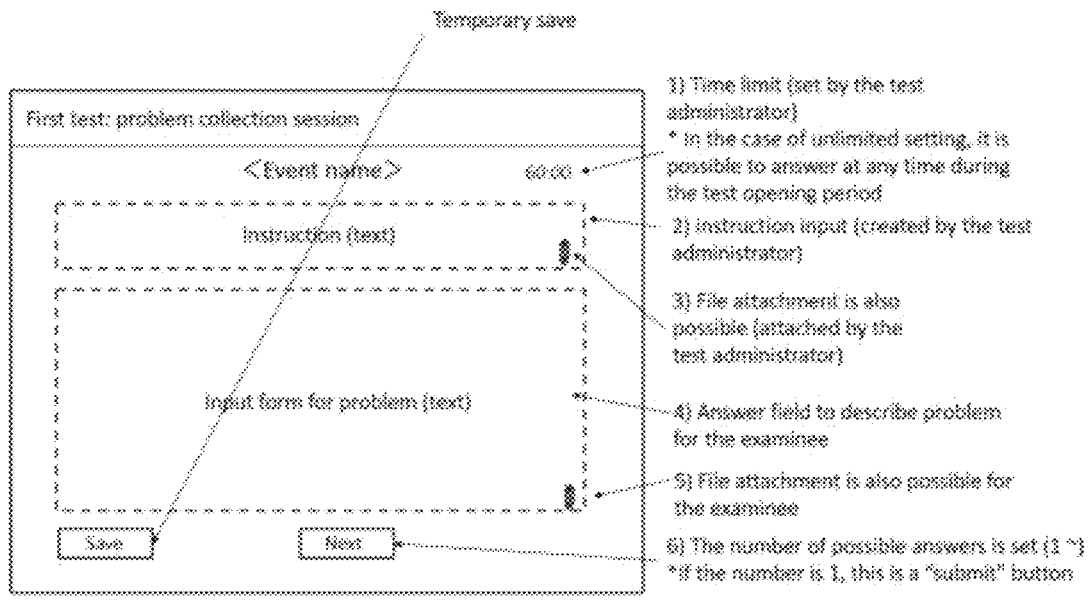
FIG. 7 is an example of a screen of a problem collection session of an examinee page displayed on the examinee terminal.

In the first format data file 346a, the first format data including at least one descriptive problem input section for problem input can be stored. As mentioned above, the presence of the descriptive problem input section increases the degree of freedom in description, so it is advantageous that the problems that are actually recognized in business or daily life can be described using free vocabulary as the examinee recognizes, without being restricted by selective options, etc. In addition to the at least one descriptive problem input section, the first format data may include at least one selective problem input section as well. By providing a selective problem input section, there is an advantage that statistical data can be created more easily. FIG. 7 shows an example of the screen displayed based on the first format data for problem input.

(Second Format Data File)

Figure 8:
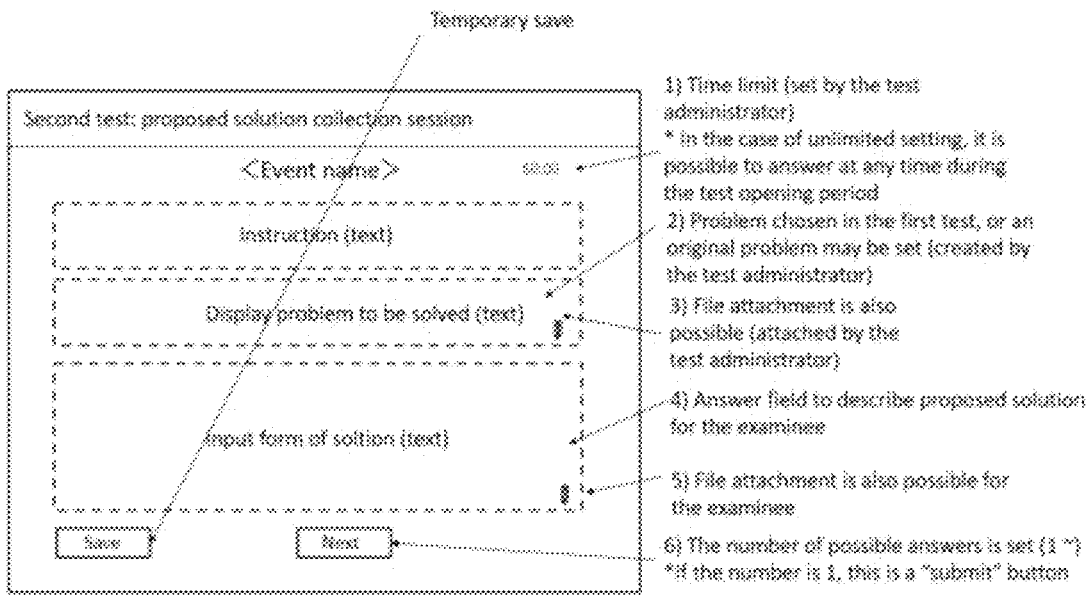
FIG. 8 is an example of a screen of a proposed solution collection session on the examinee page displayed on the examinee terminal.

In the second format data file 346b, the second format data including at least one descriptive proposed solution input section for proposed solution input can be stored. As mentioned above, the presence of the descriptive proposed solution input section increases the degree of freedom in description, so it is advantageous that the examinees can write proposed solutions using free vocabulary as they come up with without being restricted by selective options, etc. In addition to the at least one descriptive proposed solution input section, the second format data may include at least one selective proposed solution input section as well. By providing a selective proposed solution input section, there is an advantage that statistical data can be created more easily. FIG. 8 shows an example of the screen displayed based on the second format data for proposed solution input.

(Third Format Data File)

In the third format data file 346c, the third format data for problem evaluation input including a selective problem evaluation input section based on at least one evaluation axis can be stored. By inputting the evaluation in a selective manner, there is an advantage that it becomes easy to create a score for each evaluation axis for the problem based on a statistical method. It may be a two-choice type of "good" or "bad", or a category selection type such as a five-choice type that selects from "Strongly disagree", "Disagree". "neutral", "Agree" and "Strongly agree", or a method of selecting a score within a predetermined range such as 0 to 10 points. FIG. 9 shows an example of a screen displayed based on the third format data for problem evaluation input.

(Fourth Format Data File)

In the fourth format data file 346d, the fourth format data for proposed solution evaluation input including a selective proposed solution evaluation input section based on at least one evaluation axis can be stored. By inputting the evaluation in a selective manner, there is an advantage that it becomes easy to create a score for each evaluation axis for the problem based on a statistical method. It may be a two-choice type of "good" or "bad", or a category selection type such as a five-choice type that selects from "Strongly disagree", "Disagree", "neutral", "Agree" and "Strongly agree", or a method of selecting a score within a predetermined range such as 0 to 10 points. FIG. 10 shows an example of a screen displayed based on the fourth format data for proposed solution evaluation input.

<Transceiver>

The server 11 can exchange various data through the transceiver 310 with the examinee terminal 12, the test administrator terminal 13, and the server administrator terminal 15 via the computer network 14.

For example, the transceiver 310 may be configured to:

receive the instruction to start the first test from the test administrator terminal 13;

transmit the first format data for problem input stored in the first format data file 346a to each of a plurality of examinee terminals 12 in the first test in a displayable form;

receive the problem data including problems input by the examinees in the first test from each of the examinee terminals 12;

transmit the problem data including the problem to be evaluated by each examinee the first test and the third format data for problem evaluation input to the corresponding examinee terminal 12 in the first test in a displayable form;

receive the problem evaluation data including the evaluation by the examinee in the first test of the problem from each of the examinee terminals 12; and transmit the problem evaluation aggregated data to the test administrator terminal 13 in a displayable form.

In addition, the transceiver 310 may be configured to:

receive at least one problem to be solved selected from a plurality of problem included in the problem data stored in the first test problem data file 343*a* from the test administrator terminal 13;

receive the instruction to start the second test from the test administrator terminal 13;

transmit the problem data including the at least one problem to be solved and the second format data for inputting proposed solution to the at least one problem to be solved to each of a plurality of examinee terminals 12 in the second test in a displayable form;

receive the proposed solution data including proposed solutions input by the examinees in the second test from each of the examinee terminals 12;

transmit the proposed solution data including the proposed solution to be evaluated by each examinee the second test and the fourth format data for proposed solution evaluation input to the corresponding examinee terminal 12 in the second test in a displayable form;

receive the proposed solution evaluation data including the evaluation by the examinee in the second test for the proposed solution included in the proposed solution data from each of the examinee terminals 12; and transmit the proposed solution evaluation aggregated data to the test administrator terminal 13 in a displayable form.

<Control Unit>

The control unit 320 of the server 11 comprises an authentication processing part 321, a data registration part 322, a problem input format extraction part 323*a*, a proposed solution input format extraction part 323*b*, a time limit judgment part 324, an evaluator determination part 325, a problem extraction part 326, a proposed solution extraction part 327, a problem evaluation part 328, a proposed solution evaluation part 329, a problem evaluation extraction part 330, a proposed solution evaluation extraction part 331, an examinee evaluation part 332, an examinee evaluation extraction part 333, an evaluation number judgement part 334, and a search part 335. Each part can perform the desired calculation based on a program.

(Authentication Processing Part)

Figure 5:
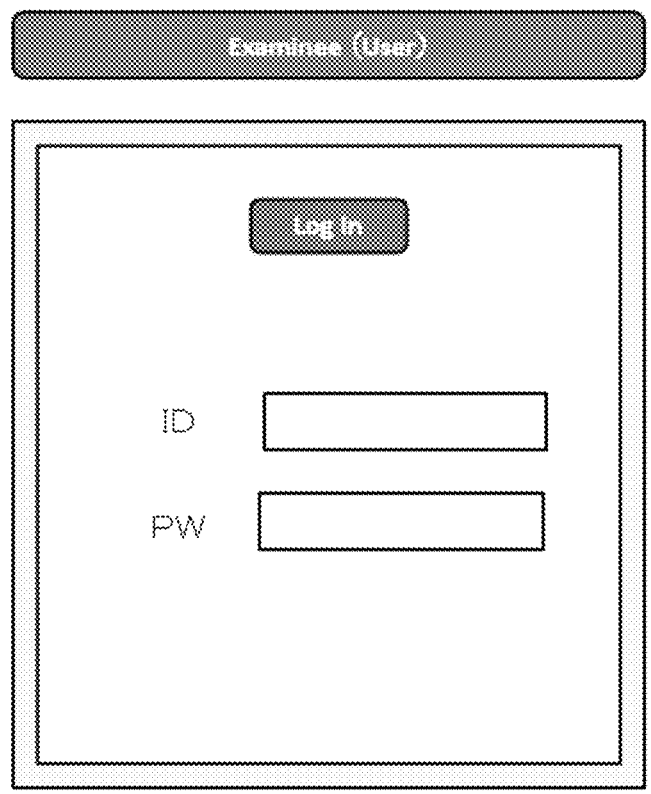
FIG. 5 is an example of the top page screen displayed on an examinee terminal.
Figure 6:
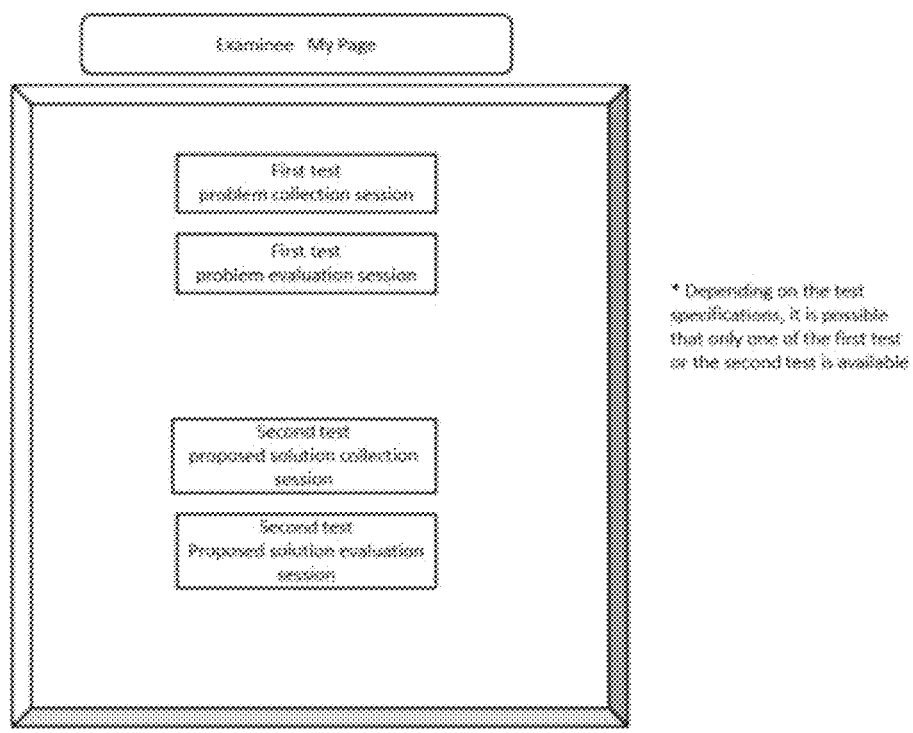
FIG. 6 is an example of the menu screen of the examinee page displayed on the examinee terminal.

The authentication processing part 321 may authorize the examinee ID and password based on an access request from the examinee terminal 12. For example, the access request from the examinee terminal 12 can be executed by inputting the examinee ID and password and clicking a login button on a screen of a top page on the examinee terminal 12 as shown in FIG. 5. The examinee ID and password of each examinee may be given in advance by the server administrator. The authentication processing may be executed by the authentication processing part 321 which can refer to the examinee account data file 341*a* (or 341*b*) and determine whether or not the input examinee ID and password match the data stored in the examinee account data file 341*a* (or 341*b*). If the input examinee ID and password match the stored data, the screen data of the examinee page (for example, a menu screen shown in FIG. 6) can be transmitted from the transceiver 310 to the corresponding examinee terminal 12. If not matching, an error message may be transmitted.

In addition, the authentication processing part 321 may authorize the organization ID and password based on an access request from the test administrator terminal 13. The administrator ID and password of the test administrator may be given in advance by the server administrator. The authentication processing may be executed by the authentication processing part 321 which can refer to the test administrator account data file 348 and determine whether or not the input administrator ID and password match the data stored in the test administrator account data file 348. If the input administrator ID and password match the stored data, the screen data of the test administrator page (for example, the condition setting screens for the first test in FIG. 11 to 13 and the condition setting screens for the second test shown in FIG. 14 to 16.) can be transmitted from the transceiver 310 to the corresponding test administrator terminal 13. If not matching, an error message may be transmitted.

In addition, the authentication processing part 321 may authorize the server administrator ID and password based on an access request from the server administrator terminal 15. The administrator ID and password of the server administrator may be given in advance by himself/herself. The authentication processing may be executed by the authentication processing part 321 which can refer to the server administrator account data file 349 and determine whether or not the input administrator ID and password match the data stored in the server administrator account data file 349. If the input administrator ID and password match the stored data, the screen data of the server administrator page (for example, the administrator screen shown in FIG. 17) can be transmitted from the transceiver 310 to the corresponding server administrator terminal 15. If not matching, an error message may be transmitted.

(Data Registration Part)

Figures 11, 12:
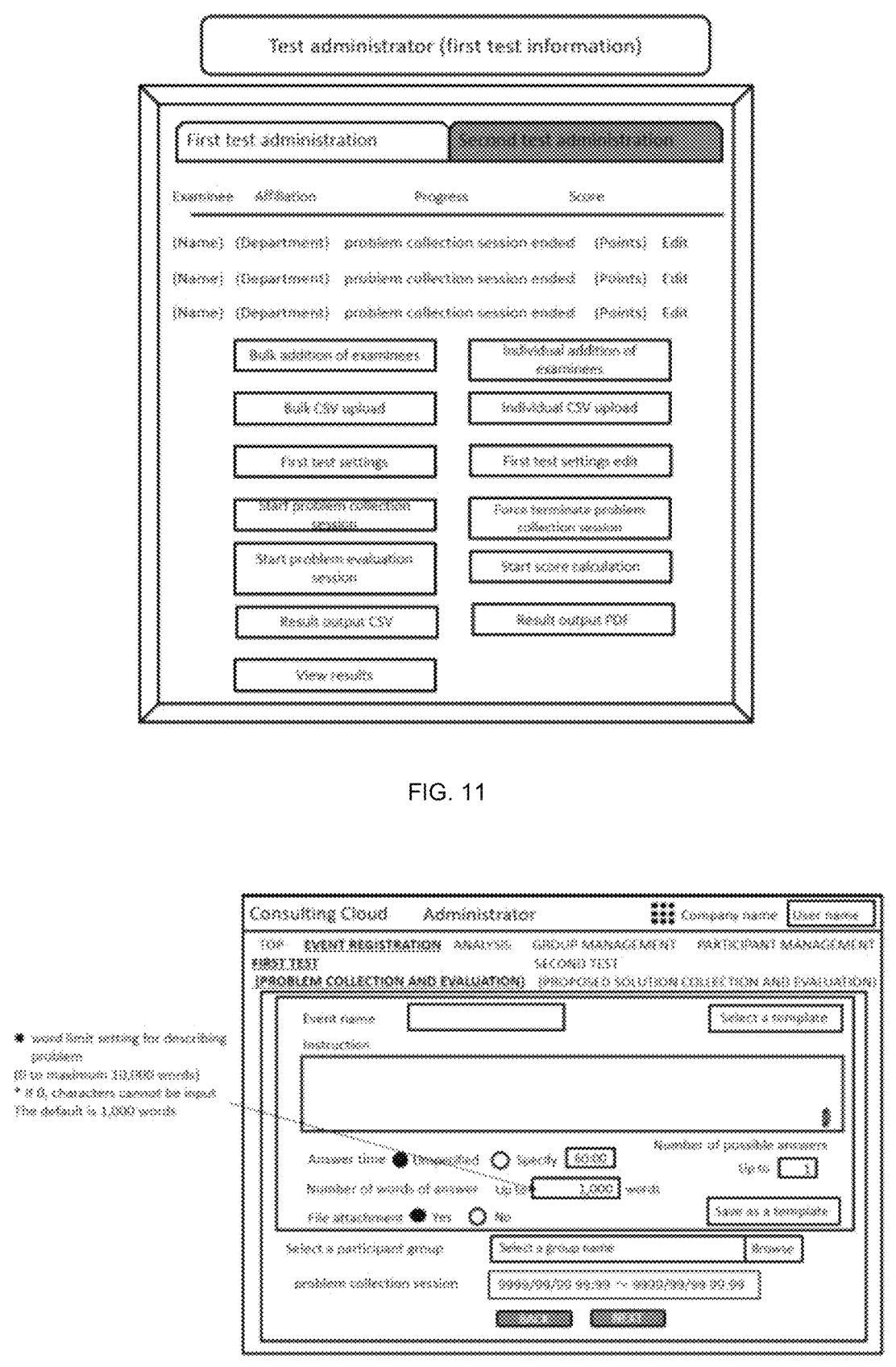

The data registration part 322 may register the examinees' information. For example, when a test administrator such as a company to which the examinees belong logins using the test administrator terminal 13 according to the above procedures, a test administrator screen as shown in FIG. 11 will be displayed on the test administrator terminal 13. When the test administrator clicks a button of "Bulk addition of examinees" or a button of "Individual addition of examinees", a screen for inputting the examinee account information (not shown) will be displayed on the test administrator terminal 13, and on the screen, the predetermined examinee account information to be stored in the examinee account data file 341*a* (or 341*b*) such as an examinee's individual ID, examinee ID, organization ID of the organization to which the examinee belongs, and employee number. Once the input has been completed, by clicking a predetermined button such as "Save" or "Confirm" on the screen, the examinee account information can be transmitted to the server 11. Alternatively, when the test administrator clicks a button of "CSV bulk upload" or a button of "CSV individual Upload", a screen for selecting a file saved in the test administrator terminal 13 or the like is displayed, and by selecting the desired file in which the examinee account information is stored and clicking a predetermined button such as "Transmit", the examinee account information can be transmitted to the server 11. In this way, the transceiver 310 in the server 11 can receive the examinee account information transmitted to the server 11, and the data registration part 322 can store the received information in the examinee account data file 341*a* (or 341*b*). Registration of the first test examinee and the second test examinee may be carried out separately or collectively.

Figure 13:
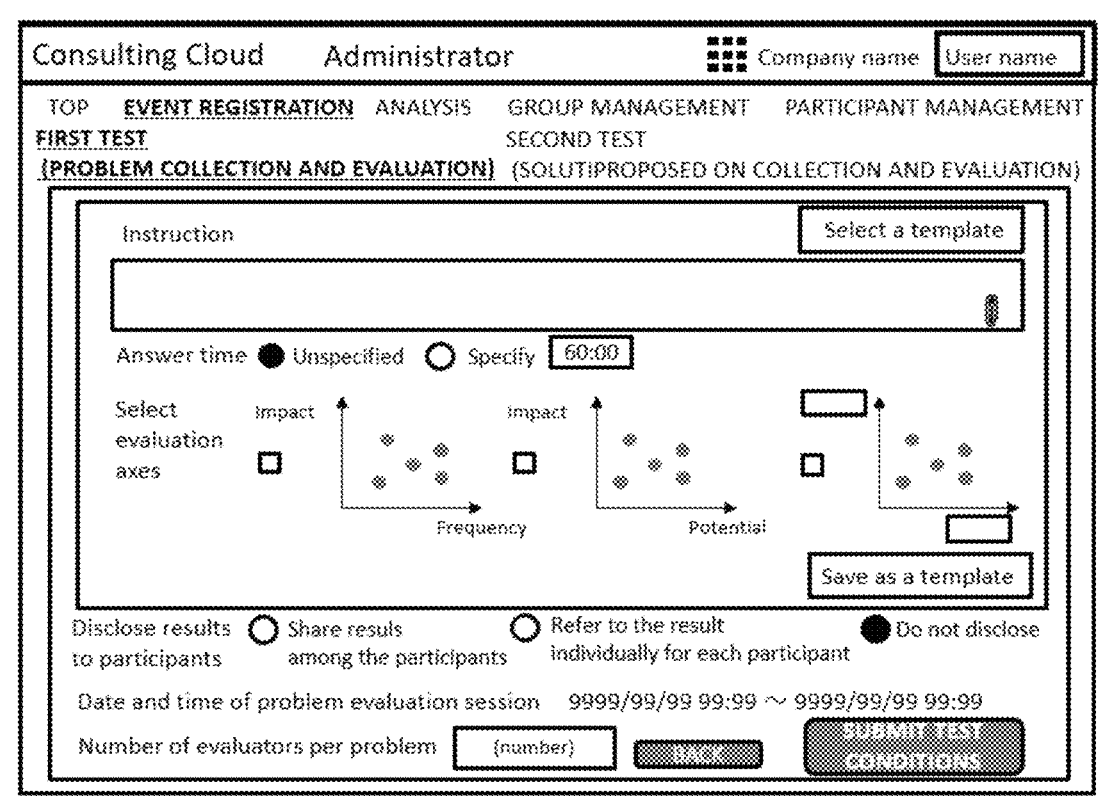

In addition, the data registration part 322 may register the test conditions of the first test. For example, when the test administrator clicks a button of "First test settings" on the test administrator screen as shown in FIG. 11, the screen will be shift to a screen of condition settings for the problem collection session of the first test as shown in FIG. 12. On this screen, the test administrator can input information to be stored in the first test condition data file 342a such as the problem input condition(s) (instructions) for the first test, the date and time of the problem collection session, the limit of answer time, the limit of number of answer characters, the possible number of answers, and whether or not a file can be attached. The test conditions may be selectable from templates which are prepared in advance. On this test administrator screen, when the test administrator clicks the "Next" button, the screen switches to a screen of condition settings for the problem evaluation session of the first test as shown in FIG. 13. On this screen, the test administrator can input information to be stored in the first test condition data file 342a such as the problem evaluation input conditions (instructions) for the first test, the limit of answer time, the selection of evaluation axes, necessity of disclosing the results to the examinees, number of people as evaluators for one problem, the date and time of problem evaluation session. The test conditions may be selectable from templates which are prepared in advance. Once input has been completed, by clicking a button of "Send test conditions", the test conditions can be transmitted to the server 11. In this way, the transceiver 310 in the server 11 can receive the test conditions information of the first test transmitted to the server 11, and the data registration part 322 can store the received information together with the first test ID in the first test information file 342a. A part of the test condition information of the first test may be stored in the first format data file 346a or the second format data file 346b. For example, the problem input condition(s) (instructions) of the first test, the limit of number of answer characters, and the possible number of answers may be saved in the first format data file 346a. Further, the problem evaluation input conditions (instructions) of the first test and the selection of evaluation axes may be saved in the second format data file 346b. The first test ID may be manually input by the server administrator individually, or may be automatically assigned according to predetermined rules when the test conditions information of the first test is stored in the data registration part 322 by the server 11.

Figures 15, 16:
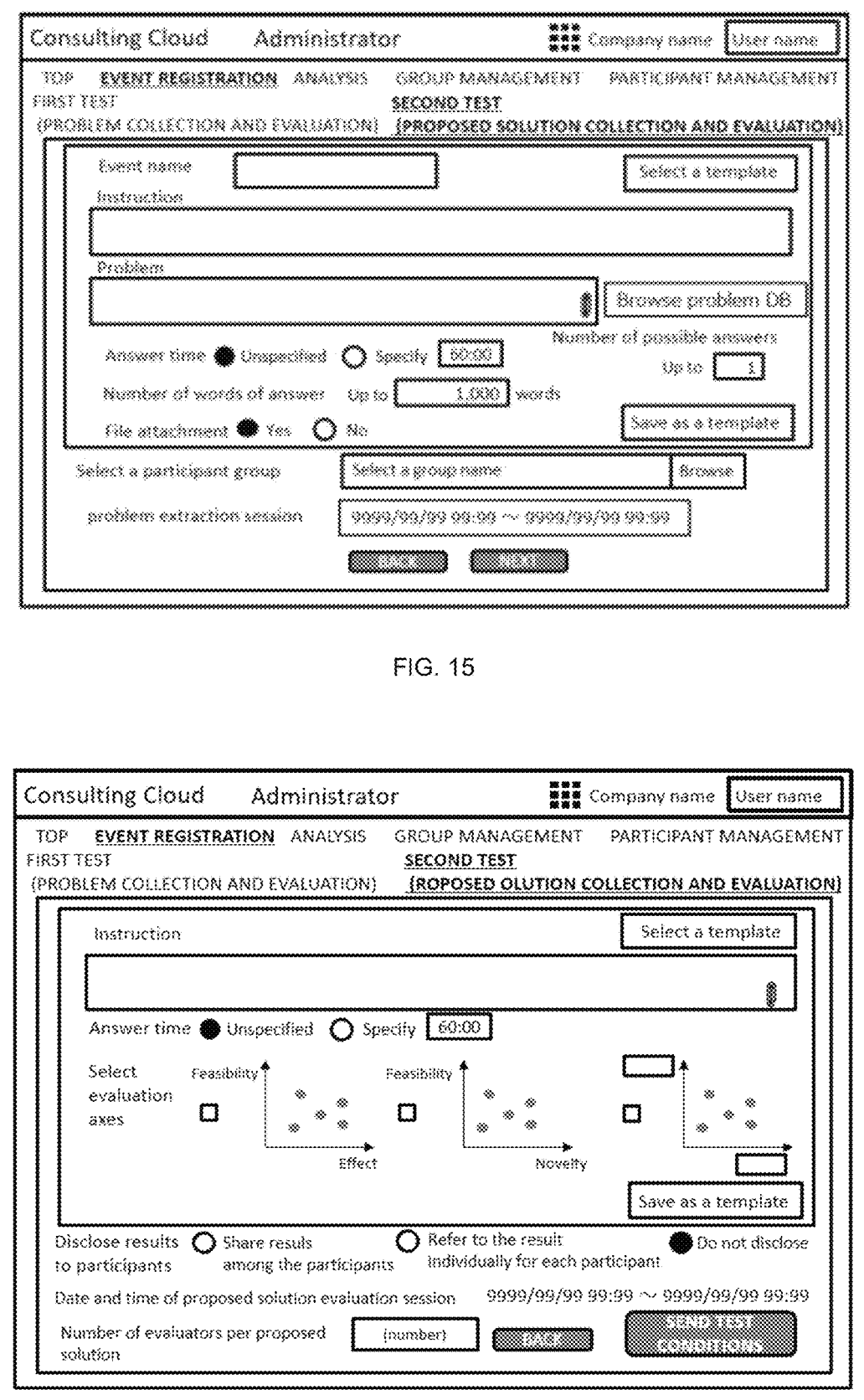

In addition, the data registration part 322 may register the test conditions of the second test. For example, when the test administrator clicks a button of "Second test settings" on the test administrator screen as shown in FIG. 14, the screen will be shift to a screen of condition settings for the proposed solution collection session of the second test as shown in FIG. 15. On this screen, the test administrator can input information to be stored in the second test condition data file 342b such as the proposed solution input conditions (instructions) for the second test, the problem for which a proposed solution must be proposed, the date and time of the proposed solution collection session, the limit of answer time, the limit of number of answer characters, the possible number of answers, and whether or not a file can be attached. The problem for which a proposed solution should be proposed may be selectively input by accessing the problem data file. For example, when the test administrator clicks the "Browse problem DB" button on the screen, another window may open, and a screen as shown in FIG. 25 is displayed in which the problem list in the problem data file can be referred to. The test administrator can select a problem for which a proposed solution should be proposed from the problem list on the screen. The test conditions may be selectable from templates which are prepared in advance. On this test administrator screen, when the test administrator clicks the "Next" button, the screen switches to a screen of condition settings for the proposed solution evaluation session of the second test as shown in FIG. 16. On this screen, the test administrator can input information to be stored in the second test condition data file 342b such as the proposed solution evaluation input conditions (instructions) for the second test, the limit of answer time, the selection of evaluation axes, necessity of disclosing the results to the examinees, number of people as evaluators for one proposed solution, the date and time of proposed solution evaluation session. The evaluation axis may be input by selecting from the ones prepared by default, or the test administrator may freely input text in a descriptive input field as an evaluation axis. Once input has been completed, by clicking a button of "Send test conditions", the test conditions can be transmitted to the server 11. In this way, the transceiver 310 in the server 11 can receive the test conditions information of the second test transmitted to the server 11, and the data registration part 322 can store the received information together with the second test ID in the second test information file 342b. A part of the test condition information of the second test may be stored in the third format data file 346c or the fourth format data file 346d. For example, the proposed solutions input conditions (instructions) of the second test, the limit of number of answer characters, and the possible number of answers may be saved in the third format data file 346c. Further, the proposed solution evaluation input conditions (instructions) of the second test and the selection of evaluation axes may be saved in the fourth format data file 346d. The second test ID may be manually input by the server administrator individually, or may be automatically assigned according to predetermined rules when the test conditions information of the second test is stored in the data registration part 322 by the server 11.

Further, the data registration part 322 may register the test administrators. When the server administrator (that is, an online test system provider) logins using the server administrator terminal according to the above procedures, a server administrator screen as shown on the left side in FIG. 17 will be displayed on the server administrator terminal 15. When the server administrator clicks the "Detail" button corresponding to the item desired to be set, a screen to input the test administrator account information as shown on the right side in FIG. 17 will be displayed on the server administrator terminal 15, and on this screen, the predetermined test administrator account information to be stored in the test administrator account data file 348 such as the organization ID of the test administrator, the person in charge, the contact information. Once input has been completed, by clicking the "Save" button, the test administrator account information can be transmitted to the server 11. In this way, the transceiver 310 in the server 11 can receive the test administrator account information transmitted to the server 11, and the data registration part 322 can store the received information in the test administrator account data file 348.

Further, the data registration part 322 may register the problems answered by the examinees. For example, when an examinee screen for the problem collection session of the first test as shown in FIG. 7 is displayed on the examinee terminal 12, if the examinee inputs the problem and clicks the "Next" button, the problem data from the examinee is transmitted to the server 11 via the computer network 14. When the time limit judgement part 324 judges that the problem data including the problem received at the transceiver 310 is received within the time limit, the data registration unit 322 may assign a problem ID to the problem data, and the problem data may be stored in the first test problem data file 343a in association with the examinee ID of the examinee who has transmitted the problem data, and the like.

Further, the data registration part 322 may register the problem evaluations. For example, when the examinee terminal 12 displays an examinee screen of a problem evaluation session for evaluating a problem proposed by another examinee as shown in FIG. 9, if the examinee selectively inputs the evaluation of the problem for each evaluation axis (here, click one of the buttons "Strongly disagree", "Disagree", "Neutral", "Agree", and "Strongly age" indicating the degree of empathy) and clicks the "Next" button, the problem evaluation data from the examinee is transmitted to the server 11 via the computer network 14. When the problem evaluation data is received by the transceiver 310, the data registration unit 322 may assign a problem evaluation ID to the problem evaluation data, and the problem evaluation data may be stored in the first test problem evaluation data file 344a in association with the examinee ID of the examinee who has transmitted the problem evaluation data and the problem ID, and the like. In the problem evaluation session, as in the problem collection session, the problem evaluation data may be stored in the first test problem evaluation data file 344a only when the time limit judgement part 324 judges that the data has been received within the time limit.

Further, the data registration part 322 may register the proposed solutions answered by the examinees. For example, when an examinee screen for the proposed solution collection session of the second test as shown in FIG. 8 is displayed on the examinee terminal 12, if the examinee inputs the proposed solution and clicks the "Next" button, the proposed solution data from the examinee is transmitted to the server 11 via the computer network 14. When the time limit judgement part 324 judges that the proposed solution data including the proposed solution received at the transceiver 310 is received within the time limit, the data registration unit 322 may assign a proposed solution ID to the proposed solution data, and the proposed solution data may be stored in the second test proposed solution data file 343b in association with the examinee ID of the examinee who has transmitted the proposed solution data, and the like.

Further, the data registration part 322 may register the proposed solution evaluations. For example, when the examinee terminal 12 displays an examinee screen of a proposed solution evaluation session for evaluating a proposed solution proposed by another examinee as shown in FIG. 10, if the examinee selectively inputs the evaluation of the proposed solution for each evaluation axis (here, click one of the buttons "Strongly disagree", "Disagree", "Neutral", "Agree", and "Strongly age" indicating the degree of empathy) and clicks the "Next" button, the proposed solution evaluation data from the examinee is transmitted to the server 11 via the computer network 14. When the proposed solution evaluation data is received by the transceiver 310, the data registration unit 322 may assign a proposed solution evaluation ID to the proposed solution evaluation data, and the proposed solution evaluation data may be stored in the second test proposed solution evaluation data file 344b in association with the examinee ID of the examinee who has transmitted the proposed solution evaluation data and the proposed solution ID, and the like. In the proposed solution evaluation session, as in the proposed solution collection session, the proposed solution evaluation data may be stored in the second test proposed solution evaluation data file 344b only when the time limit judgement part 324 judges that the data has been received within the time limit.

Further, the data registration part 322 may register the result of actually applying the proposed solution stored in the second test proposed solution data file 343b. For example, when the user terminal 16 displays a screen including at least one descriptive proposed solution usage result input section for inputting the result when applying a specific proposed solution as shown in FIG. 26, if the user inputs the result and clicks the "Next" button, data related to the result by the user when the proposed solution is applied (proposed solution result data) is transmitted to the server 11 via the computer network 14. The input screen may include at least one selective input section for inputting the actual result of the proposed solution. When the transceiver 310 receives the proposed solution result data, the data registration part 322 may store the proposed solution result data in the second test proposed solution data file 343b in association the user ID who has transmitted the proposed solution result data and the proposed solution ID, and the like.

(Problem Input Format Extraction Part)

When the transceiver 310 receives the instruction to start the problem collection session of the first test transmitted from the test administrator terminal 13, the problem input format extraction part 323a may simultaneously transmit the first format data stored in the first format data file 346a from the transceiver 310 to each of the examinee terminals 12 in a displayable form via the computer network 14. At this time, the problem input format extraction part 323a may transmit predetermined test information such as the problem input condition(s) of the first test in the first test information file 342a in a displayable form together with the first format data. In addition, the problem input format extraction part 323a may individually transmit the first format data in a displayable form to the corresponding examinee terminal 12 according to the instruction of the time limit judgement part 324. At this time, similarly, the problem input format extraction part 323a may also transmit predetermined test information such as the problem input condition(s) of the first test in the first test information file 342a. In addition, when receiving the instruction to start the problem collection session transmitted from the test administrator terminal 13, the problem input format extraction part 323a may change the status in the first test examinee account file 341a or the like to a status indicating that the problem collection session has started, and save the status.

(Proposed Solution Input Format Extraction Part)

When the transceiver 310 receives the instruction to start the proposed solution collection session of the second test transmitted from the test administrator terminal 13, the proposed solution input format extraction part 323b may simultaneously transmit the predetermined test information such as the proposed solution input conditions of the second test stored in the second test information file 342b and the problem for which a proposed solution should be considered, along with the second format data stored in the second format data file 346b, from the transceiver 310 to each of the examinee terminals 12 in a form displayable form via the computer network 14. In addition, the proposed solution input format extraction part 323b may individually transmit the predetermined test information such as the proposed solution input conditions of the second test stored in the second test information file 342b and the problem for which a proposed solution should be considered along with the second format data in a displayable form to the corresponding examinee terminal 12 according to the instruction of the time limit judgement part 324. In addition, when receiving the instruction to start the proposed solution collection session transmitted from the test administrator terminal 13, the proposed solution input format extraction part 323b may change the status in the second test examinee account file 341b or the like to a status indicating that the proposed solution collection session has started, and save the status.

(Time Limit Judgment Part)

The time limit judgement part 324 may, for example, in the problem collection of the first test (or the proposed solution collection of the second test), use the timer 207 which is built in the server 11 to judge whether or not the time when the transceiver 310 has received the problem data (or the proposed solution data) transmitted from the examinee terminal 12 is within the time limit, based on the first test ID (or the second test ID), and the time information such as the collection start date and time of the first test (or the collection start date and time of the second test), collection end date and time of the first test (or the collection end date and time of the second test), and problem answer time limit of the first test (or the proposed solution answer time limit of the second test) which are stored in the first test information file 342a (or the second test information file 342b).

As a result of the judgement, if it is judged that the time limit is meet, the time limit judgement part 324 may instruct the data registration part 322 to assign a problem ID (or a proposed solution ID) to the problem data (or the proposed solution data), and to store it in the first test problem dada file 343a (or the second test proposed solution data file 343b) in association with the examinee ID of the examinee who has transmitted the problem data (or the proposed solution data), and the like. In addition, the time limit judgement part 324 may instruct the problem input format extraction part 323a (or the proposed solution input format extraction part 323b) to retransmit the first format data (or the second format data) along with the predetermined information included in the first test problem data file 343a (or the second test proposed solution data file 343b) from the transceiver 310 to the examinee terminal 12 of the examinee who has transmitted the problem data (or the proposed solution data) in a displayable form.

On the other hand, as a result of the judgement, if it is judged that the time limit has passed, it is possible to refuse the transmission of the problem data (or the proposed solution data) from the examinee terminal 12 or the reception at the server 11. In addition, regardless of whether or not the problem data (or the proposed solution data) is received from the examinee terminal 12, if it is judged that the time limit has passed, the time limit judgement part 324 may inform the end of the problem collection session (or the proposed solution collection session) from the transceiver 310 in a displayable form to the examinee terminal 12 and the test administrator terminal 13, and refuse to receive the problem data (or the proposed solution data) which fails to meet the time limit. In addition, in order to record that the problem collection session (or the proposed solution collection session) has ended, the time limit judgement part 324 of the server 11 can change the status in the first test examinee account file 341a (or the second test examinee account file 341b) or the like to "Problem collection session (or proposed solution collection session) ended". In addition, the time limit judgement part 324 may inform the evaluator determination part 325 that the problem collection session (or the proposed solution collection session) has ended.

After it is confirmed that the problem collection session (or the proposed solution collection session) has ended such as by confirming that the status in the first test examinee account file 341a (or the second test examinee account file 341b) or the like has become "Problem collection session (or proposed solution collection session) ended" for all the examinees, or by receiving from the time limit judgment part 324 that the problem collection session (or the proposed solution collection session) has ended, when the transceiver 310 receives the instruction to start the problem evaluation session (or the proposed solution evaluation session) transmitted from the test administrator terminal 13, the evaluator determination part 325 may acquire random numbers generated by the random number generator 206 which is built in the server 11, and use the random numbers to determine each examinee who should evaluate the problem (or the proposed solution) in each problem data (or proposed solution data) stored in the first test problem data 343a (or the second test proposed solution data 343b). Alternatively, after it is confirmed that the problem collection session (or the proposed solution collection session) has ended such as by confirming that the status in the first test examinee account file 341a (or the second test examinee account file 341b) or the like has become "Problem collection session (or proposed solution collection session) ended" for all the examinees, or by receiving from the time limit judgment part 324 that the problem collection session (or the proposed solution collection session) has ended, the evaluator determination part 325 may not wait the instruction to start the problem evaluation session (or the proposed solution evaluation session) transmitted from the test administrator terminal 13, but automatically acquire random numbers generated by the random number generator 206 which is built in the server 11, and use the random numbers to determine each examinee who should evaluate the problem (or the proposed solution) in each problem data (or proposed solution data) stored in the first test problem data 343a (or the second test proposed solution data 343b). This makes it possible to save test time.

(Evaluator Determination Part)

In order to determine which problem (or proposed solution) should be evaluated by which examinee, the evaluator determination part 325 may allocate a necessary number of examinee ID to each problem ID (or proposed solution ID) among the examinee IDs of all the examinees by using the random numbers. Once the examinees who should evaluate each problem (or proposed solution) are determined, the evaluator determination part 325 may store the problem ID (or the proposed solution) in association with the examinee ID as the evaluator in the first test problem evaluation data file 344a (or the second test proposed solution evaluation data file 344b) or the like within the storage unit 340. In addition, the evaluator determination part 325 may also store the examinee ID, the problem ID (or the proposed solution ID) to be evaluated, the required number of evaluations, the number of completed evaluations and the like in association with each other for each examinee as the evaluator in the first test problem evaluation progress management file 347a (or the second test proposed solution evaluation progress management file 347b) to manage the progress of evaluation for each problem (or proposed solution) by the examinee as the evaluator.

An example of a procedure for evaluator determination by the evaluator determination part 325 will be described. The evaluator determination part 325 may count the total number of the problem data (or the proposed solution data) of all the examinees, and use the following equation to calculate the maximum allocation number of the problem data (or the proposed solution) allocated to each examinee as an evaluator. The calculation result may be rounded up to an integer.

Maximum allocation number=(Total number of problem (or proposed solution))×(Number of evaluators per problem (or proposed solution))/(Number of all examinees).

The number of examinees to evaluate one problem (or one proposed solution) may be determined by the "number of evaluators per problem" (or "the number of evaluators per proposed solution") stored in the first test problem evaluation progress management file 347a (or the second test proposed solution evaluation progress management file 347b).

It is preferable that the evaluator determination part 325 refer to the first test problem data file 343a (or the second test proposed solution data file 343b), and when the examinee ID that has transmitted a certain problem (or proposed solution) and the examinee ID of the examinee who should evaluate this problem (proposed solution) selected by the random numbers become the same, it is preferable to cancel the selection and perform selection again with random numbers. In addition, if an examinee of a specific examinee ID is selected more times than the maximum allocation number, it is preferable that the evaluator determination part 325 cancel the selection and perform selection again with random numbers. If there are enough evaluators, in such a way of selecting evaluators, all evaluators can be allocated with either "Maximum allocation number" or "Maximum allocation number−1" of problems (or proposed solutions) to evaluate.

(Problem Extraction Part)

Following the determination of the examinees to evaluate by the evaluator determination part 325, the problem extraction part 326 may extract the problem to be evaluated based on the problem ID and the examinee ID of the examinee as the evaluators that are stored in the first test problem data file 343a, and transmit the problem along with the third format data stored in the third format data file 346c in a displayable form to each corresponding examinee terminal 12 from the transceiver 310 via the computer network 14. The necessary number of problem data including problems may be sent to each examinee to evaluate all at once or separately.

(Proposed Solution Extraction Part)

Following the determination of the examinees to evaluate by the evaluator determination part 325, the proposed solution extraction part 327 may extract the proposed solution to be evaluated based on the proposed solution ID and the examinee ID of the examinee as the evaluators that are stored in the second test proposed solution data file 343b, and transmit the proposed solution along with the fourth format data stored in the fourth format data file 346d in a displayable form to each corresponding examinee terminal 12 from the transceiver 310 via the computer network 14. The necessary number of proposed solution data including proposed solution may be sent to each examinee to evaluate all at once or separately.

(Evaluation Number Judgement Part)

When the server 11 receives one evaluation for one problem (or proposed solution) from the examinee as the evaluator, the evaluation number judgement part 334 in the server 11 may increase the number of completed evaluations by one in association with the examinee ID of the examinee who has transmitted the evaluation in the first test problem evaluation progress management file 347a (or the second test proposed solution evaluation progress management file 347b). The evaluation number judgement part 332 may track the progress of the problem evaluation session (or the proposed solution evaluation session) of each examinee through comparing the number of completed evaluations with the required number of evaluations. In cases where the necessary number of the problem data (or the proposed solution data) is sent separately to each examinee, the evaluation number judgement part 334 may judge whether or not each examinee has reached the required number of evaluations based on the above determination, and if evaluation number judgement part 334 judges that the examinee has not reached the required number of evaluations yet, it may instruct the problem extraction part 326 (or the proposed solution extraction part 327) to transmit the problem (or proposed solution) data which has not been evaluated along with the third format data (or the fourth format data) in a displayable form to each corresponding examinee terminal from the transceiver 310 via the computer network 14. In case where the evaluation number judgement part 334 judges that a certain examinee has reached the required number of evaluations, the evaluation number judgement part 334 may transmit a completion screen of problem evaluation session (or proposed solution evaluation session) and/or progress information that the problem evaluation session (or the proposed solution evaluation session) has ended to the examinee terminal 12 and the test administrator terminal 13 from the transceiver 310. At this time, in order to record that the problem evaluation session (or the proposed solution evaluation session) has ended, the evaluation number judgement part 334 may change the status in the first test examinee account file 341a (or the second test examinee account file 341b) or the like to "problem evaluation session (or proposed solution evaluation session) ended".

(Problem Evaluation Part)

The problem evaluation part 328 can aggregate the evaluations of the problem of the problem ID in the problem data based on each problem evaluation and the problem ID stored in the first test problem evaluation data file 344a. For example, when the evaluation for each problem is evaluated as five choices of "Strongly disagree", "Disagree", "Neutral", "Agree", and "Strongly agree", predetermined score may be given according to the evaluation such as Strongly disagree=0, Disagree=1, Neutral=2, Agree=3 and Strongly age=4, a simple arithmetic mean value may be used as the score of the problem. Other calculation methods can also be adopted. The score calculation can be performed for each evaluation axis. The problem evaluation part 328 may store aggregated scores as "initial score for evaluation axis 1", "initial score for evaluation axis 2", . . . , "initial score for evaluation axis n" in the first test problem data file 343a for each problem ID.

(Problem Evaluation Extraction Part)

Figures 17, 18:
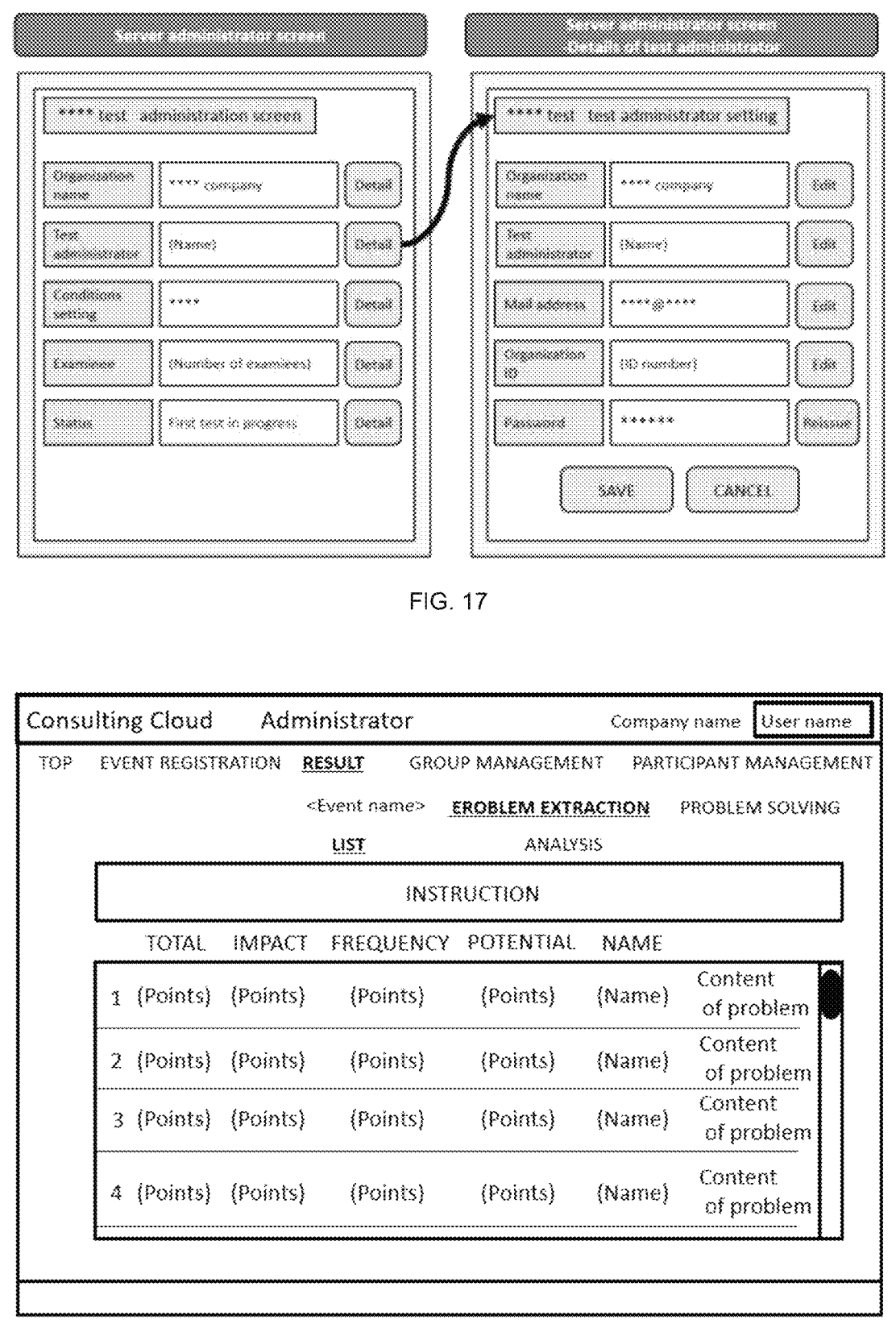
Figure 19:
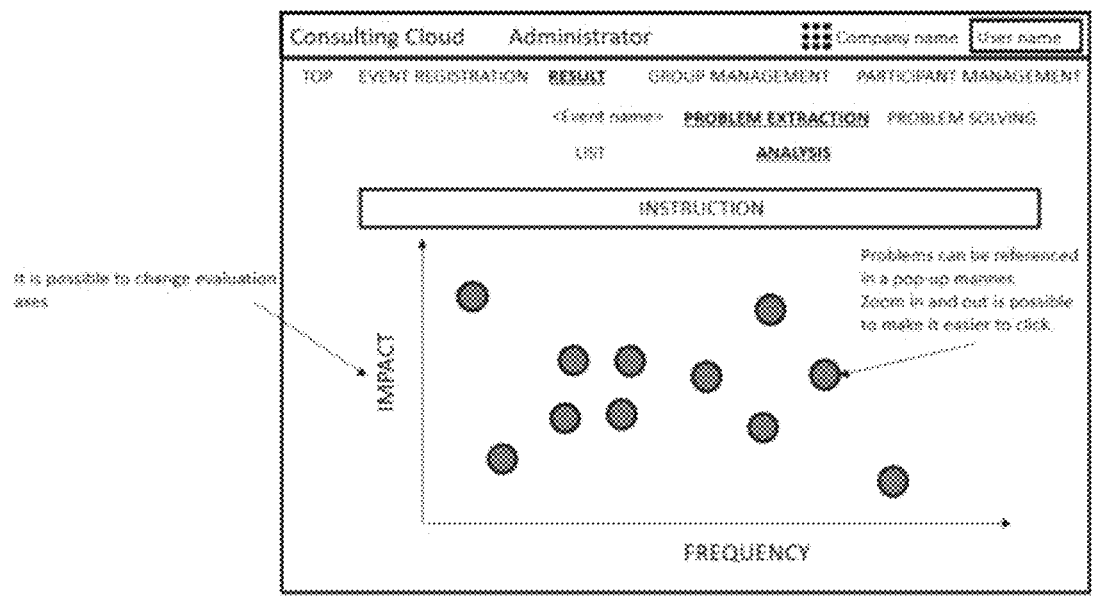
FIG. 19 shows another example of the problem evaluation aggregated data displayed on the test administrator terminal.

The problem evaluation extraction part 330 may extract the problem evaluation aggregated data including each problem and the score for each problem for each evaluation axis stored in the first test problem data file 343a, and transmit the problem evaluation aggregated data to the test administrator terminal 13 in a displayable form via the computer network 14. FIG. 18 shows an example of the problem evaluation aggregated data displayed on the test administrator terminal 13. Here, for each problem, the problem evaluation aggregated data is provided as a list that can display the names of the examinees who proposed the problem, the score for each evaluation axis, the total score, and the content of the problem. In addition to this, the problem evaluation aggregated data can be output by various statistical methods. For example, the problem evaluation extraction part 330 may create a statistical graph by plotting a combination of scores based on two or more evaluation axes assigned to each problem in a coordinate system of two or more dimensions based on each problem and the scores for each problem for each evaluation axis stored in the first test problem data file 343a, and transmit data of the statistical graph to the test administrator terminal 13 in a displayable form via the computer network 14. FIG. 19 shows an example of a scatter plot in which each problem collected in the first test is plotted in a two-dimensional coordinate system based on the scores for two evaluation axes.

Figure 20A:
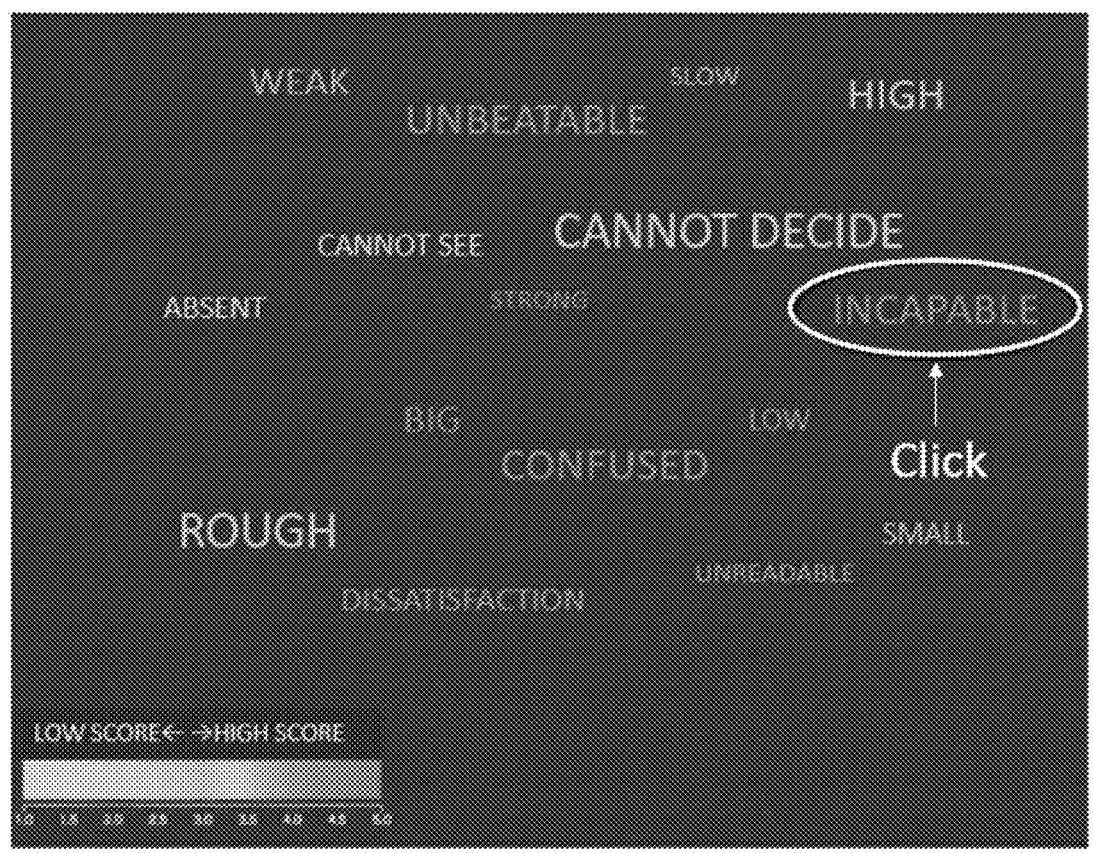
FIG. 20A shows an example of the keyword map displayed on the test administrator terminal.

Further, in one embodiment, as shown in FIG. 20A, the problem evaluation extraction part 330 may create a keyword map in which at least one of the size and the color of a keyword is changed based on at least the number of appearances of the keyword (string data) included in each problem stored in the first test problem data file 343a and/or at least the score calculated for one or more evaluation axes for problems that include the keyword, and transmit the keyword map to the test administrator terminal 13 in a displayable form via the computer network 14. In another embodiment, the problem evaluation extraction part 330 may create a keyword map in which at least one of the size and the color of a keyword is changed based on the number of appearances of the keyword (character string data) included in each problem stored in the first test problem data file 343a and the score calculated for one or more evaluation axes for problems that include the keyword, and transmit the keyword map to the test administrator terminal 13 in a displayable form via the computer network 14.

A specific example of the procedure for creating a keyword map will be described. The character string data included in each problem is decomposed into words based on the dictionary data in the dictionary data file 360 of the language prepared separately. Furthermore, the combination of words that form a context is specified from the relationship of dependencies linked by particles, prepositions, and the like. Next, a word-based keyword or a combination-based keyword of words forming a context is used to search for a corresponding part in the character string included in all problems, and the number of appearances is counted. Then, the keyword having a larger number of appearances may be displayed larger. In addition, weighting may be performed by the score for one or more evaluation axes calculated for the problems including the keyword, and the keyword appearing in the character string of the problems with higher scores may be treated as larger and the total of "number of appearances×weighting" may be calculated. Based on this total value, it is possible to create a keyword map by displaying the larger value in large letters so that it stands out. In addition, it is possible to display the keywords with larger number of appearances larger and change the color of the keywords according to the total value (for example, the larger the total value is, the warmer the color becomes, and the smaller the total value is, the cooler the color becomes).

Furthermore, when one keyword (word or combination of words that form a context) and another keyword appear in the character string of the same problem, since the two keywords appear at the same time, it can be considered that they have a high affinity. By aggregating the frequency of simultaneous appearances among all keywords, it is possible to define "closer" keywords and "far" keywords and place them in closer or far places on the keyword map.

Figures 20B, 20C:
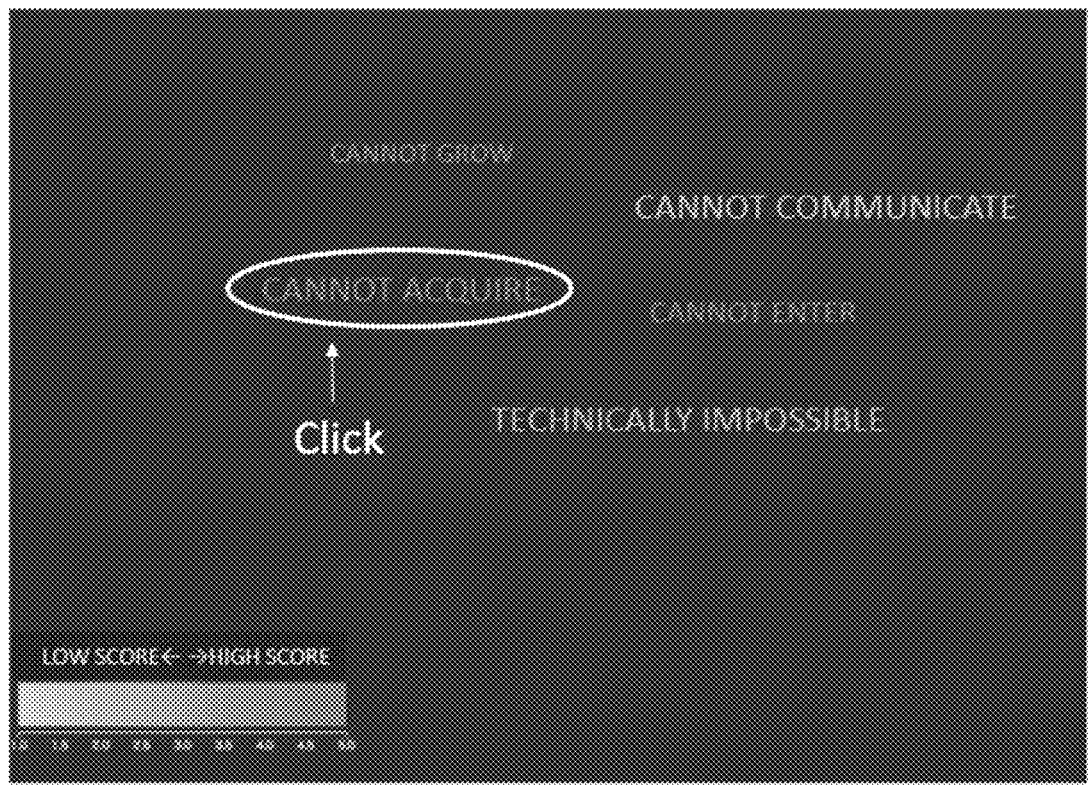
FIG. 20B shows another example of the keyword map displayed on the test administrator terminal.
FIG. 20C shows an example of the problem evaluation aggregated data displayed on the test administrator terminal using a keyword map.

When a keyword on the keyword map is selected, the problem evaluation extraction part 330 can extract the problem evaluation aggregated data for the problem including the keyword from each problem stored in the first test problem data file 343a, and transmit the problem evaluation aggregated data to the test administrator terminal 13 in a displayable form via the computer network 14. When a keyword on the keyword map is selected, the problem evaluation aggregated data for the problem including the keyword may be displayed immediately. However, for example, if the keyword is too short to understand the context, when a keyword (word or combination of words that form a context) on the keyword map is selected, as shown in FIG. 20B, it is possible to display the keyword map with keywords that represent a more specific context (for example, combination of more words), and by selecting a keyword on the keyword map, the problem evaluation aggregated data as shown in FIG. 20C may be displayed.

(Proposed Solution Evaluation Part)

The proposed solution evaluation part 329 can aggregate the evaluations of the proposed solution of each proposed solution ID in the proposed solution data based on each proposed solution evaluation stored in the second test proposed solution evaluation data file 344b and the proposed solution ID. For example, when the evaluation for each proposed solution is evaluated as five choices of "Strongly disagree", "Disagree", "Neutral", "Agree", and "Strongly agree", predetermined score may be given according to the evaluation such as Strongly disagree=0, Disagree=1, Neutral=2, Agree=3 and Strongly age=4, a simple arithmetic mean value may be used as the score for the proposed solution. Other calculation methods can also be adopted. The score calculation can be performed for each evaluation axis. The proposed solution evaluation part 329 may store aggregated scores as "initial score for evaluation axis 1", "initial score for evaluation axis 2", . . . , "initial score for evaluation axis n" in the second test proposed solution data file 343b for each proposed solution ID.

(Proposed Solution Evaluation Extraction Part)

Figures 21, 22:
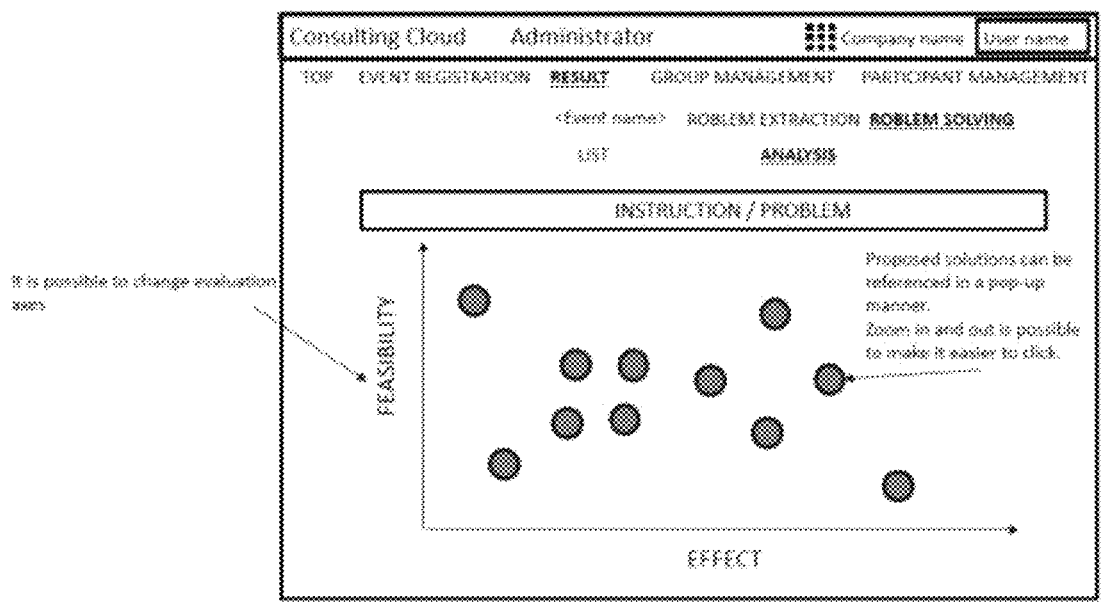
FIG. 21 shows an example of the proposed solution evaluation aggregated data displayed on the test administrator terminal.
FIG. 22 shows another example of proposed solution evaluation aggregated data displayed on the test administrator terminal.

The proposed solution evaluation extraction part 331 may extract the proposed solution evaluation aggregated data including each proposed solution and the score for each evaluation axis for each proposed solution stored in the second test proposed solution data file 343b, and transmit the proposed solution evaluation aggregated data to the test administrator terminal 13 in a displayable form via the computer network 14. FIG. 21 shows an example of the proposed solution evaluation aggregated data displayed on the test administrator terminal 13. In addition to this, the proposed solution evaluation aggregated data can be output by various statistical methods. For example, the proposed solution evaluation extraction part 331 may create a statistical graph by plotting a combination of scores based on two or more evaluation axes assigned to each proposed solution in a coordinate system of two or more dimensions based on each proposed solution and the scores for each evaluation axis for each proposed solution stored in the second test proposed solution data file 343b, and transmit data of the statistical graph to the test administrator terminal 13 in a displayable form via the computer network 14. FIG. 22 shows an example of a scatter plot in which each proposed solution collected in the second test is plotted in a two-dimensional coordinate system based on the scores for two evaluation axes.

Figure 23A:
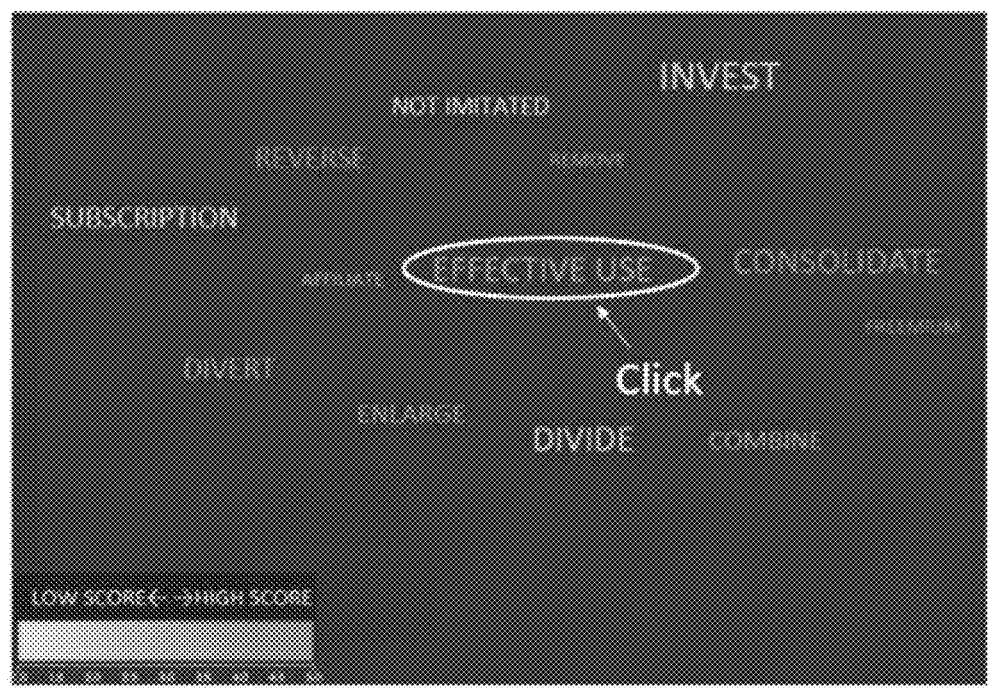
FIG. 23A shows an example of the keyword map displayed on the test administrator terminal.

Further, in one embodiment, as shown in FIG. 23A, the proposed solution evaluation extraction part 331 may create a keyword map in which at least one of the size and the color of a keyword is changed based on at least the number of appearances of the keyword (character string data) included in each proposed solution stored in the second test proposed solution data file 343b and/or the score calculated for one or more evaluation axes for proposed solutions that include the keyword, and transmit the keyword map to the test administrator terminal 13 in a displayable form via the computer network 14. In another embodiment, the proposed solution evaluation extraction part 331 may create a keyword map in which at least one of the size and the color of a keyword is changed based on the number of appearances of the keyword (string data) included in each proposed solution stored in the second test proposed solution data file 343b and the score calculated for one or more evaluation axes for proposed solutions that include the keyword, and transmit the keyword map to the test administrator terminal 13 in a displayable form via the computer network 14.

A specific example of the procedure for creating a keyword map will be described. The character string data included in each proposed solution is decomposed into words based on the dictionary data in the dictionary data file 360 of the language prepared separately. Furthermore, the combination of words that form a context is specified from the relationship of dependencies linked by particles, prepositions, and the like. Next, a word-based keyword or a combination-based keyword of words forming a context is used to search for a corresponding part in the character string included in all proposed solution, and the number of appearances is counted. Then, the keyword having a larger number of appearances may be displayed larger. In addition, weighting may be performed by the score for one or more evaluation axes calculated for the proposed solutions including the keyword, and the keyword appearing in the character string of the proposed solutions with higher scores may be treated as larger and the total of "number of appearances× weighting" may be calculated. Based on this total value, it is possible to create a keyword map by displaying the larger value in large letters so that it stands out. In addition, it is possible to display the keywords with larger number of appearances larger and change the color of the keywords according to the total value (for example, the larger the total value is, the warmer the color becomes, and the smaller the total value is, the cooler the color becomes).

Furthermore, when one keyword (word or combination of words that form a context) and another keyword appear in the character string of the same proposed solution, since the two keywords appear at the same time, it can be considered that they have a high affinity. By aggregating the frequency of simultaneous appearances among all keywords, it is possible to define "closer" keywords and "far" keywords and place them in closer or far places on the keyword map.

Figure 23B:
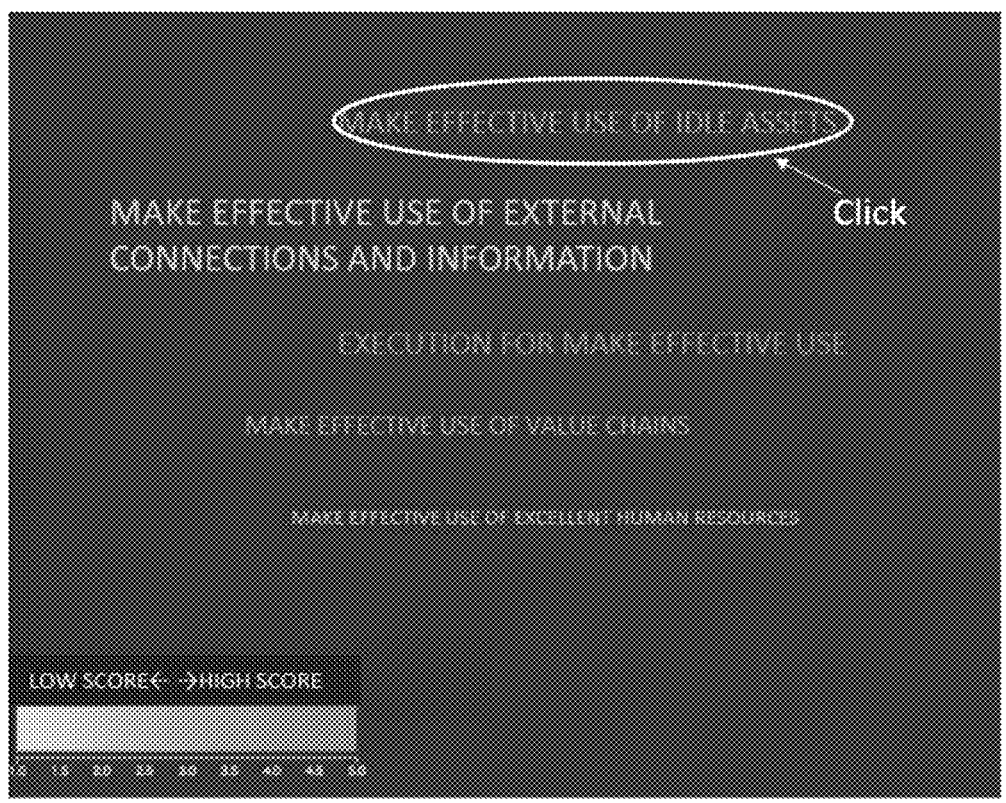
FIG. 23B shows another example of the keyword map displayed on the test administrator terminal.

When a keyword on the keyword map is selected, the proposed solution evaluation extraction part 331 can extract the proposed solution evaluation aggregated data for the proposed solution including the keyword from each proposed solution stored in the second test proposed solution data file 343b, and transmit the proposed solution evaluation aggregated data to the test administrator terminal 13 in a displayable form via the computer network 14. When a keyword on the keyword map is selected, the proposed solution evaluation aggregated data for the proposed solution including the keyword may be displayed immediately. However, for example, if the keyword is too short to understand the context, when a keyword (word or combination of words that form a context) on the keyword map is selected, as shown in FIG. 23B, it is possible to display the keyword map with keywords that represent a more specific context (for example, combination of more words), and by selecting a keyword on the keyword map, the proposed solution evaluation aggregated data as shown in FIG. 23C may be displayed.

(Examinee Evaluation Part)

The examinee evaluation part 332 may calculate the initial acquired score (example: total score or maximum score) for each examinee ID based on the initial score given to the problem (or the proposed solution) for each problem ID (or proposed solution ID) and the examinee ID corresponding to the problem (or the proposed solution) stored in the first test problem data file 343a (or the second test proposed solution data file 343b), and store the score, for example, as "initial score for evaluation axis 1" in the first test examinee evaluation data file 345a (or the second test examinee evaluation data file 345b) in association with the examinee ID.

Figure 3:
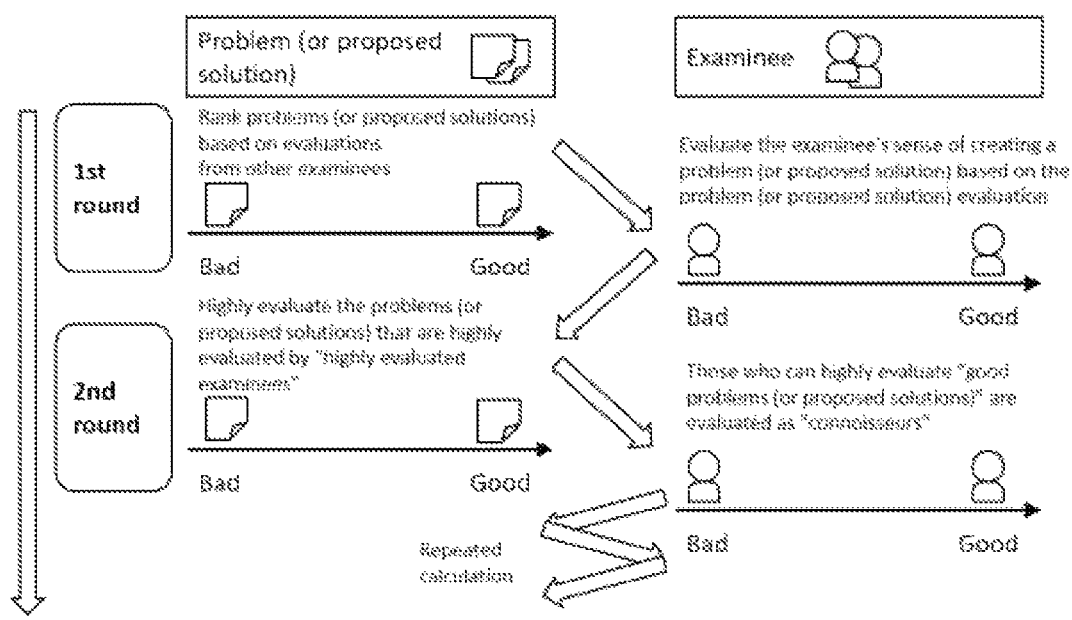
FIG. 3 shows a conceptual diagram showing the repetition of ranking and mutual evaluation of problems (proposed solutions) performed in one embodiment of the online test according to the present invention.

The initial score for a problem and a proposed solution is calculated without knowing the assessment skills of each examinee. Therefore, even if there is a good problem (or proposed solution), there is a possibility that the evaluation will differ between the examinees with assessment skills and the examinees without assessment skills. Therefore, it is preferable to weight the evaluations rather than treating them equally from all examinees. A method for weighting the evaluations includes that the examinee evaluation part 322 once calculates the initial score based on the calculation result of the initial score for the problem (or the proposed solution) for each examinee, and ranks the examinees based on the examinee ID and the initial acquired scores associated with the examinee ID, and the evaluation of problem (or proposed solution) associated with the examinee ID with a higher rank is more highly weighted. This method is based on the assumption that the examinee who has higher evaluated problem creation (or proposed solution creation) skill also has higher assessment skills. In such a way, the evaluations are weighted and each problem (proposed solution) is evaluated again at the problem evaluation part 328 (or the proposed solution evaluation part 329) to obtain corrected scores. The examinees are ranked again and the acquired scores of the examinees are corrected based on the obtained corrected scores. The correction may be conducted one time or more, preferably 5 times or more, and more preferably 10 times or more. As a result, the evaluations by the examinees who are considered having higher assessment skills can be largely reflected to the score of problems (or proposed solutions). FIG. 3 shows a conceptual diagram showing a repetition of ranking of problems (proposed solutions) and mutual evaluation.

It is preferable to evaluate the assessment skills of the examinees for each evaluation axis. For example, the acquired score for each examinee may be a maximum score of the evaluation for each problem (or proposed solution associated with the identifier of the examinee for each evaluation axis, or may be a total score of the evaluation for each problem (or proposed solution) associated with the identifier of the examinee for each evaluation axis. More specifically, assuming that an examinee proposes four problems (or proposed solutions), the score obtained by the problem (or proposed solution) with the highest evaluation among the four problems (or proposed solutions) is the maximum score, and the total value of each score for the four problems (or proposed solutions) is the total score. Evaluation based on the maximum score is a preferable evaluation method when there is no time limit (for example, an answer can be made at any time during a week). It is because if there is no time limit, the longer the time that can be spent on the problem, the higher the evaluation of the total value will tend to be, which is considered to be not necessarily related to the ability of the examinee to propose a problem (proposed solution). On the other hand, the evaluation based on the total score is a preferable evaluation method when a time limit (for example, 1 hour) is provided. This is because when conducting a problem (or proposed solution proposed solution) collection session with an effective time limit, there is a certain rationality to evaluate that the examinees who can propose many problems (proposed solutions) in time have higher ability to propose problems (proposed solutions).

An example of a specific method of weighting will be described with respect to an evaluation axis 1 of the problem (or proposed solution). First the examinee evaluation part 332 calculates the acquired score for evaluation axis 1 (for example, total score or maximum score) for each examinee by aggregating the "initial score for evaluation axis 1" for each problem (or proposed solution) stored in the first test problem data file 343*a* (or the second test proposed solution data file 343*b*). The calculated acquired score may be stored as the "initial score for evaluation axis 1" of the first test examinee evaluation data file 345*a* (or the second test examinee evaluation data file 345*b*). Next, all the examinees are sorted in the order of the acquired scores calculated by the examinee evaluation part 332. Assuming that the total number of examinees is N, the evaluation by the ranked No. k (k=1 to N) examinee is weighted by the following formula.

Weight=1+sin $\{(1-2\times(k-1)/(N-1))\times pi/2\}$

Using this formula, a weighting coefficient can be given to each examinee ID. In this case, the evaluation by the highest-ranked examinee is doubled, and the evaluation by the lowest-ranked examinee becomes 0 times.

After the above weighting, the "initial score for evaluation axis 1", which is the score for each problem (or proposed solution), stored in the first test problem data file 343*a* (or the second test proposed solution data file 343*b*) is corrected based on the weighting calculation result. For example, when the evaluation for each problem (or proposed solution) has been evaluated with five choices, the score was initially Strongly agree=4, but after weighting, the score was multiplied by a weighting coefficient (for example, the above weight), so it is possible that the score will change to Strongly agree=3.5 depending on the examinee ID of the examinee as an evaluator.

In this case, a score for the problem (or proposed solution) after weighting can be corrected from a simple arithmetic mean value based on Strongly disagree=0, Disagree=1, Neutral=2, Agree=3 and Strongly age=4 to a value calculated by the following formula considering weighting.

(Weighted average)=(Total weighted score)/(total weight)

Total weight=Σ(weight)

Total weighted score=Σ(weight×integer from 0 to 4)

Here, the total weight above refers to the sum of the weighting coefficients given to the examinees who evaluated the problem (or proposed solution) for each problem (or proposed solution). The total weighted score refers to the sum of the values obtained by multiplying the weighting coefficient given to the examinee who evaluated the problem (or proposed solution) by the evaluation value by the examinee.

The problem evaluation part 328 (the proposed solution evaluation part 329) can store the corrected scores as the "first corrected score for evaluation axis 1" in the first test problem data file 343*a* (or the second test proposed solution data file 343*b*).

The examinee evaluation part 332 may calculate the corrected acquired score (example: total score or maximum score) for each examinee ID based on the corrected score given to the problem (or the proposed solution) for each problem ID (or proposed solution ID) and the examinee ID corresponding to the problem (or the proposed solution) stored in the first test problem data file 343*a* (or the second test proposed solution data file 343*b*), and store the score, for example, as "first corrected score for evaluation axis 1" in the first test examinee evaluation data file 345*a* (or the second test examinee evaluation data file 345*b*) in association with the examinee ID.

(Examinee Evaluation Extraction Part)

The examinee evaluation extraction part 333 can extract the examinee evaluation data including the score for each examinee for each evaluation axis stored in the first test examinee evaluation data file 345*a* (or the second examinee evaluation data file 345*b*) based on the examinee ID, and transmit the examinee evaluation data in a displayable form from the transceiver 310 to the test administrator terminal 13 via the computer network 14.

(Search Part)

When the transceiver 310 receives a search request for a problem and a proposed solution thereto from a terminal (the user terminal 16) with usage authority via the network, the search part 335 searches at least one of the first test problem data file 343*a*, the first test problem evaluation data file 344*a*, the second proposed solution data file 343*b*, and the second proposed solution evaluation data file 344*b*, and transmits the search result including the problem and its proposed solution matching the search request to the terminal (the user terminal 16) with usage authority via the network. The search result may further include one or both of the score for each evaluation axis for the problem and the score for each evaluation axis for the proposed solution. The search may be requested by using, for example, one of the search conditions such as a keyword, a search formula, and a category selection from a pull-down menu prepared in advance, or by using a combination of two or more of these. The search result sorting conditions (highest score on a specific evaluation axis, closest proposal date and time, etc.) may be selected from a pull-down menu or the like. Examples of the terminal (the user terminal 16) with usage authority include the server administrator terminal 15 and/or the test administrator terminal 13, but other user terminals 16 may be used if the usage authority is given. An example of a screen for inputting search conditions displayed on the user terminal 16 is shown on the left side of FIG. 24. In addition, on the right side of FIG. 24, an example of a screen of search result displayed on the user terminal 16 is shown.

(Examinee Terminal)

The examinee terminal may also contain the hardware configuration of the computer 200 described above. The storage device in the examinee terminal may store programs such as the web browser, and additionally may permanently or temporarily store data such as browser data and data transmitted from/to the server 11 (for example, format data, problem data, problem evaluation data, proposed solution data and proposed solution evaluation data, and the like). The input device 204 of the examinee terminal 12 enables inputting login information, inputting problems, inputting proposed solutions, inputting evaluations for problems (or proposed solutions) of other examinees, and the like. The output device 203 of the examinee terminal enables display of login screen, test screen (including test conditions, problems (or proposed solutions) input by oneself, and problems (or proposed solutions) presented by others), evaluation results, and the like. The communicating device 205 of the examinee terminal 12 enables communication with the server 11 via the computer network 14. For example, the examinee terminal 12 may receive the login screen, the test scree, the problem data, the proposed solution data, the problem evaluation data, the proposed solution evaluation data, and the examinee evaluation data from the server 11, and may transmit the login information, the problem data, the proposed solution data, the problem evaluation data, and the proposed solution evaluation data to the server 11.

[Test Administrator Terminal]

The test administrator terminal 13 may also contain the hardware configuration of the computer 200 described above. The storage device 202 in the test administrator terminal 13 may store programs such as the web browser, and additionally may permanently or temporarily store data such as browser data and data transmitted from/to the server 11 (for example, examinee account data, test status (progress) data, test condition data, problem data, proposed solution data, problem evaluation data, proposed solution evaluation data and examinee evaluation data, and the like). The input device 204 of the test administrator terminal 13 enables inputting examinee account data, inputting login information, instruction to start the test, and the like. The output device 203 of the test administrator terminal 13 enables display of examinee account data, login screen, test conditions, problems presented by examinees, proposed solutions presented by the examinees, the evaluation results, and the like. The communicating device 205 of the test administrator terminal 13 enables communication with the server 11 via the computer network 14. For example, the test administrator terminal 13 may receive the login screen, the examinee account data, the problem data, the proposed solution data, the problem evaluation data, the proposed solution evaluation data, the examinee evaluation data, and the test progress data from the server 11, and may transmit the test conditions information (including the instruction to start the test), the examinee account data and the login information to the server 11.

[Server Administrator Terminal]

The server administrator terminal 15 may also contain the hardware configuration of the computer 200 described above. The storage device 202 in the server administrator terminal 15 may store programs such as the web browser, and additionally may permanently or temporarily store data such as browser data and data transmitted from/to the server 11 (for example, server administrator account data, test administrator account data, examinee account data, test status (progress) data, problem data, proposed solution data, problem evaluation data, proposed solution evaluation data and examinee evaluation data, and the like). The input device 204 of the server administrator terminal 15 enables inputting server administrator account data, inputting login information, inputting the test conditions, and the like. The output device 203 of the server administrator terminal 15 enables display of test administrator account data, login screen, problems presented by examinees, proposed solutions presented by the examinees, the evaluation results, and the like. The communicating device 205 of the server administrator terminal 15 enables communication with the server 11 via the computer network 14. For example, the server administrator terminal 15 may receive the login screen, the server administrator account data, the test administrator account data, the examinee account data, the problem data, the proposed solution data, the problem evaluation data, the proposed solution evaluation data, the examinee evaluation data, and the test progress data from the server 11, and may transmit the server administrator data, the test administrator data, the examinee account data and the login information to the server 11.

[User Terminal]

The user terminal 16 may also contain the hardware configuration of the computer 200 described above. The storage device 202 in the user terminal 16 may store programs such as the web browser, and additionally may permanently or temporarily store data such as browser data and data transmitted from/to the server 11 (for example, data of search conditions such as search formulas and keywords, problem data, problem evaluation data, proposed solution data, proposed solution evaluation data, and the like). The input device 204 of the user terminal 16 enables inputting login information, inputting search conditions for searching for problems and their proposed solutions, and the like. The output device 203 of the user terminal 16 enables display of login screen, screen for search conditions input, problems, proposed solutions, and the like. The communicating device 205 of the user terminal 16 enables communication with the server 11 via the computer network 14. For example, the user terminal 16 may receive the login screen, the server administrator account data, the test administrator account data, the screen for search conditions input, and the data of search result (for example, the problem data, the proposed solution data, the problem evaluation data, and the proposed solution evaluation data) from the server 11, and may transmit the login information and search conditions for searching for problems and their proposed solutions to the server 11.

<2. Flow of Online Test>

Next, the procedure of the method for online test by the above system will be exemplarily described with reference to the flowchart.

(2-1 First Test for Collecting and Evaluating Problems)

2-1-1 from Setting Test Conditions to Starting a Problem Collection Session

Figure 27:
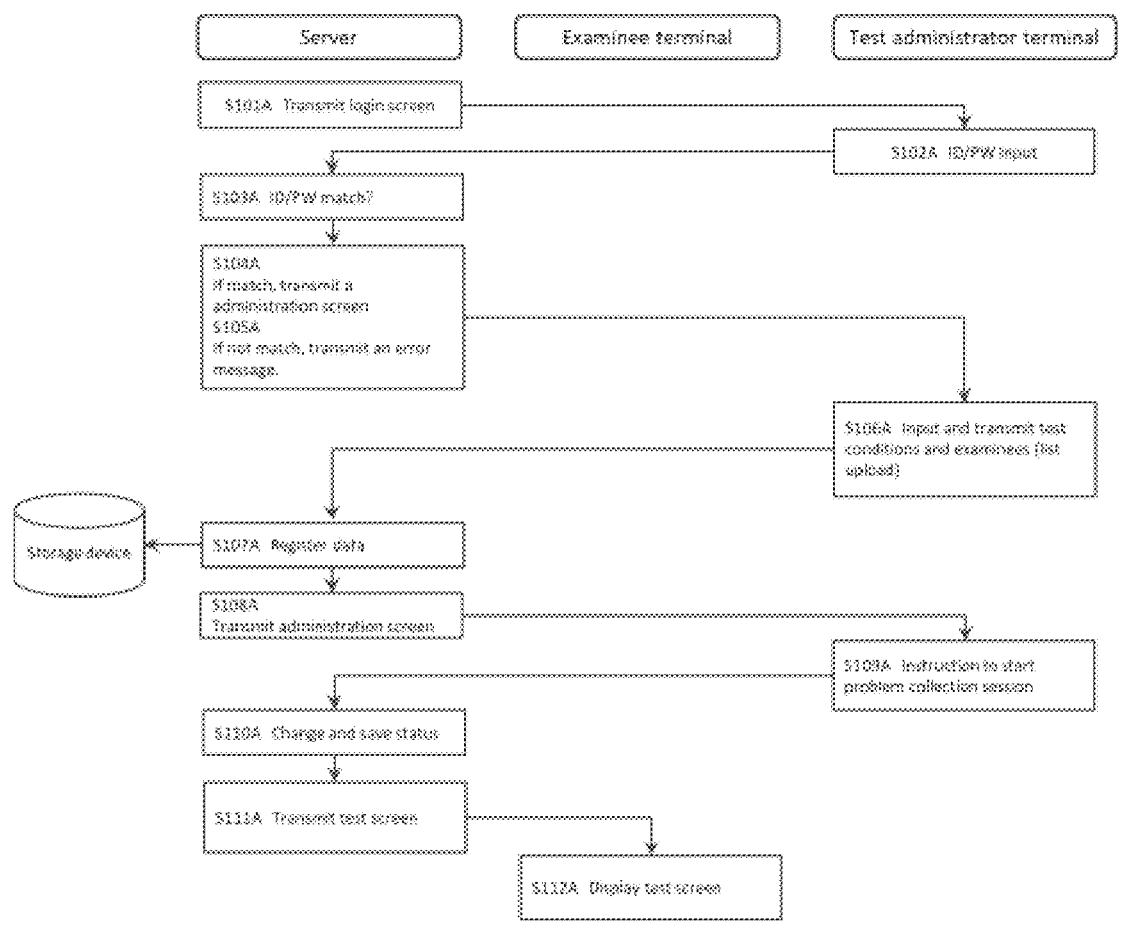
FIG. 27 is a flowchart showing the flow of processing from the point where the test administrator accesses the server to register the examinees and input the test conditions until a test screen of a problem collection session is displayed on the examinee terminals.

FIG. 27 is a flowchart showing the flow of processing from the point where the test administrator accesses the server to register the examinees and input the test conditions until a test screen of a problem collection session is displayed on the examinee terminals. When the test administrator accesses the server 11 by inputting a predetermined URL from the test administrator terminal 13, the server 11 transmits a login screen to the test administrator terminal 13 (S101A). Next, if the test administrator inputs the ID and password into the test administrator terminal 13 and presses the login button (S102A), the authentication processing part 321 of the server 11 determines whether or not the entered administrator ID and password match the data stored in the test administrator account file 348 (S103A). If they match, an administration screen for the test administrator is transmitted to the test administrator terminal 13 (S104A), and if they do not match, an error message is transmitted (S105A).

If the login is successful, the administration screen (example: FIG. 11 to 13) is displayed on the test administrator terminal 13. The test administrator inputs the examinee information and test conditions on the administration screen and transmits them to the server 11 (S106A). When the server 11 receives the examinee information and the data related to the test conditions, the data registration part 322 stores the data in the first test examinee account file 341a and the first test information file 342a, respectively (S107A).

Next, the server 11 transmits the administration screen for showing the registered examinee information and the test conditions to the test administrator terminal 13 (S108A). After confirming the registered information on the administration screen, if the test administrator clicks the "Start problem collection session" button on the administration screen as shown in FIG. 11, an instruction to start a problem collection session is transmitted to the server 11 (S109A). Upon receiving the instruction to start the problem collection session transmitted from the test administrator terminal 13, the problem input format extraction part 323a of the server 11 changes the status in the first test examinee account file 341a or the like to a status indicating that the problem collection session has started, and saves the status (S110A). In addition, the start time of the problem collection session may also be saved in the first test examinee account file 341a or the like. If there is a status field in other files such as the first test examinee account file 341a and the first test information file 342a, the status is changed in the same manner.

In addition, the instruction to start the problem collection session including not only by clicking the "Start problem collection session" button but also by setting the start date and time of the problem collection session in advance and registering it on the server 11. In this case, the server 11 automatically executes S110A at the set date and time.

Next, the problem input format extraction part 323a of the server 11 extracts the first format data for problem input from the first format data file 346a, and further extracts predetermined test information such as problem input condition(s) (instructions) for the first test from the first test information file 342a, and transmit a test screen including at least one descriptive problem input section and the test information to each of the examinee terminals 12 (S111A). As a result, the test screen for problem input as shown in FIG. 7 is displayed on the examinee terminal 12 (S112A). Although the explanation by the flowchart is omitted, in order for the test screen to be displayed on the examinee terminal 12, the examinee terminal 12 also needs to be logged in after being authenticated by the ID and password in the same procedure as the test administrator terminal 13.

2-1-2 from the Start to the End of the Problem Collection Session

Figure 28:
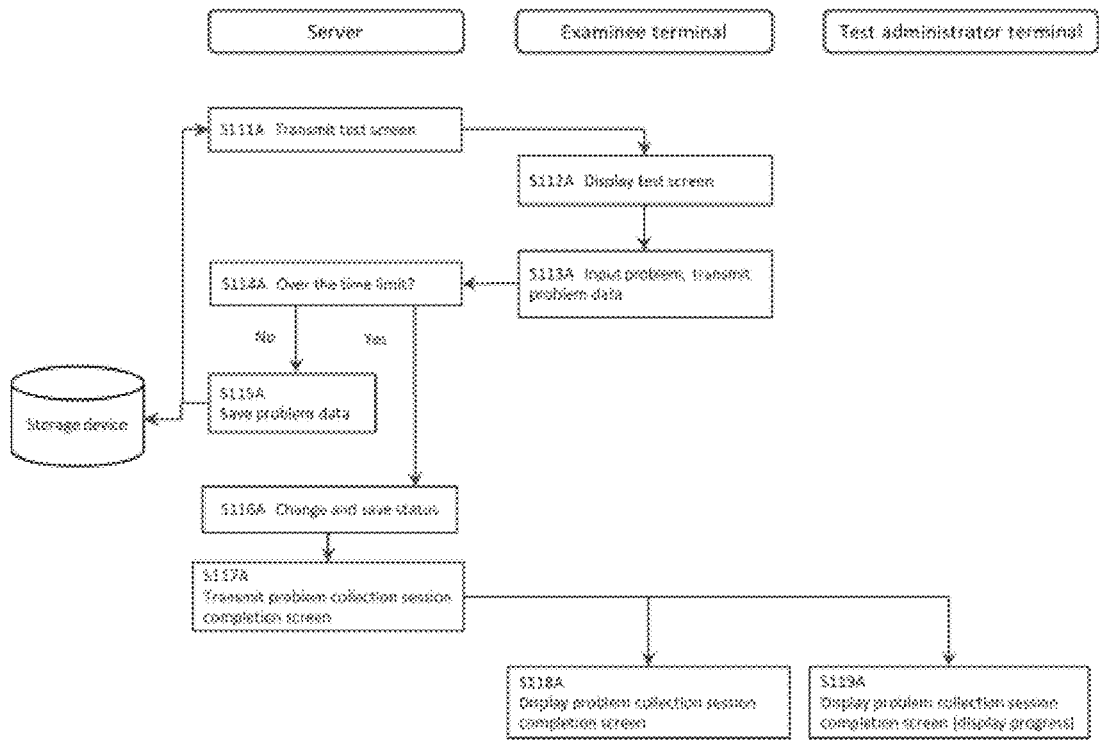
FIG. 28 is a flowchart showing the flow of processing from the start to the end of a problem collection session.

FIG. 28 is a flowchart showing the flow of processing from the start to the end of a problem collection session. After the test screen for problem input is displayed on the examinee terminal 12 by the procedure described above, the examinee inputs problems according to the instructions on the screen and clicks the "Next" button. Then, the problem data is transmitted from the examinee terminal 12 to the server 11 (S113A). When the server 11 receives the problem data, the time limit judgement part 324 judges whether or not the problem data has been received within the time limit (S114A).

If it is judged that the time limit is not passed, the data registration part 322 assigns a problem ID to the problem data, and to store it in the first test problem dada file 343a in association with the examinee ID of the examinee who has transmitted the problem data, and the like (S115A). In addition, if it is judged that the time limit is not passed, the time limit judgement part 324 instructs to transmit the test screen for problem input again on the examinee terminal 12 of the examinee who has transmitted the problem data. The problem input format extraction part 323a transmits a test screen for problem input to the corresponding examinee terminal 12 according to the instruction of the time limit determination part 324 (S111A). In this way, the test screen for problem input is repeatedly transmitted to the examinee terminal 12 as long as the time limit is not passed.

On the other hand, if it is judged that the time limit has passed, regardless of whether or not a problem data is received from the examinee terminal 12, the time limit judgement part 324 of the server 11 records that the problem collection session is ended and changes the status of the first test examinee account file 341a or the like to "Problem collection session ended" (S116A). Further, a completion screen of the problem collection session or progress information that the problem collection session has ended is transmitted from the transceiver 310 to the examinee terminal 12 and the test administrator terminal 13 (S117A). As a result, a screen indicating that the problem collection session has ended is displayed on the examinee terminal 12 (S118A), and progress information indicating that the problem collection session has ended, for example, as shown in FIG. 11, is displayed on the test administrator terminal 13 (S119A).

Alternatively, the server 11 may transmit a test screen for problem input which allows a plurality of problems to be entered altogether in S111A. Further, the examinee terminal 12 may be able to collectively transmit a plurality of problems to the server 11 in S113A. In this case, the server 11 can receive all the problem data from the examinee at once, and it is not necessary to repeat S111A.

2-1-3 from the Start to the End of the Problem Evaluation Session

Figure 29:
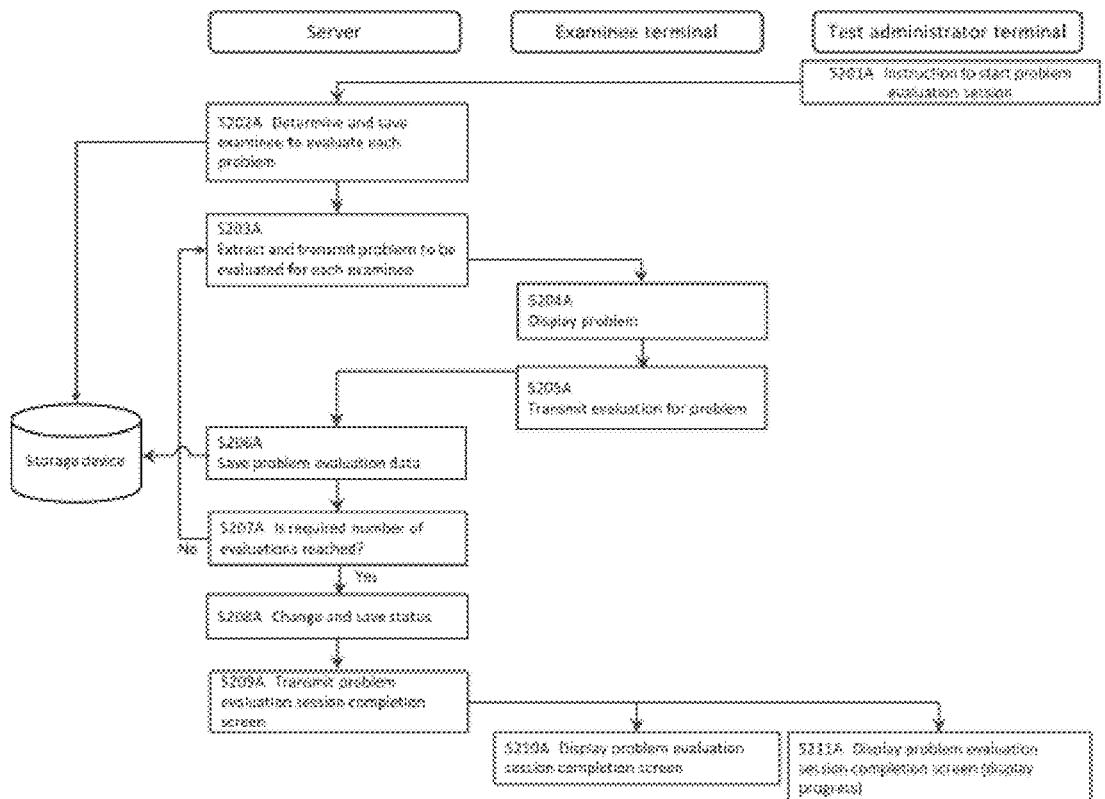
FIG. 29 is a flowchart showing the flow of processing from the start to the end of a problem evaluation session.

FIG. 29 is a flowchart showing the flow of processing from the start to the end of a problem evaluation session. After the problem collection session is completed by the procedure described above, when the test administrator clicks the "Start problem evaluation session" button on the administration screen as shown in FIG. 11, an instruction to start the problem evaluation session is transmitted to the server 11 (S201A). Upon receiving the instruction to start the problem evaluation session, the evaluator determination part 325 of the server 11 acquires random numbers generated by the random number generator 206 built in the server 11, and uses the random numbers to determine each examinee to evaluate the problem in each problem data stored in the first test problem data file 343a (S202A).

At this time, the evaluator determination part 325 of the server 11 may associate and store the examinee ID, the problem ID to be evaluated, the required number of evaluations, and the like for each examinee as an evaluator in the first test problem evaluation progress management file 347a for managing the progress of evaluation for each problem by the examinee as an evaluator. In addition, the determination process by the evaluator determination part 325 is not limited to the instruction from the test administrator terminal 13 to start the problem evaluation session, and may be started by some instruction for starting the evaluator determination process. For example, the determination process may be executed by receiving an instruction from the test administrator terminal 13 only for determining the evaluator, or may be executed according to other instructions, or may be executed when the status is changed to the end of the problem collection session as a trigger.

According to the determination of the examinees for evaluation by the evaluator determination part 325, the problem extraction part 326 of the server extracts the data of the problem to be evaluated by each examinee based on the problem ID and the examinee ID as the evaluator stored in the first test problem data file 343a, and transmits the data and the third format data stored in the third format data file 346c to each corresponding examinee terminal 12 in a displayable form (S203A); As a result, on the examinee terminal 12, the problems to be evaluated by each examinee are displayed on the screen as shown in FIG. 9 (S204A). The examinee clicks the evaluation (example: "Strongly disagree", "Disagree", "neutral", "Agree" or "Strongly agree") button for the problem on the screen, and then clicks the "Next" button. Then, the problem evaluation data is transmitted from the examinee terminal 12 to the server 11 (S205A). When the server 11 receives the problem evaluation data, the data registration part 322 assigns a problem evaluation ID to the problem evaluation data, and stores the problem evaluation data in the first test problem evaluation data file 344*a* in association with the examinee ID the of the examinee who has transmitted the problem evaluation data, and the problem ID, and the like (S206A).

Next, each time one evaluation for a problem is received from the examinee terminal 12, the evaluation number determination part 334 of the server 11 increases the number of completed evaluations in the first test problem evaluation progress management file 347*a* corresponding to the examinee ID of the examinee by one, and determines whether or not the examinee has reached the required number of evaluations according to the above determination (S207A). As a result, if it is judged that the required number of evaluations has not been reached yet, the problem extraction part 326 extracts a problem date that has not been evaluated as the problem data to be evaluated next by the examinee based on the problem ID and the examinee ID as the evaluator stored in the first test problem data file 343*a*, and transmits the data and the third format data stored in the third format data file 346*c* to each corresponding examinee terminal 12 in a displayable form (S203A); In this way, the data of problems to be evaluated is repeatedly transmitted to the examinee terminal 12 until the required number of evaluations is reached.

Alternatively, the server 11 may collectively transmit the data of problems to be evaluated to each of the examinee terminals 12 in S203A. Further, the examinee terminal 12 may be able to collectively transmit all the problem evaluation data to the server 11 in S205A. In this case, the server 11 can receive all the problem evaluation data from the examinee at once, and it is not necessary to repeat S203A.

On the other hand, if it is judged that the required number of evaluations has been reached, the evaluation number determination part 334 of the server 11 changes the status in the first test examinee account file 341*a* or the like to "Problem evaluation session ended" in order to record that the problem evaluation session of the examinee has ended (S208A). Further, a completion screen of problem evaluation session or progress information that the problem evaluation session has ended is transmitted from the transceiver 310 to the examinee terminal 12 and the test administrator terminal 13 (S209A). Upon receiving the screen or the progress information, regarding the examinee terminal 12 and the examination administrator terminal 13, a screen indicating that the problem evaluation session has ended is displayed on the examinee terminal 12 (S210A), and progress information indicating that the problem evaluation session has ended, for example, as shown in FIG. 11, is displayed on the test administrator terminal 13 (S211A).

2-1-4 Score Calculation

Figure 30:
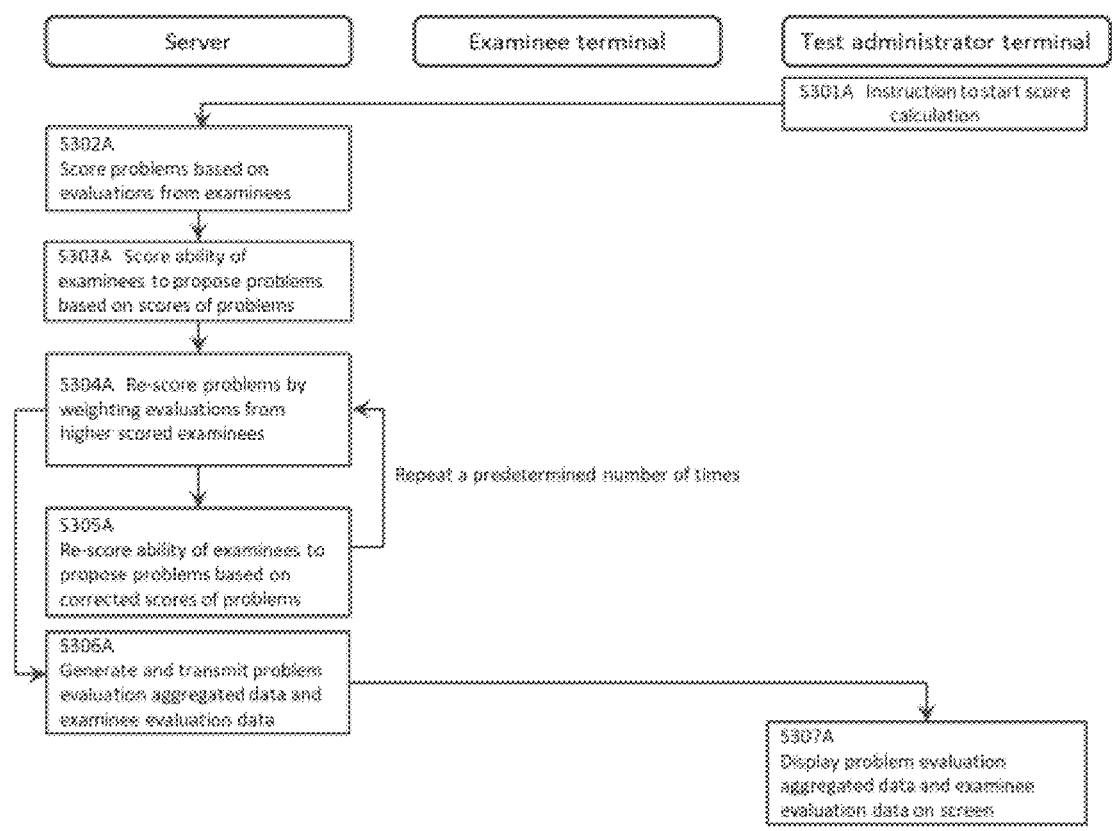
FIG. 30 is a flowchart showing the flow of processing from the end of a problem evaluation session to scoring the problems and the examinees by the server and transmitting the result to the test administrator.

FIG. 30 is a flowchart showing the flow of processing after the end of the problem evaluation session in which the problems are scored by the server 11 and the results are transmitted to the test administrator. After the problem evaluation session is completed by the procedure described above, the test administrator transmits an instruction to start score calculation from the test administrator terminal 13 to the server 11, for example, by clicking a "Start score calculation" button on the administration screen as shown in FIG. 11(S301A). In addition, the "Start score calculation" button may appear on the administration screen of the test administrator only after the problem evaluation session ends. Next, when the server 11 receives the instruction, the problem evaluation part 328 of the server 11 calculates the scores of the problems for each evaluation axis of each problem ID included in each problem data based on the evaluation values for each evaluation axis of each problem stored in the first test problem evaluation data file 344*a* and the problem ID (302A). The score may be written as an initial score in the first test problem data file 343*a*, or may be processed in the memory without being written every time. Next, the examinee evaluation unit 332 calculates the score regarding the ability to propose problems for each evaluation axis for each examinee ID based on the scores given for each problem ID (S303A). The score may be written as an initial score in the first test examinee evaluation data file 345*a*, or may be processed in the memory without being written every time.

After calculating the score regarding the ability to propose problems for each examinee in this way, the score for the problem for each evaluation axis for each problem ID is recalculated (corrected) by giving a higher weight to the evaluation by the examinee with a higher score to obtain a corrected score (S304A). Further, the score for each examinee ID is recalculated (corrected) for each evaluation axis based on the corrected score (S305A). Furthermore, steps S304A and S305A are repeated a preset number of times. The score corrected by step S304A may be written in the first test problem data file 343*a* as the first corrected score, the second corrected score, . . . and the like, or may be processed in the memory without being written every time. Similarly, the score corrected by step S305A may be written in the first test examinee evaluation data file 345*a* as the first corrected score, the second corrected score, . . . , and the like, or may be processed in the memory without being written every time.

By repeating steps S304A and S305A a predetermined number of times, the final score for each problem is calculated. The final score for each examinee is also calculated.

In this way, when the final score for each problem for each evaluation axis and the score for each examinee for each evaluation axis are calculated, the problem evaluation extraction part 330 of the server 11 extracts a problem evaluation aggregated data including each problem and score for each problem for each evaluation axis, and transmits the problem evaluation aggregated data in a displayable form to the test administrator terminal 13 (S306A). At the same time, the examinee evaluation extraction part 333 of the server 11 may extract the examinee evaluation data including the score for each examinee for each evaluation axis stored in the first test examinee evaluation data file 345*a* based on the examinee ID, and transmit the examinee evaluation data in a displayable form to the test administrator terminal 13. Upon receiving the problem evaluation aggregated data (and the examinee evaluation data), the problem evaluation aggregated data (and the examinee evaluation data) is displayed on the screen of the test administrator terminal 13 (S307A).

(2-2 Second Test for Collecting and Evaluating Proposed Solutions)

Figure 31:
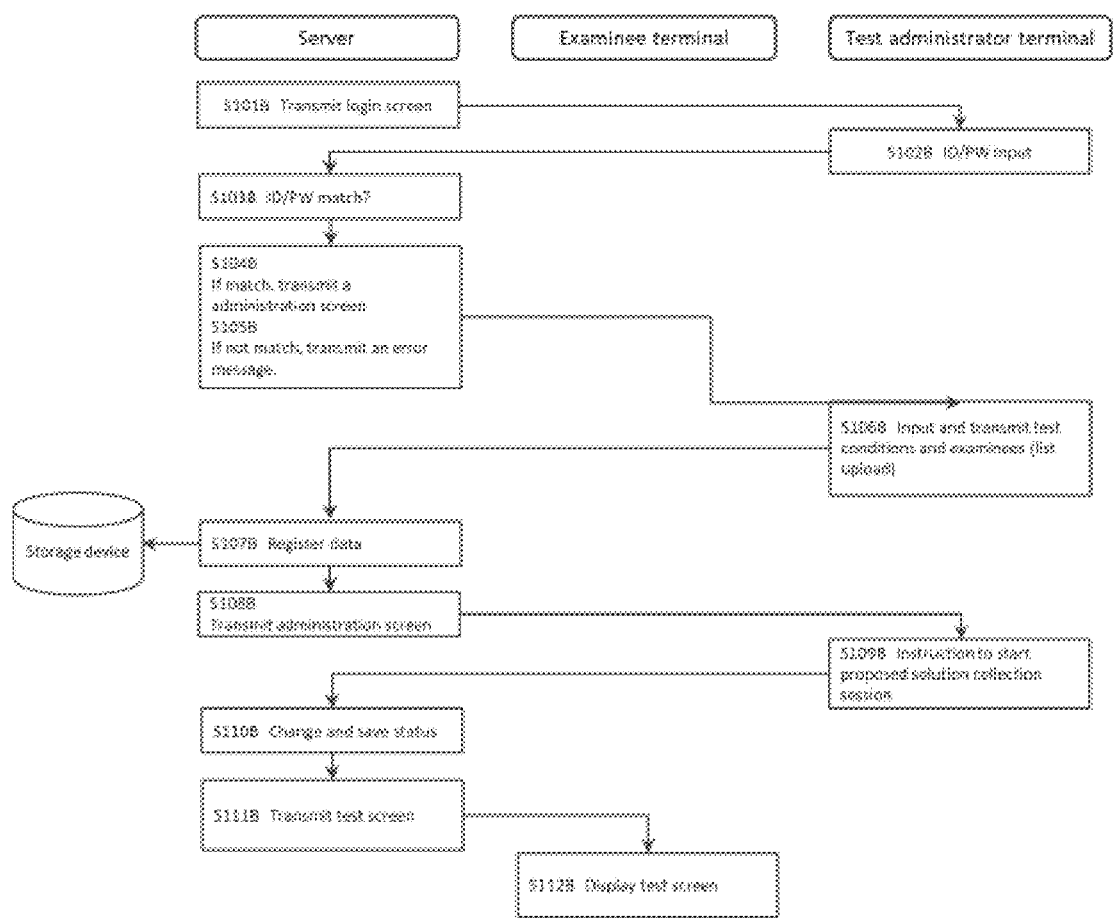
FIG. 31 is a flowchart showing the flow of processing from the point where the test administrator accesses the server to register the examinees and input the test conditions until a test screen of a proposed solution collection session is displayed on the examinee terminals.

2-2-1 from Setting Test Conditions to Starting a Proposed Solution Collection Session FIG. 31 is a flowchart showing the flow of processing from the point where the test administrator accesses the server to register the examinees and input the test conditions until a test screen of a proposed solution collection session is displayed on the examinee terminals. When the test administrator accesses the server 11 by inputting a predetermined URL from the test administrator terminal 13, the server 11 transmits a login screen to the test administrator terminal 13 (S101B). Next, if the test administrator inputs the ID and password into the test administrator terminal 13 and presses the login button (S102B), the authentication processing part 321 of the server 11 determines whether or not the entered administrator ID and password match the data stored in the test administrator account file 348 (S103B). If they match, an administration screen for the test administrator is transmitted to the test administrator terminal 13 (S104B), and if they do not match, an error message is transmitted (S105B).

If the login is successful, the administration screen (example: FIG. 14 to 16) is displayed on the test administrator terminal 13. The test administrator inputs the examinee information and test conditions on the administration screen and transmits them to the server 11 (S106B). When the server 11 receives the examinee information and the data related to the test conditions, the data registration part 322 stores the data in the second test examinee account file 341*b* and the second test information file 342*b*, respectively (S107B).

Next, the server 11 transmits the administration screen for showing the registered examinee information and the test conditions to the test administrator terminal 13 (S108B). After confirming the registered information on the administration screen, if the test administrator clicks the "Start proposed solution collection session" button on the administration screen as shown in FIG. 14, an instruction to start a proposed solution collection session is transmitted to the server 11 (S109B). Upon receiving the instruction to start the proposed solution collection session transmitted from the test administrator terminal 13, the proposed solution input format extraction part 323*b* of the server 11 changes the status in the second test examinee account file 341*b* or the like to a status indicating that the proposed solution collection session has started, and saves the status (S110B). In addition, the start time of the proposed solution collection session may also be saved in the second test examinee account file 341*b* or the like. If there is a status field in other files such as the second test examinee account file 341*b* and the second test information file 342*b*, the status is changed in the same manner.

In addition, the instruction to start the proposed solution collection session including not only by clicking the "Start proposed solution collection session" button but also by setting the start date and time of the proposed solution collection session in advance and registering it on the server 11. In this case, the server 11 automatically executes S110B at the set date and time.

Next, the proposed solution input format extraction part 323*b* of the server 11 extracts the second format data for proposed solution input from the second format data file 346*b*, and further extracts predetermined test information such as proposed solution input conditions (instructions) for the second test and problems for which proposed solutions should be considered from the second test information file 342*b*, and transmit a test screen including at least one descriptive proposed solution input section and the test information to each of the examinee terminals 12 (S111B). As a result, the test screen for proposed solution input as shown in FIG. 8 is displayed on the examinee terminal 12 (S112B). Although the explanation by the flowchart is omitted, in order for the test screen to be displayed on the examinee terminal 12, the examinee terminal 12 also needs to be logged in after being authenticated by the ID and password in the same procedure as the test administrator terminal 13.

2-2-2 from the Start to the End of the Proposed Solution Collection Session

Figure 32:
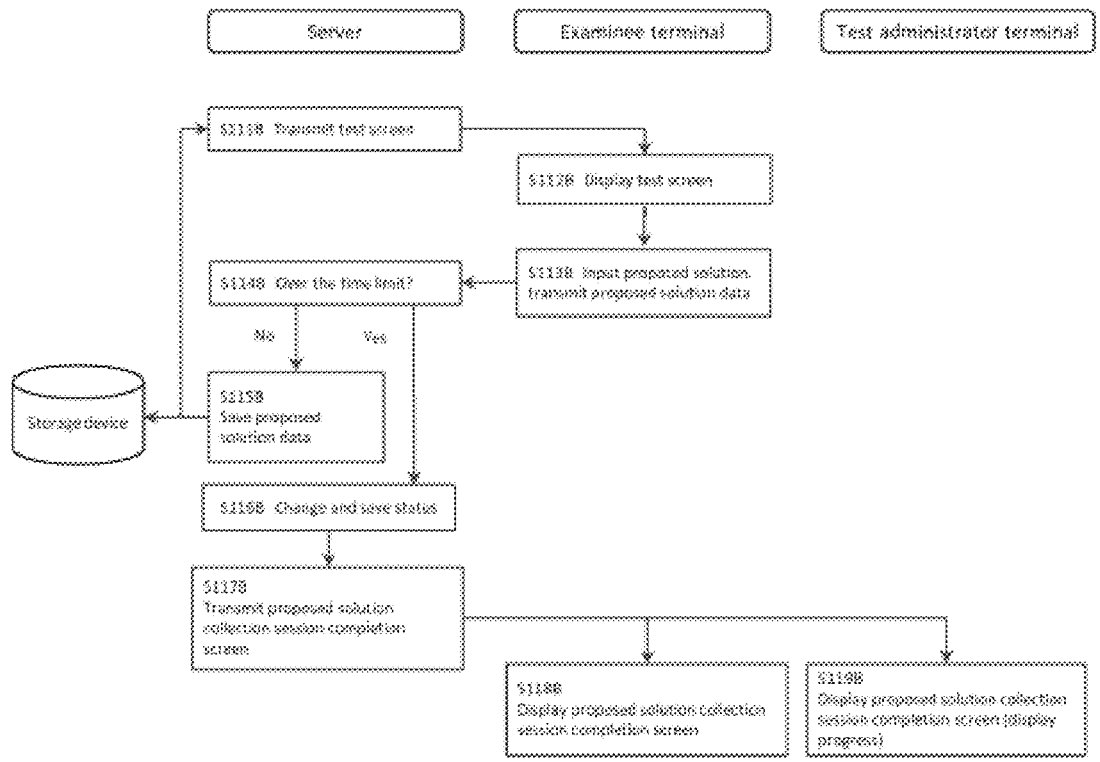
FIG. 32 is a flowchart showing the flow of processing from the start to the end of a proposed solution collection session.

FIG. 32 is a flowchart showing the flow of processing from the start to the end of a proposed solution collection session. After the test screen for proposed solution input is displayed on the examinee terminal 12 by the procedure described above, the examinee inputs proposed solutions according to the instructions on the screen and clicks the "Next" button. Then, the proposed solution data is transmitted from the examinee terminal 12 to the server 11 (S113B). When the server 11 receives the problem data, the time limit judgement part 324 judges whether or not the proposed solution data has been received within the time limit (S114B).

If it is judged that the time limit is not passed, the data registration part 322 assigns a proposed solution ID to the proposed solution data, and to store it in the second test proposed solution dada file 343*b* in association with the examinee ID of the examinee who has transmitted the proposed solution data, and the like (S115B). In addition, if it is judged that the time limit is not passed, the time limit judgement part 324 instructs to transmit the test screen for proposed solution input again on the examinee terminal 12 of the examinee who has transmitted the proposed solution data. The proposed solution input format extraction part 323*b* transmits a test screen for proposed solution input to the corresponding examinee terminal 12 according to the instruction of the time limit determination part 324 (S111B). In this way, the test screen for proposed solution input is repeatedly transmitted to the examinee terminal 12 as long as the time limit is not passed.

On the other hand, if it is judged that the time limit has passed, regardless of whether or not a proposed solution data is received from the examinee terminal 12, the time limit judgement part 324 of the server 11 records that the proposed solution collection session is ended and changes the status of the second test examinee account file 341*b* or the like to "Proposed solution collection session ended" (S116B). Further, a completion screen of the proposed solution collection session or progress information that the proposed solution collection session has ended is transmitted from the transceiver 310 to the examinee terminal 12 and the test administrator terminal 13 (S117B). As a result, a screen indicating that the proposed solution collection session has ended is displayed on the examinee terminal 12 (S118B), and progress information indicating that the proposed solution collection session has ended, for example, as shown in FIG. 14, is displayed on the test administrator terminal 13 (S119B).

Alternatively, the server 11 may transmit a test screen for proposed solution input which allows a plurality of problems to be entered altogether in S111B. Further, the examinee terminal 12 may be able to collectively transmit a plurality of proposed solutions to the server 11 in S113A. In this case, the server 11 can receive all the proposed solution data from the examinee at once, and it is not necessary to repeat S111B.

2-2-3 from the Start to the End of the Proposed Solution Evaluation Session

Figure 33:
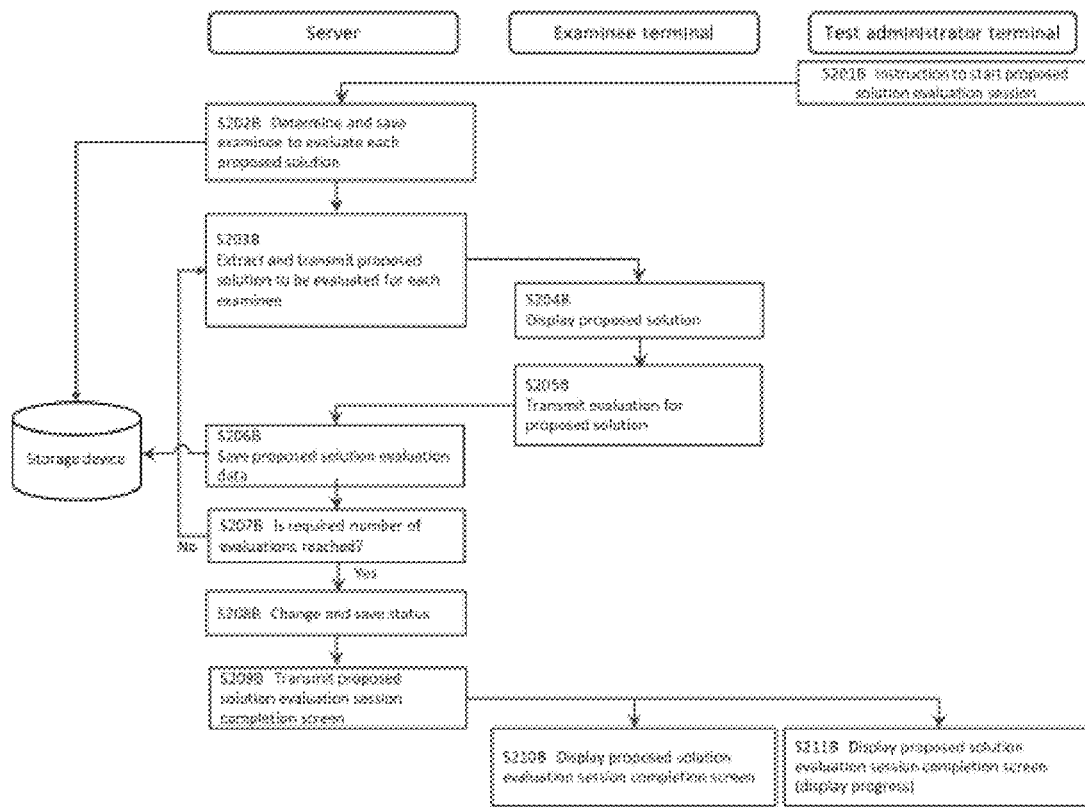
FIG. 33 is a flowchart showing the flow of processing from the start to the end of a proposed solution evaluation session.

FIG. 33 is a flowchart showing the flow of processing from the start to the end of a proposed solution evaluation session. After the proposed solution collection session is completed by the procedure described above, when the test administrator clicks the "Start proposed solution evaluation session" button on the administration screen as shown in FIG. 14, an instruction to start the proposed solution evaluation session is transmitted to the server 11 (S201B). Upon receiving the instruction to start the proposed solution evaluation session, the evaluator determination part 325 of the server 11 acquires random numbers generated by the random number generator 206 built in the server 11, and uses the random numbers to determine each examinee to evaluate the proposed solution in each proposed solution data stored in the second test proposed solution data file 343b (S202B).

At this time, the evaluator determination part 325 of the server 11 may associate and store the examinee ID, the proposed solution ID to be evaluated, the required number of evaluations, and the like for each examinee as an evaluator in the second test proposed solution evaluation progress management file 347b for managing the progress of evaluation for each proposed solution by the examinee as an evaluator. In addition, the determination process by the evaluator determination part 325 is not limited to the instruction from the test administrator terminal 13 to start the proposed solution evaluation session, and may be started by some instruction for starting the evaluator determination process. For example, the determination process may be executed by receiving an instruction from the test administrator terminal 13 only for determining the evaluator, or may be executed according to other instructions, or may be executed when the status is changed to the end of the proposed solution collection session as a trigger.

According to the determination of the examinees for evaluation by the evaluator determination part 325, the proposed solution extraction part 327 of the server extracts the data of the proposed solution to be evaluated by each examinee based on the proposed solution ID and the examinee ID as the evaluator stored in the second test proposed solution data file 343b, and transmits the data and the fourth format data stored in the fourth format data file 346d to each corresponding examinee terminal 12 in a displayable form (S203B); As a result, on the examinee terminal 12, the proposed solutions to be evaluated by each examinee are displayed on the screen as shown in FIG. 10 (S204B). The examinee clicks the evaluation (example: "Strongly disagree", "Disagree", "neutral". "Agree" or "Strongly agree") button for the proposed solution on the screen, and then clicks the "Next" button. Then, the proposed solution evaluation data is transmitted from the examinee terminal 12 to the server 11 (S205B). When the server 11 receives the proposed solution evaluation data, the data registration part 322 assigns a proposed solution evaluation ID to the proposed solution evaluation data, and stores the proposed solution evaluation data in the second test proposed solution evaluation data file 344b in association with the examinee ID the of the examinee who has transmitted the proposed solution evaluation data, and the proposed solution ID, and the like (S206B).

Next, each time one evaluation for a proposed solution is received from the examinee terminal 12, the evaluation number determination part 334 of the server 11 increases the number of completed evaluations in the second test proposed solution evaluation progress management file 347b corresponding to the examinee ID of the examinee by one, and determines whether or not the examinee has reached the required number of evaluations according to the above determination (S207B). As a result, if it is judged that the required number of evaluations has not been reached yet, the proposed solution extraction part 327 extracts a proposed solution date that has not been evaluated as the proposed solution data to be evaluated next by the examinee based on the proposed solution ID and the examinee ID as the evaluator stored in the second test proposed solution data file 343b, and transmits the data and the fourth format data stored in the fourth format data file 346d to each corresponding examinee terminal 12 in a displayable form (S203B); In this way, the data of proposed solutions to be evaluated is repeatedly transmitted to the examinee terminal 12 until the required number of evaluations is reached.

Alternatively, the server 11 may collectively transmit the data of proposed solutions to be evaluated to each of the examinee terminals 12 in S203B. Further, the examinee terminal 12 may be able to collectively transmit all the proposed solution evaluation data to the server 11 in S205B. In this case, the server 11 can receive all the proposed solution evaluation data from the examinee at once, and it is not necessary to repeat S203B.

On the other hand, if it is judged that the required number of evaluations has been reached, the evaluation number determination part 334 of the server 11 changes the status in the second test examinee account file 341b or the like to "Proposed solution evaluation session ended" in order to record that the proposed solution evaluation session of the examinee has ended (S208B). Further, a completion screen of proposed solution evaluation session or progress information that the proposed solution evaluation session has ended is transmitted from the transceiver 310 to the examinee terminal 12 and the test administrator terminal 13 (S209B). Upon receiving the screen or the progress information, regarding the examinee terminal 12 and the examination administrator terminal 13, a screen indicating that the proposed solution evaluation session has ended is displayed on the examinee terminal 12 (S210B), and progress information indicating that the proposed solution evaluation session has ended, for example, as shown in FIG. 14, is displayed on the test administrator terminal 13 (S211B).

2-2-4 Score Calculation

Figure 34:
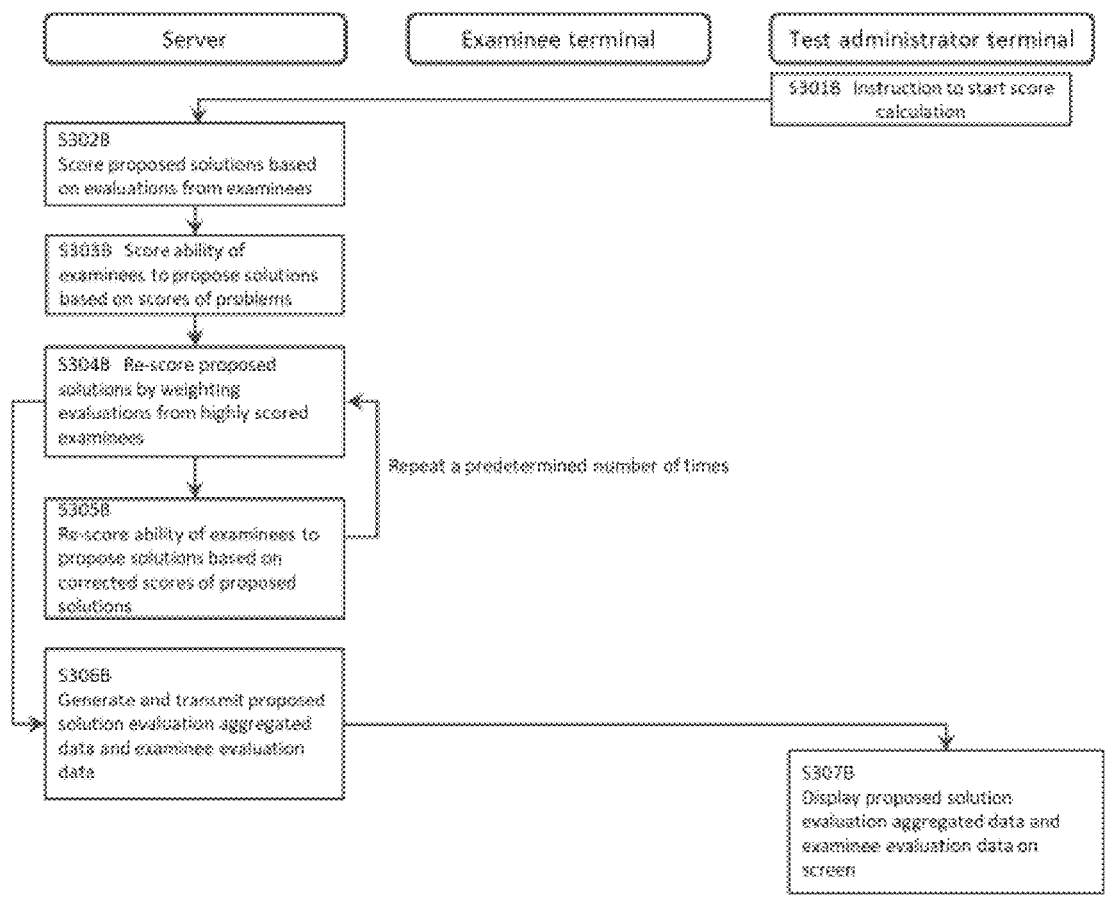
FIG. 34 is a flowchart showing the flow of processing from when the problems and the examinees are scored by the server after the end of a proposed solution evaluation session until when the result is transmitted to the test administrator.

FIG. 34 is a flowchart showing the flow of processing after the end of the proposed solution evaluation session in which the proposed solutions are scored by the server 11 and the results are transmitted to the test administrator. After the proposed solution evaluation session is completed by the procedure described above, the test administrator transmits an instruction to start score calculation from the test administrator terminal 13 to the server 11, for example, by clicking a "Start score calculation" button on the administration screen as shown in FIG. 14(S301B). In addition, the "Start score calculation" button may appear on the administration screen of the test administrator only after the proposed solution evaluation session ends. Next, when the server 11 receives the instruction, the proposed solution evaluation part 329 of the server 11 calculates the scores of the proposed solutions for each evaluation axis of each proposed solution ID included in each proposed solution data based on the evaluation values for each evaluation axis of each proposed solution stored in the second test proposed solution evaluation data file 344b and the proposed solution ID (S302B). The score may be written as an initial score in the second test proposed solution data file 343b, or may be processed in the memory without being written every time. Next, the examinee evaluation unit 332 calculates the score regarding the ability to propose proposed solutions for each evaluation axis for each examinee ID based on the scores given for each proposed solution ID (S303B). The score may be written as an initial score in the second test examinee evaluation data file 345b, or may be processed in the memory without being written every time.

After calculating the score regarding the ability to propose proposed solutions for each examinee in this way, the score for the proposed solution for each evaluation axis for each proposed solution ID is recalculated (corrected) by giving a higher weight to the evaluation from the examinee with a higher score to obtain a corrected score (S304B). Further, the score for each examinee ID is recalculated (corrected) for each evaluation axis based on the corrected score (S305B). Furthermore, steps S304B and S305B are repeated a preset number of times. The score corrected by step S304B may be written in the second test proposed solution data file 343*b* as the first corrected score, the second corrected score, . . . , and the like, or may be processed in the memory without being written every time. Similarly, the score corrected by step S305B may be written in the second test examinee evaluation data file 345*b* as the first corrected score, the second corrected score . . . , and the like, or may be processed in the memory without being written every time.

By repeating steps S304B and S305B a predetermined number of times, the final score for each proposed solution is calculated. The final score for each examinee is also calculated.

In this way, when the final score for each proposed solution for each evaluation axis and the score for each examinee for each evaluation axis are calculated, the proposed solution evaluation extraction part 331 of the server 11 extracts a proposed solution evaluation aggregated data including each proposed solution and score for each proposed solution for each evaluation axis, and transmits the proposed solution evaluation aggregated data in a displayable form to the test administrator terminal 13 (S306B). At the same time, the examinee evaluation extraction part 333 of the server 11 may extract the examinee evaluation data including the score for each examinee for each evaluation axis stored in the second test examinee evaluation data file 345*b* based on the examinee ID, and transmit the examinee evaluation data in a displayable form to the test administrator terminal 13. Upon receiving the proposed solution evaluation aggregated data (and the examinee evaluation data), the proposed solution evaluation aggregated data (and the examinee evaluation data) is displayed on the screen of the test administrator terminal 13 (S307B).

<Flow for Searching Problems and Proposed Solutions Thereto>

Next, an online procedure for searching problems and their proposed solutions with the above-mentioned system will be exemplified with reference to a flowchart.

Figure 35:
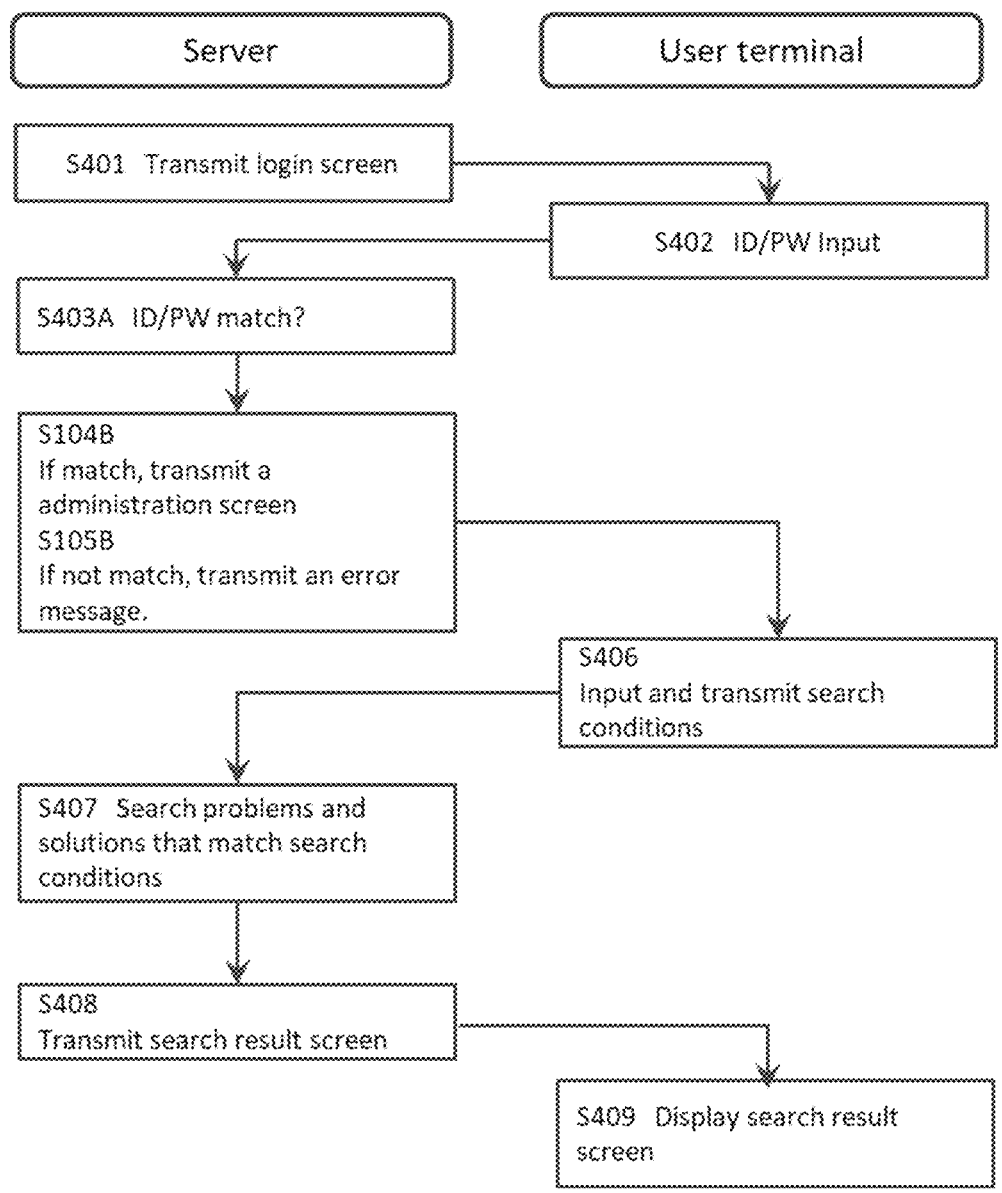
FIG. 35 is a flowchart showing the flow of processing in which an authorized user terminal accesses a server, makes a search request, and obtains a desired search result.

FIG. 35 is a flowchart showing the flow of processing in which an authorized user terminal accesses a server, makes a search request, and obtains a desired search result. When the user inputs a predetermined URL from the user terminal 16 to access the server 11, the server 11 transmits a login screen to the user terminal 16 (S401). Next, if the user inputs the ID and password into the user terminal 16 and presses the login button (S402), the authentication processing part 321 of the server 11 determines whether or not the entered administrator ID and password match the data stored in the user account file 350 (S403). If they match, an administration screen for the user is transmitted to the user terminal 16 (S404), and if they do not match, an error message is transmitted (S405).

Figure 24:
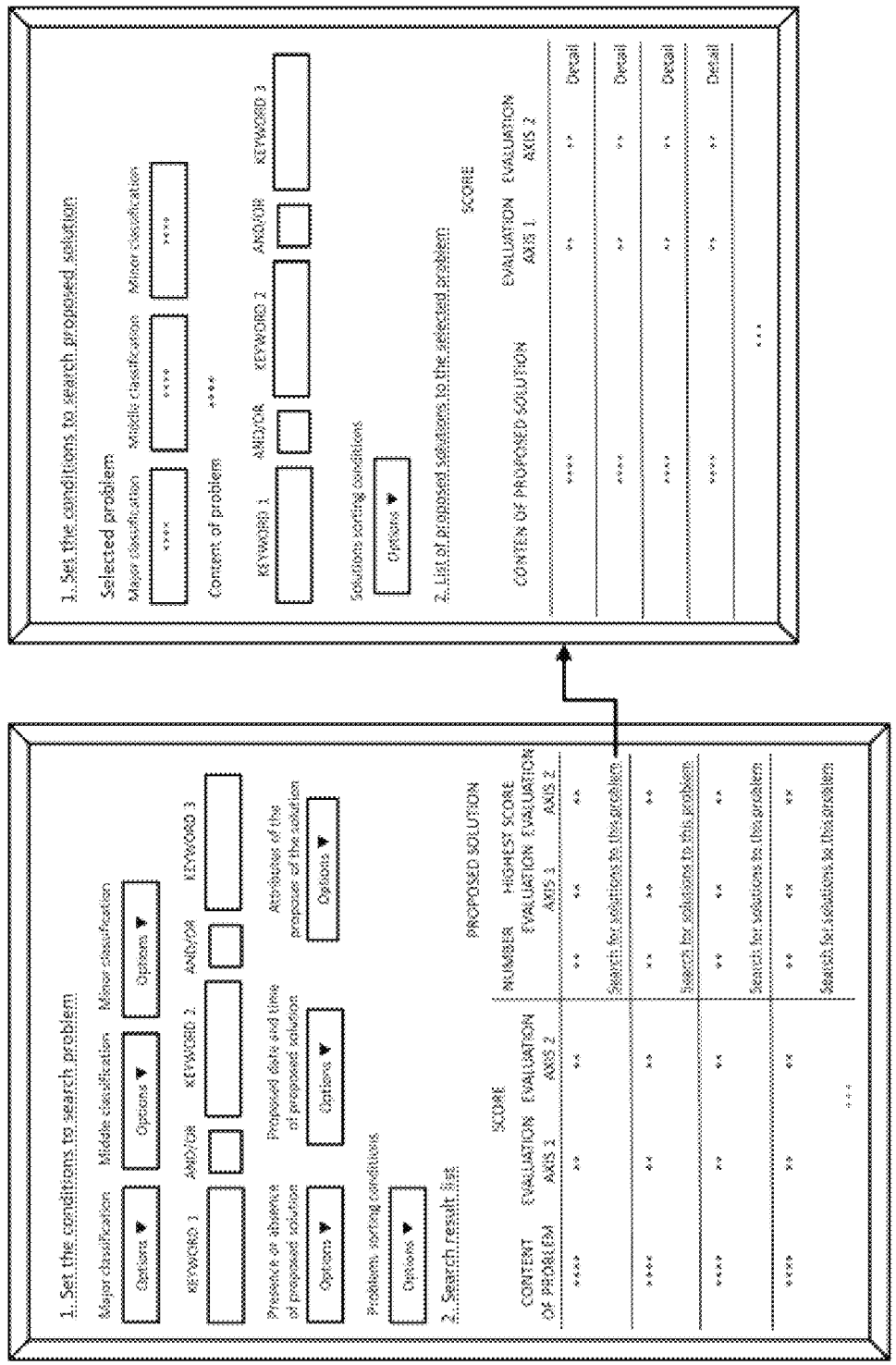
FIG. 24 shows an example of a screen for inputting search conditions displayed on a user terminal (left side), and shows an example of a screen of the search result displayed on the user terminal (right side).

If the login is successful, a screen for inputting search conditions (example: FIG. 24) is displayed on the user terminal 16. The user inputs the search conditions for a problem and its proposed solution using keywords and search formulas, etc. on the screen and transmits them to the server 11 (S406). When the server 11 receives the data of search conditions related to the test conditions, the search unit 335 searches in the storage unit 340 of the server 11 for the data, for example, at least one of the first test problem data file 343*a*, the second test proposed solution data file 343*b*, the first test examinee account file 341*a*, the second test examinee account file 341*b*, the first test information file 342*a*, the second test information file 342*b*, the first test problem evaluation data file 344*a*, the second test proposed solution evaluation data file 344*b*, the first test examinee evaluation data file 345*a*, and the second test examinee evaluation data file 345*b* (S407). After that, the server 11 transmits a search result including a problem and its proposed solution matching the search request to the user terminal (S408). The search result may further include one or both of the score for the problem for each evaluation axis and the score for the proposed solution for each evaluation axis. When the search result data is received, the search results are displayed on the screen of the user terminal 16 (S409) as shown in the lower left side of FIG. 24 and the lower right side of FIG. 24.

DESCRIPTION OF REFERENCE NUMERALS

11 Server
12 Examinee terminal
13 Test administrator terminal
14 Computer network
15 Server administrator terminal
16 User terminal
200 Computer
201 Calculator
202 Storage device
203 Output device
204 Input device
205 Communication device
206 Random number generator
207 Timer
310 Transceiver
320 Control unit
321 Authentication processing part
322 Data registration part
323*a* Problem input format extraction part
323*b* Proposed solution input format extraction part
324 Time limit judgment part
325 Evaluator determination part
326 Problem extraction part
327 Proposed solution extraction part
328 Problem evaluation part
329 Proposed solution evaluation part
330 Problem evaluation extraction part
331 Proposed solution evaluation extraction part
332 Examinee evaluation part
333 Examinee evaluation extraction part
334 Evaluation number judgment unit
335 Search part
340 Storage unit
341*a* First test examinee account file
341*b* Second test examinee account file
342*a* First test information file
342*b* Second test information file
343*a* First test problem data file
343*b* Second test proposed solution data file
344*a* First test problem evaluation data file
344*b* Second test proposed solution evaluation data file
345*a* First test examinee evaluation data file
345*b* Second test examinee evaluation data file 346a First format data file
346b Second format data file
346c Third format data file
346d Fourth format data file
347a First test problem evaluation progress management file
347b Second test proposed solution evaluation progress management file
348 Test administrator account file
349 Server administrator account file
350 Library user account file
351 Test administration file
360 Dictionary data file

The invention claimed is:

1. A method for collecting and evaluating problems, comprising:

receiving, by a server, an instruction to start a first test from a test administrator terminal via a network;

extracting, by the server, a first format data for problem input including at least one descriptive problem input section from a first format data storage part in response to the instruction to start the first test, and transmitting, by the server, the first format data to each of a plurality of examinee terminals in the first test via the network;

receiving, by the server, a problem data including a problem in the descriptive problem input section input by each examinee in the first test from each of the examinee terminals in the first test;

assigning, by the server, an identifier to each of the received problem data including the problem, and storing, by the server, the problem data in a problem data storage part in association with an identifier of each examinee in the first test who has transmitted the problem data;

acquiring, by the server, random numbers generated by a random number generator, and using, by the sever, the random numbers to determine each examinee who should evaluate the problem in each problem data stored in the problem data storage part from among the examinees in the first test;

extracting, by the server, the problem data including the problem to be evaluated by each examinee from the problem data storage part according to a result of the determining the examinee to evaluate the problem, and extracting, by the server, a third format data for problem evaluation input including a selective problem evaluation input section based on at least one evaluation axis from a third format data storage part, and transmitting, by the server, the problem data and the third format data to a corresponding examinee terminal in the first test via the network;

receiving, by the server, a problem evaluation data including an evaluation by the examinee in the first test of the problem in the problem data from each of the examinee terminals in the first test;

assigning, by the server, an identifier to each of the received problem evaluation data, and stores the problem evaluation data in a problem evaluation data storage part in association with the identifier of the examinee in the first test as an evaluator who has transmitted the problem evaluation data and the identifier of the evaluated problem data;

calculating, by the server, a score for each problem for each evaluation axis by aggregating the evaluation of the problem in each problem data based on each problem evaluation data stored in the problem evaluation data storage part and the identifier of the problem data, and storing, by the server, the score in the problem data storage part in association with the identifier of the examinee in the first test who has transmitted the problem data including the problem;

extracting, by the server, a problem evaluation aggregated data including each problem and the score for each problem for each evaluation axis stored in the problem data storage part, and transmitting, by the server, the problem evaluation aggregated data to the test administrator terminal via the network;

calculating, by the server, an acquired score for each evaluation axis for each identifier of the examinee in the first test who has transmitted the problem data at least partially based on the score for the problem for each evaluation axis stored in the problem data storage part in association with the identifier of the problem data and the identifier of the examinee in the first test who has transmitted the problem data, and storing, by the server, the acquired score in a first test examinee evaluation data storage part in association with the identifier of the examinee in the first test who has transmitted the problem data;

ranking, by the server, each examinee in the first test based on the identifier of the examinee in the first test and the acquired score associated with the identifier of the examinee, and re-aggregating and scoring, by the server, the evaluation of the problem for each evaluation axis for each identifier of the problem data to obtain a corrected score on condition that a higher weight is given to the evaluation as the evaluation is associated with the identifier of a higher-ranked examinee, and storing, by the server, the obtained corrected score for each evaluation axis in the problem data storage part in association with the identifier of the problem data;

repeating at least once:

calculating, by the server a corrected acquired score for each examinee for each evaluation axis in the first test based on the corrected score given to each problem for each evaluation axis and the identifier of the examinee in the first test stored in the problem data storage part, and storing, by the server, the corrected acquired score in the first test examinee evaluation data storage part in association with the identifier of the examinee in the first test; and ranking, by the server, each examinee in the first test based on the identifier of the examinee in the first test and the corrected acquired score associated with the identifier of the examinee, and re-aggregating and scoring, by the server, the evaluation of the problem for each evaluation axis for each identifier of the problem data to obtain a corrected score on condition that a higher weight is given to the evaluation as the evaluation is associated with the identifier of a higher-ranked examinee, and storing, by the server, the obtained corrected score for each evaluation axis in the problem data storage part in association with the identifier of the problem data.

2. The method for collecting and evaluating problems according to claim 1, wherein the first format data for problem input is transmitted along with a problem input condition stored in a first test information storage part.

3. The method for collecting and evaluating problems according to claim 1, comprising creating, by the server, a statistical graph by plotting a combination of scores based on two or more evaluation axes assigned to each problem in a coordinate system of two or more dimensions based on each problem and the scores for each problem for each evaluation axis stored in the problem data storage part, and transmitting, by the server, data of the statistical graph to the test administrator terminal in a displayable form via the network.

4. A method for collecting and evaluating proposed solutions, comprising:

receiving, by a server, at least one problem to be solved selected from a plurality of problems in a problem data stored in a problem data storage part from a test administrator terminal via a network;

receiving, by the server, an instruction to start a second test from the test administrator terminal via the network;

extracting, by the server, the problem data including the at least one problem to be solved from the problem data storage part and extracting, by the server, a second format data for inputting a proposed solution to the at least one problem to be solved including at least one descriptive proposed solution input section from a second format data storage part in response to the instruction to start the second test, and transmitting, by the server, the problem data and the second format data to each of a plurality of examinee terminals in the second test via the network;

receiving, by the server, a proposed solution data including a proposed solution to the at least one problem to be solved by the examinee in the second test from each of the examinee terminals in the second test;

assigning, by the server, an identifier to each of the received proposed solution data including the proposed solution, and storing, by the server, the proposed solution data in a proposed solution data storage part in association with an identifier of the examinee in the second test who has transmitted the proposed solution data;

acquiring, by the server, random numbers generated by a random number generator, and using, by the server, the random numbers to determine each examinee who should evaluate the proposed solution in each proposed solution data stored in the proposed solution data storage part from among the examinees in the second test;

extracting, by the server, the proposed solution data including the proposed solution to be evaluated by each examinee from the proposed solution data storage part according to a result of the determining the examinees to evaluate the proposed solution, and extracting, by the server, a fourth format data for proposed solution evaluation input including a selective proposed solution evaluation input section based on at least one evaluation axis from a fourth format data storage part, and transmitting, by the server, the proposed solution data and the fourth format data to a corresponding examinee terminal in the second test via the network;

receiving, by the server, a proposed solution evaluation data including an evaluation by the examinee in the second test of the proposed solution in the proposed solution data from each of the examinee terminals in the second test;

assigning, by the server, an identifier to each of the received proposed solution evaluation data, and storing, by the server, the proposed solution evaluation data in a proposed solution evaluation data storage part in association with the identifier of the examinee in the second test as an evaluator who has transmitted the proposed solution evaluation data and the identifier of the evaluated proposed solution data;

calculating, by the server, a score for each proposed solution for each evaluation axis by aggregating the evaluation of the proposed solution in each proposed solution data based on each proposed solution evaluation data and the identifier of the proposed solution data stored in the proposed solution evaluation data storage part, and storing, by the server, the score in the proposed solution data storage part in association with the identifier of the examinee in the second test who has transmitted the proposed solution data including the proposed solution; and extracting, by the server, a proposed solution evaluation aggregated data including each proposed solution and the score for each proposed solution for each evaluation axis stored in the proposed solution data storage part, and transmitting, by the server, the proposed solution evaluation aggregated data to the test administrator terminal via the network;

calculating, by the server, an acquired score for each evaluation axis for each identifier of the examinee in the second test who has transmitted the proposed solution data at least partially based on the score for the proposed solution for each evaluation axis stored in the proposed solution data storage part in association with the identifier of the proposed solution data and the identifier of the examinee in the second test who has transmitted the proposed solution data, and storing, by the server, the acquired score in a second test examinee evaluation data storage part in association with the identifier of the examinee in the second test who has transmitted the proposed solution data;

ranking, by the server, each examinee in the second test based on the identifier of the examinee in the second test and the acquired score associated with the identifier of the examinee, and re-aggregating and scoring, by the server, the evaluation of the proposed solution for each evaluation axis for each identifier of the proposed solution data to obtain a corrected score on condition that a higher weight is given to the evaluation as the evaluation is associated with the identifier of a higher-ranked examinee, and storing, by the server, the obtained corrected score for each evaluation axis in the proposed solution data storage part in association with the identifier of the proposed solution data;

repeating at least once:

calculating by the server, a corrected acquired score for each examinee for each evaluation axis in the second test based on the corrected score given to each proposed solution for each evaluation axis and the identifier of the examinee in the second test stored in the proposed solution data storage part and storing, by the server, the corrected acquired score in the second test examinee evaluation data storage part in association with the identifier of the examinee in the second test; and ranking, by the server, each examinee in the second test based on the identifier of the examinee in the second test and the corrected acquired score associated with the identifier of the examinee, and re-aggregating and scoring, by the server, the evaluation of the proposed solution for each evaluation axis for each identifier of the proposed solution data to obtain a corrected score on condition that a higher weight is given to the evaluation as the evaluation is associated with the identifier of a higher-ranked examinee, and storing, by the server, the obtained corrected score for each evaluation axis in the proposed solution data storage part in association with the identifier of the proposed solution data.

5. The method for collecting and evaluating proposed solutions according to claim 4, wherein the second format data for proposed solution input is transmitted along with a proposed solution input condition stored in a second test information storage part.

6. The method for collecting and evaluating proposed solutions according to claim 4, comprising creating, by the server, a statistical graph by plotting a combination of scores based on two or more evaluation axes assigned to each proposed solution in a coordinate system of two or more dimensions based on each proposed solution and the scores for each proposed solution for each evaluation axis stored in the proposed solution data storage part, and transmitting data of the statistical graph to the test administrator terminal in a displayable form via the network.

7. The method for collecting and evaluating proposed solutions according to claim 4, wherein the problem data storage part stores the problem data collected by carrying out the method for collecting and evaluating problems.

8. The method for collecting and evaluating proposed solutions according to claim 4, further comprising:
receiving, by the server, a search request for a problem and a proposed solution thereto from a terminal with usage authority via the network, wherein the problem data collected by carrying out the method for collecting and evaluating problems is stored in the problem data storage part in the server, and the problem evaluation data collected by carrying out the method for collecting and evaluating problems is stored in the problem evaluation data storage part in the server; and
searching, by the server, at least one of the problem data storage part, the problem evaluation data storage part, the proposed solution data storage part and the proposed solution evaluation data storage part, and transmitting, by the server, a search result including the problem and the proposed solution thereto matching the search request to the terminal with usage authority via the network.

9. The method for collecting and evaluating proposed solutions according to claim 8, wherein the search result includes one or both of the score for the problem for each evaluation axis and the score for the proposed solution for each evaluation axis.

10. A server for collecting and evaluating problems, the server for collecting and evaluating problems comprising:
a central processing unit (CPU), a transceiver, a control unit, a storage unit, and a random number generator, the storage unit comprising:
a first test examinee account data storage part for storing an account information of each examinee in a first test in association with an identifier of the examinee;
a first format data storage part for storing a first format data for problem input including at least one descriptive problem input section;
a third format data storage part for storing a third format data for problem evaluation input including a selective problem evaluation input section based on at least one evaluation axis;
a problem data storage part for storing a problem data including a problem in the descriptive problem input section input by each examinee in the first test received by the transceiver, and an identifier of the problem data, in association with the identifier of the examinee in the first test who has transmitted the problem data; and
a problem evaluation data storage part for storing a problem evaluation data including an evaluation by the examinee of each problem received by the transceiver, and an identifier of the problem evaluation data, in association with the identifier of the examinee in the first test as an evaluator who has transmitted the problem evaluation data and the identifier of the evaluated problem data;
the control unit comprising a data registration part, a problem input format extraction part, an evaluator determination part, a problem extraction part, a problem evaluation part, and a problem evaluation extraction part, wherein:
the data registration part assigns an identifier to each of the problem data received at the transceiver and store the problem data in the problem data storage part in association with the identifier of the examinee in the first test who has transmitted the problem data, and assigns an identifier to each of the problem evaluation data received at the transceiver and store the problem evaluation data in the problem evaluation data storage part in association with the identifier of the examinee in the first test as an evaluator who has transmitted the problem evaluation data and the identifier of the evaluated problem data;
the problem input format extraction part extracts the first format data for problem input from the first format data storage part and transmits the first format data to each of a plurality of examinee terminals in the first test from the transceiver via a network when the transceiver receives an instruction from a test administrator terminal;
the evaluator determination part acquires random numbers generated by the random number generator, and uses the random numbers to determine each examinee who should evaluate the problem in each problem data stored in the problem data storage part by associating the identifier of the examinee in the first test as an evaluator with each identifier of the problem data when the transceiver receives an instruction from the test administrator terminal;
the problem extraction part extracts the problem data including the problem to be evaluated by each examinee based on the identifier of the problem data and the identifier of the examinee in the first test as an evaluator associated with the identifier of the problem data according to the determination of the examinee for evaluation by the evaluator determination part, and extracts the third format data for problem evaluation input from the third format data storage part, and transmits the problem data and the third format data to a corresponding examinee terminal in the first test from the transceiver via the network;
the problem evaluation part calculates a score for each problem for each evaluation axis by aggregating the evaluation of the problem in each problem data based on each problem evaluation data stored in the problem evaluation data storage part and the identifier of the problem data, and stores the obtained score in the problem data storage part in association with the identifier of the problem data;
the problem evaluation extraction part extracts a problem evaluation aggregated data including each problem and the score for each problem for each evaluation axis stored in the problem data storage part, and transmits the problem evaluation aggregated data to the test administrator terminal via the network;

the storage unit further comprises a first test examinee evaluation data storage part for storing an acquired score for the examinee in the first test in association with the identifier of the examinee;

the control unit further comprises a first test examinee evaluation part which calculates the acquired score for each evaluation axis for each identifier of the examinee in the first test who has transmitted the problem data at least partially based on the score for the problem for each evaluation axis stored in the problem data storage part in association with the identifier of the problem data and the identifier of the examinee in the first test who has transmitted the problem data, and stores the acquired score in the first test examinee evaluation data storage part in association with the identifier of the examinee in the first test who has transmitted the problem data; and the problem evaluation part further ranks each examinee in the first test based on the identifier of the examinee in the first test and the acquired score associated with the identifier of the examinee, and re-aggregates and scores the evaluation of the problem for each evaluation axis for each identifier of the problem data to obtain a corrected score on condition that a higher weight is given to the evaluation as the evaluation is associated with the identifier of a higher-ranked examinee, and stores the obtained corrected score for each evaluation axis in the problem data storage part in association with the identifier of the problem data repeating at least once:

the first test examinee evaluation part calculates a corrected acquired score for each examinee for each evaluation axis in the first test based on the corrected score given to each problem for each evaluation axis and the identifier of the examinee in the first test stored in the problem data storage part, and stores the corrected acquired score in the first test examinee evaluation data storage part in association with the identifier of the examinee in the first test; and the problem evaluation part ranks, each examinee in the first test based on the identifier of the examinee in the first test and the corrected acquired score associated with the identifier of the examinee, and re-aggregates and scores the evaluation of the problem for each evaluation axis for each identifier of the problem data to obtain a corrected score on condition that a higher weight is given to the evaluation as the evaluation is associated with the identifier of a higher-ranked examinee, and stores, the obtained corrected score for each evaluation axis in the problem data storage part in association with the identifier of the problem data.

11. A server for collecting and evaluating proposed solutions, the server comprising:

a central processing unit (CPU), a transceiver, a control unit, a storage unit, and a random number generator, the storage unit comprising:

a second examinee account data storage part for storing an account information of each examinee in a second test in association with an identifier of the examinee;

a second format data storage part for storing a second format data for proposed solution input including at least one descriptive proposed solution input section;

a fourth format data storage part for storing a fourth format data for proposed solution evaluation input including a selective proposed solution evaluation input section based on at least one evaluation axis;

a problem data storage part for storing a problem data including a plurality of problems;

a proposed solution data storage part for storing a proposed solution data including a proposed solution in the descriptive proposed solution input section input by each examinee in the second test received by the transceiver, and an identifier of the proposed solution data, in association with the identifier of the examinee in the second test who has transmitted the proposed solution data; and a proposed solution evaluation data storage part for storing a proposed solution evaluation data including an evaluation by the examinee of each proposed solution received by the transceiver, and an identifier of the proposed solution evaluation data, in association with the identifier of the examinee in the second test as an evaluator who has transmitted the proposed solution evaluation data and the identifier of the evaluated proposed solution data;

the control unit comprising a data registration part, a proposed solution input format extraction part, an evaluator determination part, a proposed solution extraction part, a proposed solution evaluation part, and a proposed solution evaluation extraction part, wherein:

the data registration part assigns an identifier to each of the proposed solution data received at the transceiver and store the proposed solution data in the proposed solution data storage part in association with the identifier of the examinee in the second test who has transmitted the proposed solution data, and assigns an identifier to each of the proposed solution evaluation data received at the transceiver and stores the proposed solution evaluation data in the proposed solution evaluation data storage part in association with the identifier of the examinee in the second test as an evaluator who has transmitted the proposed solution evaluation data and the identifier of the evaluated proposed solution data;

the proposed solution input format extraction part extracts the problem data including at least one problem to be solved selected from a plurality of problems in the problem data from the problem data storage part, and extracts the second format data for proposed solution input from the second format data storage part, and transmits them to each of a plurality of examinee terminals in the second test from the transceiver via the network when the transceiver receives an instruction from a test administrator terminal, the evaluator determination part acquires random numbers generated by the random number generator, and uses the random numbers to determine each examinee who should evaluate the proposed solution in each proposed solution data stored in the proposed solution data storage part by associating the identifier of the examinee in the second test as an evaluator with each identifier of the proposed solution data when the transceiver receives an instruction from the test administrator terminal;

the proposed solution extraction part extracts the proposed solution data including the proposed solution to be evaluated by each examinee based on the identifier of the proposed solution data and the identifier of the examinee in the second test as an evaluator associated with the identifier of the proposed solution data according to the determination of the examinee for evaluation by the evaluator determination part, and extracts the fourth format data for proposed solution evaluation input from the fourth format data storage part, and transmits the proposed solution data and the fourth format data to a corresponding examinee terminal in the second test from the transceiver via the network;

the proposed solution evaluation part calculates a score for each evaluation axis for each proposed solution by aggregating the evaluation of the proposed solution in each proposed solution data based on each proposed solution evaluation data stored in the proposed solution evaluation data storage part and the identifier of the proposed solution data, and stores the obtained score in the proposed solution data storage part in association with the identifier of the proposed solution data;

the proposed solution evaluation extraction part extracts a proposed solution evaluation aggregated data including each proposed solution and the score for each proposed solution for each evaluation axis stored in the proposed solution data storage part, and transmits the proposed solution evaluation aggregated data to the test administrator terminal via the network;

the storage unit further comprises a second test examinee evaluation data storage part for storing an acquired score for each examinee in the second test in association with the identifier of the examinee;

the control unit further comprises a second test examinee evaluation part which calculates the acquired score for each evaluation axis for each identifier of the examinee in the second test who has transmitted the proposed solution data at least partially based on the score for the proposed solution for each evaluation axis stored in the proposed solution data storage part in association with the identifier of the proposed solution data and the identifier of the examinee in the second test who has transmitted the proposed solution data, and stores the acquired score in the second test examinee evaluation data storage part in association with the identifier of the examinee in the second test who has transmitted the proposed solution data;

the proposed solution evaluation part further ranks each examinee in the second test based on the identifier of the examinee in the second test and the acquired score associated with the identifier of the examinee, and re-aggregates and scores the evaluation of the proposed solution for each evaluation axis for each identifier of the proposed solution data to obtain a corrected score on condition that a higher weight is given to the evaluation as the evaluation is associated with the identifier of a higher-ranked examinee, and stores the obtained corrected score in the proposed solution data storage part in association with the identifier of the proposed solution data;

repeating at least once:

the second test examinee evaluation part calculates a corrected acquired score for each examinee for each evaluation axis in the second test based on the corrected score given to each proposed solution for each evaluation axis and the identifier of the examinee in the second test stored in the proposed solution data storage part, and stores the corrected acquired score in the second test examinee evaluation data storage part in association with the identifier of the examinee in the second test; and the proposed solution evaluation part ranks, each examinee in the second test based on the identifier of the examinee in the second test and the corrected acquired score associated with the identifier of the examinee, and re-aggregates and scores the evaluation of the proposed solution for each evaluation axis for each identifier of the proposed solution data to obtain a corrected score on condition that a higher weight is given to the evaluation as the evaluation is associated with the identifier of a higher-ranked examinee, and stores, the obtained corrected score for each evaluation axis in the proposed solution data storage part in association with the identifier of the proposed solution data.

12. A server for collecting and evaluating problems and proposed solutions thereto, the server comprising:

a central processing unit (CPU), a transceiver, a control unit, a storage unit, and a random number generator, the storage unit comprising:

a first test examinee account data storage part for storing an account information of each examinee in a first test in association with an identifier of the examinee;

a second examinee account data storage part for storing an account information of each examinee in a second test in association with an identifier of the examinee;

a first format data storage part for storing a first format data for problem input including at least one descriptive problem input section;

a second format data storage part for storing a second format data for proposed solution input including at least one descriptive proposed solution input section;

a third format data storage part for storing a third format data for problem evaluation input including a selective problem evaluation input section based on at least one evaluation axis;

a fourth format data storage part for storing a fourth format data for proposed solution evaluation input including a selective proposed solution evaluation input section based on at least one evaluation axis;

a problem data storage part for storing a problem data including a problem in the descriptive problem input section input by each examinee in the first test received by the transceiver, and an identifier of the problem data, in association with the identifier of the examinee in the first test who has transmitted the problem data;

a proposed solution data storage part for storing a proposed solution data including a proposed solution in the descriptive proposed solution input section input by each examinee in the second test received by the transceiver, and an identifier of the proposed solution data, in association with the identifier of the examinee in the second test who has transmitted the proposed solution data;

a problem evaluation data storage part for storing a problem evaluation data including an evaluation by the examinee of each problem received by the transceiver, and an identifier of the problem evaluation data, in association with the identifier of the examinee in the first test as an evaluator who has transmitted the problem evaluation data and the identifier of the evaluated problem data; and a proposed solution evaluation data storage part for storing a proposed solution evaluation data including an evaluation by the examinee of each proposed solution received by the transceiver, and an identifier of the proposed solution evaluation data, in association with the identifier of the examinee in the second test as an evaluator who has transmitted the proposed solution evaluation data and the identifier of the evaluated proposed solution data;

the control unit comprising a data registration part, a problem input format extraction part, a proposed solution input format extraction part, an evaluator determination part, a problem extraction part, a proposed solution extraction part, a problem evaluation part, a proposed solution evaluation part, a problem evaluation extraction part, and a proposed solution evaluation extraction part, wherein;

the data registration part assigns an identifier to each of the problem data received at the transceiver and stores the problem data in the problem data storage part in association with the identifier of the examinee in the first test who has transmitted the problem data, and assigns an identifier to each of the problem evaluation data received at the transceiver and stores the problem evaluation data in the problem evaluation data storage part in association with the identifier of the examinee in the first test as an evaluator who has transmitted the problem evaluation data and the identifier of the evaluated problem data;

the data registration part is further assigns an identifier to each of the proposed solution data received at the transceiver and stores the proposed solution data in the proposed solution data storage part in association with the identifier of the examinee in the second test who has transmitted the proposed solution data, assigns an identifier to each of the proposed solution evaluation data received at the transceiver and stores the proposed solution evaluation data in the proposed solution evaluation data storage part in association with the identifier of the examinee in the second test as an evaluator who has transmitted the proposed solution evaluation data and the identifier of the evaluated proposed solution data;

the problem input format extraction part extracts the first format data for problem input from the first format data storage part and transmits the first format data to each of a plurality of examinee terminals in the first test from the transceiver via a network when the transceiver receives an instruction from a test administrator terminal;

the proposed solution input format extraction part extracts the problem data including at least one problem to be solved from the problem data storage part, and extracts the second format data for proposed solution input from the second format data storage part, and transmits the problem data and the second format data to each of a plurality of examinee terminals in the second test from the transceiver via the network when the transceiver receives an instruction from a test administrator terminal;

the evaluator determination part acquires random numbers generated by the random number generator, and uses the random numbers to determine each examinee who should evaluate the problem in each problem data stored in the problem data storage part by associating the identifier of the examinee in the first test as an evaluator with each identifier of the problem data when the transceiver receives an instruction from the test administrator terminal;

further, the evaluator determination part acquires random numbers generated by the random number generator, and uses the random numbers to determine each examinee who should evaluate the proposed solution in each proposed solution data stored in the proposed solution data storage part by associating the identifier of the examinee in the second test as an evaluator with each identifier of the proposed solution data when the transceiver receives an instruction from the test administrator terminal;

the problem extraction part extracts the problem data including the problem to be evaluated by each examinee based on the identifier of the problem data and the identifier of the examinee in the first test as an evaluator associated with the identifier of the problem data according to the determination of the examinees for evaluation by the evaluator determination part, and extracts the third format data for problem evaluation input from the third format data storage part, and transmits the problem data and the third format data to a corresponding examinee terminal in the first test from the transceiver via the network;

the proposed solution extraction part extracts the proposed solution data including the proposed solution to be evaluated by each examinee based on the identifier of the proposed solution data and the identifier of the examinee in the second test as an evaluator associated with the identifier of the proposed solution data according to the determination of the examinees for evaluation by the evaluator determination part, and extracts the fourth format data for proposed solution evaluation input from the fourth format data storage part, and transmits the proposed solution data and the fourth format data to a corresponding examinee terminal in the second test from the transceiver via the network;

the problem evaluation part calculates a score for each problem for each evaluation axis by aggregating the evaluation of the problem in each problem data based on each problem evaluation data stored in the problem evaluation data storage part and the identifier of the problem data, and stores the obtained score in the problem data storage part in association with the identifier of the problem data;

the proposed solution evaluation part calculates a score for each evaluation axis for each proposed solution by aggregating the evaluation of the proposed solution in each proposed solution data based on each proposed solution evaluation data stored in the proposed solution evaluation data storage part and the identifier of the proposed solution data, and stores the obtained score in the proposed solution data storage part in association with the identifier of the proposed solution data;

the problem evaluation extraction part extracts a problem evaluation aggregated data including each problem and the score for each problem for each evaluation axis stored in the problem data storage part, and transmits the problem evaluation aggregated data to the test administrator terminal via the network;

the proposed solution evaluation extraction part extracts a proposed solution evaluation aggregated data including each proposed solution and the score for each evaluation axis for each proposed solution stored in the proposed solution data storage part, and transmits the proposed solution evaluation aggregated data to the test administrator terminal via the network;

the storage unit further comprises a second test examinee evaluation data storage part for storing an acquired score for each examinee in the second test in association with the identifier of the examinee;

the control unit further comprises a second test examinee evaluation part which calculates the acquired score for each evaluation axis for each identifier of the examinee in the second test who has transmitted the proposed solution data at least partially based on the score for the proposed solution for each evaluation axis stored in the proposed solution data storage part in association with the identifier of the proposed solution data and the identifier of the examinee in the second test who has transmitted the proposed solution data, and stores the acquired score in the second test examinee evaluation data storage part in association with the identifier of the examinee in the second test who has transmitted the proposed solution data; and the proposed solution evaluation part further ranks each examinee in the second test based on the identifier of the examinee in the second test and the acquired score associated with the identifier of the examinee, and re-aggregates and scores the evaluation of the proposed solution for each evaluation axis for each identifier of the proposed solution data to obtain a corrected score on condition that a higher weight is given to the evaluation as the evaluation is associated with the identifier of a higher-ranked examinee; and stores the obtained corrected score in the proposed solution data storage part in association with the identifier of the proposed solution data;

repeating at least once:

the second test examinee evaluation part calculates a corrected acquired score for each examinee for each evaluation axis in the second test based on the corrected score given to each proposed solution for each evaluation axis and the identifier of the examinee in the second test stored in the proposed solution data storage part, and stores the corrected acquired score in the second test examinee evaluation data storage part in association with the identifier of the examinee in the second test; and the proposed solution evaluation part ranks, each examinee in the second test based on the identifier of the examinee in the second test and the corrected acquired score associated with the identifier of the examinee, and re-aggregates and scores the evaluation of the proposed solution for each evaluation axis for each identifier of the proposed solution data to obtain a corrected score on condition that a higher weight is given to the evaluation as the evaluation is associated with the identifier of a higher-ranked examinee, and stores, the obtained corrected score for each evaluation axis in the proposed solution data storage part in association with the identifier of the proposed solution data.

13. The server for collecting and evaluating problems according to claim 10, wherein the problem evaluation extraction part is configured to create a keyword map in which at least one of a size and a color of a keyword is changed based on at least the number of appearances of the keyword included in each problem stored in the problem data storage part, and transmit the keyword map to the test administrator terminal in a displayable form via the network.

14. The server for collecting and evaluating problems according to claim 10, wherein the problem evaluation extraction part is configured to extract the problem evaluation aggregated data for the problem including a keyword from each problem stored in the problem data storage part, and transmit the problem evaluation aggregated data to the test administrator terminal in a displayable form via the network when the keyword on a keyword map is selected.

15. The server for collecting and evaluating proposed solutions according to claim 11, wherein the proposed solution evaluation extraction part is configured to create a keyword map in which at least one of a size and a color of a keyword is changed based on at least the number of appearances of the keyword included in each proposed solution stored in the proposed solution data storage part, and transmit the keyword map to the test administrator terminal in a displayable form via the network.

16. The server for collecting and evaluating proposed solutions according to claim 11, wherein the proposed solution evaluation extraction part is configured to extract the proposed solution evaluation aggregated data for the proposed solution including a keyword from each proposed solution stored in the proposed solution data storage part, and transmit the proposed solution evaluation aggregated data to the test administrator terminal in a displayable form via the network when the keyword on a keyword map is selected.

17. The server for collecting and evaluating problems and proposed solutions thereto according to claim 12, wherein:

the storage unit further comprises a first test examinee evaluation data storage part for storing an acquired score for the examinee in the first test in association with the identifier of the examinee;

the control unit further comprises a first test examinee evaluation part which calculates the acquired score for each evaluation axis for each identifier of the examinee in the first test who has transmitted the problem data at least partially based on the score for the problem for each evaluation axis stored in the problem data storage part in association with the identifier of the problem data and the identifier of the examinee in the first test who has transmitted the problem data, and stores the acquired score in the first test examinee evaluation data storage part in association with the identifier of the examinee in the first test who has transmitted the problem data; and the problem evaluation part ranks each examinee in the first test based on the identifier of the examinee in the first test and the acquired score associated with the identifier of the examinee, and re-aggregates and scores the evaluation of the problem for each evaluation axis for each identifier of the problem data to obtain a corrected score on condition that a higher weight is given to the evaluation as the evaluation is associated with the identifier of a higher-ranked examinee, and stores the obtained corrected score for each evaluation axis in the problem data storage part in association with the identifier of the problem data.

18. The server for collecting and evaluating problems and proposed solutions thereto according to claim 12, wherein the control unit further comprises a search part configured to search the storage unit when a search request for a problem and a proposed solution thereto is received from a terminal with usage authority via the network, and transmit a search result including the problem and the proposed solution thereto matching the search request from the transceiver to the terminal with usage authority via the network.

19. The server for collecting and evaluating problems and proposed solutions thereto according to claim 18, wherein the search result includes one or both of the score for the problem for each evaluation axis and the score for the proposed solution for each evaluation axis.

* * * * *